(12) United States Patent
Atefi

(10) Patent No.: US 12,238,651 B2
(45) Date of Patent: Feb. 25, 2025

(54) APPARATUSES, METHODS, AND COMPUTER-READABLE MEDIUM FOR COMMUNICATION IN A WIRELESS LOCAL AREA NETWORK

(71) Applicant: Communication Systems LLC, Santa Fe, NM (US)

(72) Inventor: Ali Atefi, Los Angeles, CA (US)

(*) Notice: Subject to any disclaimer, the term of this patent is extended or adjusted under 35 U.S.C. 154(b) by 0 days.

(21) Appl. No.: 18/751,239

(22) Filed: Jun. 22, 2024

(65) Prior Publication Data
US 2024/0349191 A1 Oct. 17, 2024

Related U.S. Application Data

(63) Continuation of application No. 18/225,119, filed on Jul. 22, 2023, which is a continuation of application No. 17/378,728, filed on Jul. 18, 2021, now Pat. No. 11,729,720, which is a continuation of application No. 16/740,461, filed as application No. PCT/US2018/043349 on Jul. 23, 2018, now Pat. No. 11,071,063.

(60) Provisional application No. 62/691,608, filed on Jun. 29, 2018, provisional application No. 62/634,894, filed on Feb. 25, 2018, provisional application No. 62/596,150, filed on Dec. 8, 2017, provisional application No. 62/535,958, filed on Jul. 23, 2017.

(51) Int. Cl.
*H04W 52/02* (2009.01)
*H04L 69/24* (2022.01)
*H04W 84/12* (2009.01)

(52) U.S. Cl.
CPC ......... *H04W 52/0235* (2013.01); *H04L 69/24* (2013.01); *H04W 52/0274* (2013.01); *H04W 84/12* (2013.01)

(58) Field of Classification Search
CPC ......... H04W 52/0235; H04W 52/0274; H04W 84/12; H04L 69/24
See application file for complete search history.

(56) References Cited

U.S. PATENT DOCUMENTS

| | | | |
|---|---|---|---|
| 2005/0159164 A1* | 7/2005 | Leedom, Jr. | H04W 28/0268 455/434 |
| 2015/0131544 A1* | 5/2015 | Behravan | H04L 5/0094 370/329 |
| 2015/0139073 A1* | 5/2015 | Buchwald | H04W 52/245 370/327 |

* cited by examiner

Primary Examiner — Mohammad S Anwar

(57) ABSTRACT

Various aspects pertaining to apparatuses, methods, and computer-readable medium are described herein. Some aspects pertain to wireless communication between various apparatuses, such as an access point (AP) and a station (STA). The AP may have a radio, and the STA may have a first radio and a second radio. The radios may have various power states. Some aspects pertain to negotiation of various communication parameters. Some aspects pertain to communication of a packet and execution of various related operations. Some aspects pertain to certain uplink (UL) and/or downlink (DL) communications. Some aspects pertain to termination or teardown of the negotiated parameters. The written description and appended drawings provide detailed descriptions regarding these and many other aspects.

20 Claims, 6 Drawing Sheets

APPARATUSES, METHODS, AND COMPUTER-READABLE MEDIUM FOR COMMUNICATION IN A WIRELESS LOCAL AREA NETWORK

CROSS-REFERENCE TO RELATED APPLICATIONS

The present application claims the benefit of and right of priority to U.S. patent application No. patent application Ser. No. 18/225,119, titled "APPARATUSES, METHODS, AND COMPUTER-READABLE MEDIUM FOR COMMUNICATION IN A WIRELESS LOCAL AREA NETWORK," filed Jul. 22, 2023, which claims the benefit of and right of priority to U.S. patent application No. patent application Ser. No. 17/378,728, issued as U.S. Pat. No. 11,729,720, titled "APPARATUSES, METHODS, AND COMPUTER-READABLE MEDIUM FOR COMMUNICATION IN A WIRELESS LOCAL AREA NETWORK," filed Jul. 18, 2021, which claims the benefit of and right of priority to U.S. patent application No. patent application Ser. No. 16/740,461, issued as U.S. Pat. No. 11,071,063, titled "APPARATUSES, METHODS, AND COMPUTER-READABLE MEDIUM FOR COMMUNICATION IN A WIRELESS LOCAL AREA NETWORK," filed Jan. 12, 2020, which claims the benefit of and right of priority to International Patent Cooperation Treaty (PCT) patent application No. PCT/US2018/043349, titled "APPARATUSES, METHODS, AND COMPUTER-READABLE MEDIUM FOR COMMUNICATION," filed Jul. 23, 2018, which claims the benefit of and right of priority to U.S. Provisional patent application No. 62/535,958, titled "APPARATUSES, METHODS, AND COMPUTER-READABLE MEDIUM FOR COMMUNICATION," filed Jul. 23, 2017, U.S. Provisional patent application No. 62/596,150, titled "APPARATUSES, METHODS, AND COMPUTER-READABLE MEDIUM FOR COMMUNICATION," filed Dec. 8, 2017, U.S. Provisional patent application No. 62/634,894, titled "APPARATUSES, METHODS, AND COMPUTER-READABLE MEDIUM FOR COMMUNICATION," filed Feb. 25, 2018, and U.S. Provisional patent application No. 62/691,608, titled "APPARATUSES, METHODS, AND COMPUTER-READABLE MEDIUM FOR COMMUNICATION," filed Jun. 29, 2018, the entirety of all of which is hereby expressly incorporated by reference herein.

TECHNICAL AREA

The present disclosure, generally, pertains to communication and, more specifically, to apparatuses, methods, and computer-readable medium for communication.

BACKGROUND

A wireless local area network (WLAN) may refer to a network that wirelessly connects two or more devices in a coverage area. A WLAN can be deployed in many types of environments, such as residential, commercial, and/or public. Devices can be moved around in the coverage area of the WLAN while maintaining a wireless connection. A WLAN may be utilized to access a local intranet and/or the Internet. Devices in a WLAN can communicate with each other using various protocols. Improvements to such protocols may enable relatively faster download and/or upload of information, relatively less latency, and/or relatively less power consumption, which may provide various technical benefits and may improve the overall user experience.

BRIEF DESCRIPTION OF THE DRAWINGS

The drawings are not intended to limit the scope of the present disclosure nor any aspect of the claims. The drawings are provided solely to illustrate a few aspects that may be described in greater detail throughout the present disclosure. Some aspects described throughout the present disclosure may not be illustrated in the drawings.

DETAILED DESCRIPTION

Figure 1:
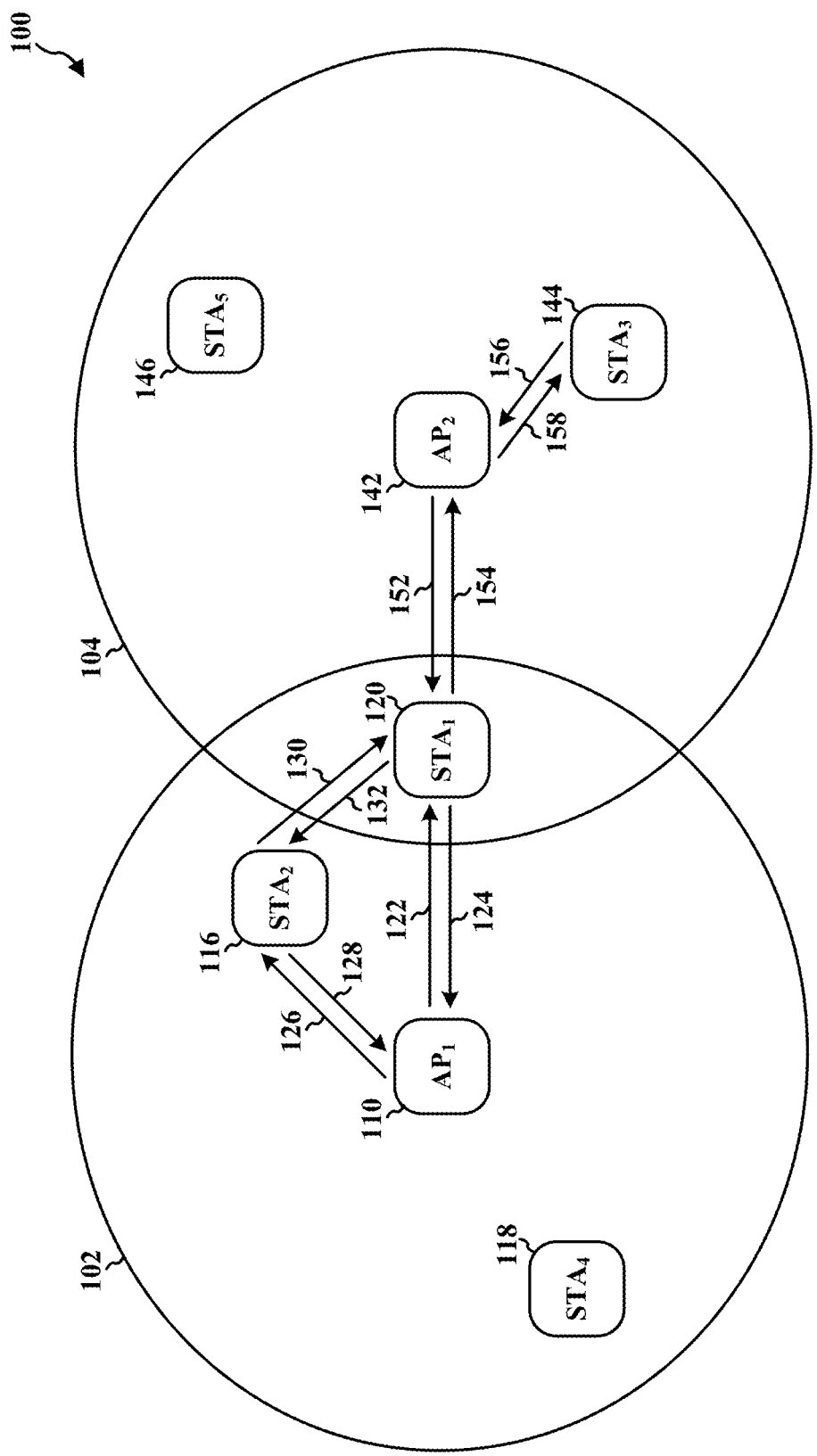
FIG. 1 is a diagram illustrating a non-limiting example of at least one wireless local area network (WLAN) according to some aspects of the present disclosure.

A wireless local area network (WLAN) may include one or more access points (APs) and/or one or more stations (STAs). In some aspects, the term(s) 'AP,' 'apparatus' (e.g., an apparatus of an AP), and/or 'computer-readable medium' (e.g., a computer-readable medium of an AP) may be, may reside within, and/or may refer to a router, a base station, a transmitter, a receiver, a base transceiver station, a radio base station, a radio transceiver, a network, a basic service set (BSS), an extended service set, a computing device, a user equipment (UE), a phone, a node, a mesh node, a Node B, a relay, a range extender, a peer, a device, a scheduler, one or more software modules, one or more computer-executable code/instructions, one or more computer-readable medium, one or more memory, one or more processor, one or more hardware components, one or more circuits or modules, any combination of any one or more of the foregoing items, and/or any other suitable term(s), any one or more of which may be suitable for performing any one or more of the methods, operations, steps, functions, features, and/or aspects described herein, e.g., with respect to AP 110.

In some aspects, the term(s) 'STA,' 'apparatus' (e.g., an apparatus of an STA), and/or 'computer-readable medium' (e.g., a computer-readable medium of an STA) may be, may reside within, and/or may refer to a laptop computer, a mobile phone, a cellular phone, a mobile station, a UE, a phone, a handset device, a subscriber station, a mobile unit, a wireless device, a smartphone, a remote device, a tablet device, a desktop computer, a terminal, a mobile client, a client device, a stationary device, a mesh node, a relay, a range extender, a peer device, a netbook, a notebook, a projector, a payment device, a display device, a global positioning system device, a multimedia device, a game console, a camera, a video-recorder, an entertainment device, a wearable computing device, glasses, a watch, headphones, computer peripherals, garage doors, garage door openers, wireless computer peripherals (e.g., mouse, keyboard, etc.), a fitness device, an appliance, a transport vehicle, a car, a sensor, a stationary battery-powered device, a device with a sensor, office equipment, home equipment, industrial equipment, a low-power device, an inventory tracking device, an Internet-of-Things (IoT) device, a smart-home device, a system-on-a-chip (SoC), a consumer electronics device, a schedule, an inventory monitoring device, a home environment monitoring device, an outdoor/environment monitoring device, a device used in automation, a device used in transportation, one or more software modules, one or more computer-executable code/instructions, one or more computer-readable medium, one or more memory, one or more processor, one or more hardware components, one or more circuits or modules, any combination of any one or more of the foregoing items, and/or any other suitable term(s), any one or more of which may be suitable for performing any one or more of the methods, operations, steps, functions, features, and/or aspects described herein, e.g., with respect to STA 120.

An AP may be configured to communicate downlink (DL) signals to one or more other apparatuses, such as one or more STAs. An STA may be configured to communicate uplink (UL) signals to one or more other apparatuses, such as one or more APs and/or one or more other STAs. DL communication may refer to any communication initiated by, originated at, communicated from, generated by, and/or transmitted by an AP and destined for, intended for, and/or received by an STA. UL communication may refer to any communication initiated by, originate at, communicated from, generated by, and/or transmitted by an STA and destined for, intended for, and/or received by an AP. An AP and STA may implement various communications protocols to implement the methods, operations, steps, functions, features, and/or aspects described herein without deviating from the scope of the present disclosure.

FIG. 1 is a diagram 100 illustrating a non-limiting example of at least one WLAN according to some aspects of the present disclosure. In the example illustrated in FIG. 1, $AP_1$ 110 has a coverage area 102 that at least partially overlaps with a coverage area 104 of $AP_2$ 142. The coverage area 102 of $AP_1$ 110 includes $STA_1$ 120, $STA_2$ 116, and $STA_4$ 118. The coverage area 104 of $AP_2$ 142 includes $STA_1$ 120, $STA_3$ 144, and STAs 146. FIG. 1 illustrates many DL communications 122, 126, 152, 158 and many UL communications 124, 128, 154, 156. Additionally or alternatively, STAs may communicate with each other via peer-to-peer transmissions 130, 132. Additional description related to certain communications is provided throughout the present disclosure.

Figure 2:
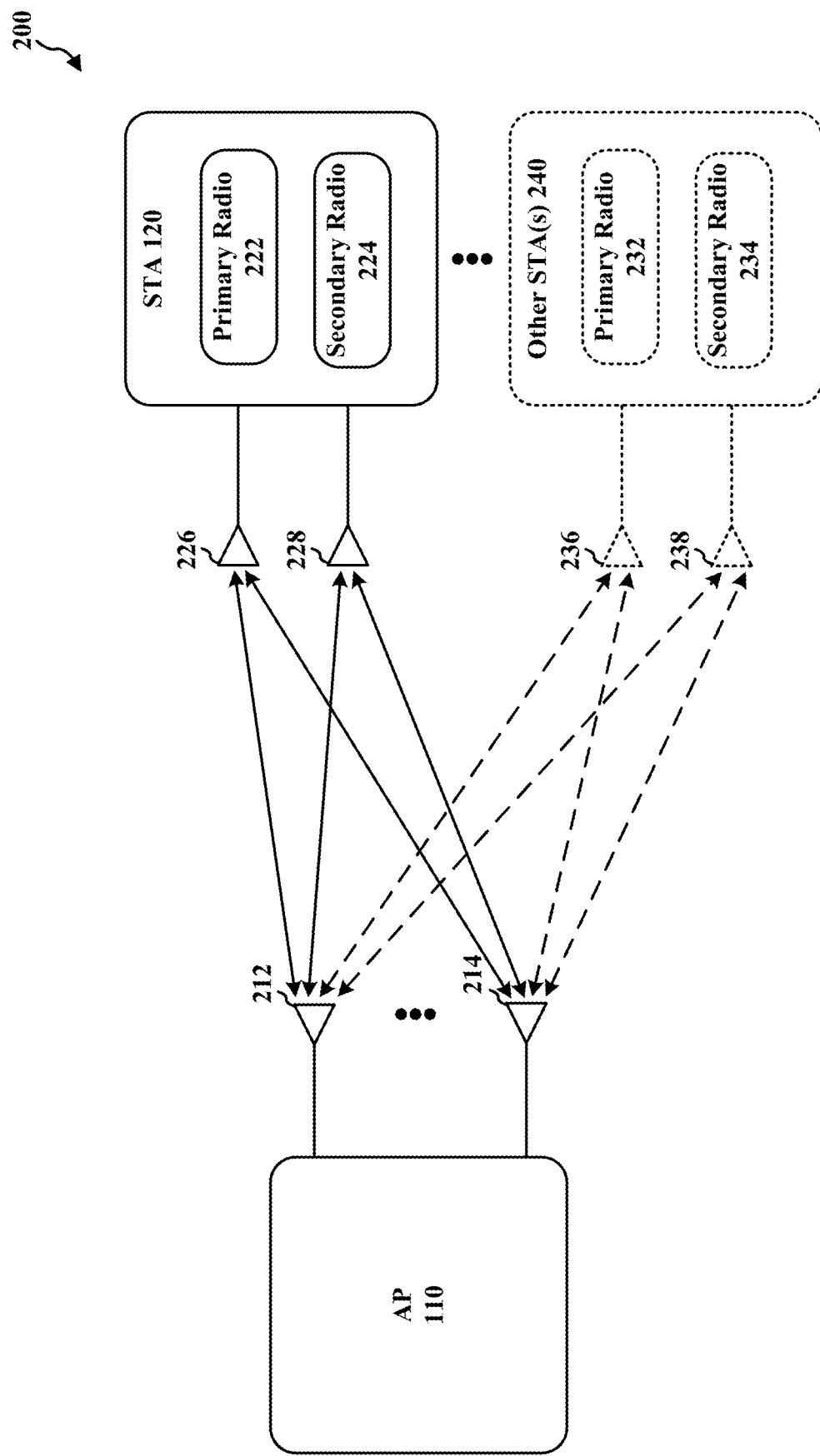
FIG. 2 is a diagram illustrating a non-limiting example of wireless communication between an access point (AP) and one or more stations (STAs) according to some aspects of the present disclosure.

FIG. 2 is a diagram 200 illustrating a non-limiting example of wireless communication between an AP and one or more STAs according to some aspects of the present disclosure. AP 110 may have one or more radios. AP 110 may have one or more antennas 212, 214. STA 120 may include a primary radio (PR) 222 and a secondary radio (SR) 224. STA 120 may include one or more antennas 226, 228. Without deviating from the scope of the present disclosure, STA 120 may have one or more PRs 222 and/or one or more SRs 224. Without deviating from the scope of the present disclosure, SR 224 may alternatively or interchangeably be referred to by various other terms, such as an awaken radio/receiver, a low-power radio/receiver, and/or various other suitable terms. In some aspects, SR 224 may be configured to sometimes consume less power than PR 222. In some aspects, SR 224 may consume and/or utilize less power, resources, etc. than consumed and/or utilized by PR 222.

In some aspects, an apparatus may include one or more receivers and/or antennas. In some aspects, the apparatus may have one or more primary/main receivers and/or one or more secondary receivers. A secondary receiver may also be referred to by various terms, such as an awaken radio/receiver, a low-power radio/receiver, and/or other terms. The secondary receiver(s)/radio(s) may consume and/or utilize less power, resources, etc. than the primary receiver(s)/radio(s). The secondary receiver(s) may be configured to awaken one or more primary/main receivers under certain circumstances, such as after/upon receiving a certain type of packet (e.g., an awaken packet). In some aspects, an apparatus may include one or more receivers and/or antennas.

One of ordinary skill in the art will understand that certain terms described/mentioned herein may be interchangeable without necessarily deviating from their respective meaning. The terms packet, frame, beacon, signal, transmission, communication, and/or various other suitable terms may be interchangeable without necessarily deviating from the scope of the present disclosure and/or without necessarily deviating from their respective meaning. The terms awaken packet, request packet, awaken request packet, and/or various other suitable terms may be interchangeable without necessarily deviating from the scope of the present disclosure and/or without necessarily deviating from their respective meaning. The terms request packet, awaken response packet, and/or various other suitable terms may be interchangeable without necessarily deviating from the scope of the present disclosure and/or without necessarily deviating from their respective meaning.

In some aspects, the apparatus may utilize one or more of the secondary receivers (e.g., awaken radio(s)/receiver(s)) to receive a packet while its primary/main receiver(s)/radio(s) is turned/powered off or in a low-power mode/state. In some aspects, the received packet may be (1) configured to trigger, awaken, turn on, and/or cause a high(er) power mode to occur for one or more of the receivers/radios (e.g., one or more primary/main radios/receivers) of the apparatus, and/or (2) configured to trigger a response packet. After, in response to, and/or in association with receiving such a packet, the apparatus may (1) awaken the one or more primary/main radios/receivers, and/or (2) cause a response packet to be communicated. If the main/primary radio(s)/receiver(s) is turned/powered off or in the low-power state/mode, the apparatus may refrain or be unable to transmit a corresponding transmission (e.g., response). In some aspects, the apparatus may transmit a power save poll frame. In some aspects, after transmitting such a frame, the apparatus may receive a data packet and subsequently transmit an acknowledgement frame/packet.

In some aspects, the receiver/STA may receive a packet. The packet may or may not include a preamble. The packet may be an awaken packet, a data packet, an uplink transmission request, a trigger packet, a beacon, and/or various other types of packets. In some aspects, the packet may be and/or may be encoded as an orthogonal frequency division multiplexing (OFDM) packet. In some aspects, the packet may be modulated using various keying/modulation techniques, such as frequency shift keying, amplitude shift keying, phase shift keying, on off keying, quadrature amplitude modulation, and/or various other types of modulation or keying/modulation techniques.

In some aspects, the awaken request packet may include various fields, parameters, indications, data, and/or other information without deviating from the scope of the present disclosure. In some aspects, the awaken request packet may include a field/parameter/indication/data/information indicating/corresponding to/associated with an indication, purpose, intention, objective, and/or other state/mode/configuration associated with the STA(s) that receives that awaken request packet. In some aspects, such indication, purpose, intention, objective, or other state/mode/configuration of the STA(s) may include a transmission, e.g., an UL transmission, of information/data, which may be corresponding to or be after, in response to, and/or in association with receipt of the awaken request packet. In such aspects, the STA(s) may communicate/transmit UL data/information without/before polling, or transmitting a poll message (e.g., a power save poll) to, the apparatus that communicated the awaken request packet, and/or without/before receiving a poll message (e.g., an uplink data poll) from the apparatus that communicated the awaken request packet.

In some aspects, such an indication, purpose, intention, objective, and/or other state/mode/configuration of the STA(s) may include a setting, configuration, or initialization of certain parameters of the STA(s) that may have received the awaken request packet. In such aspects, the STA(s) may communicate/transmit information indicating or corresponding to one or more preferences of the STA(s) (e.g., one or more preferences associated with settings/parameters/configurations of UL communication) without polling, or transmitting a poll message (e.g., a power save poll) to the apparatus that communicated the awaken request packet, and/or without/before receiving, from the apparatus that communicated the awaken request packet, information indicating or corresponding to one or more preferences of the STA(s) (e.g., one or more preferences associated with settings/parameters/configurations of UL communication).

A radio may communicate (e.g., transmit and/or receive data/information) using a wireless communication medium with another apparatus. The term 'radio' may refer to any set of one or more components that can be utilized to generate radio waves. Such components may include any one or more structures, modules, circuits, processors, algorithms, computer-readable medium, memory, interfaces, transceivers, antennas, and/or various other aspects, regardless of whether described herein, that can implement the various features, functions, operations, elements, methods, and/or aspects described herein. Non-limiting examples of such one or more components are described herein with reference to FIGS. 5 and 6 for AP 110 and STA 120, respectively. The various features, functions, operations, elements, methods, and/or aspects described herein may be implemented in varying designs for different radios without necessarily deviating from the scope of the present disclosure. The term 'radio' may alternatively or interchangeably be referred to as a receiver, a transmitter, a transceiver, a transceiver circuit, a radio circuit, and/or various other suitable terms. Although various examples provided herein describe STA 120 as including two radios (e.g., PR 222, SR 224), STA 120 may include any number of radios (e.g., more than two radios) without necessarily deviating from the scope of the present disclosure.

As illustrated in FIG. 1, STA 120 may communicate wirelessly with AP 110, and AP 110 may communicate wirelessly with STA 120 and, possibly, other STA(s) 240, which may have its/their own PR (e.g., PR 232, including or using antenna 236) and/or SR (SR 234, including or using antenna 238). Such communication(s) may include concurrent and/or independent streams (e.g., of data/information) to and from one or more apparatuses. Additional description related to various structures, modules, circuits, processors, algorithms, computer-readable medium, memory, interfaces, transceivers, antennas, and various other aspects of AP 110 and STA 120 is provided throughout the present disclosure, including description provided herein with respect to FIG. 5 and FIG. 6, respectively.

Figure 3:
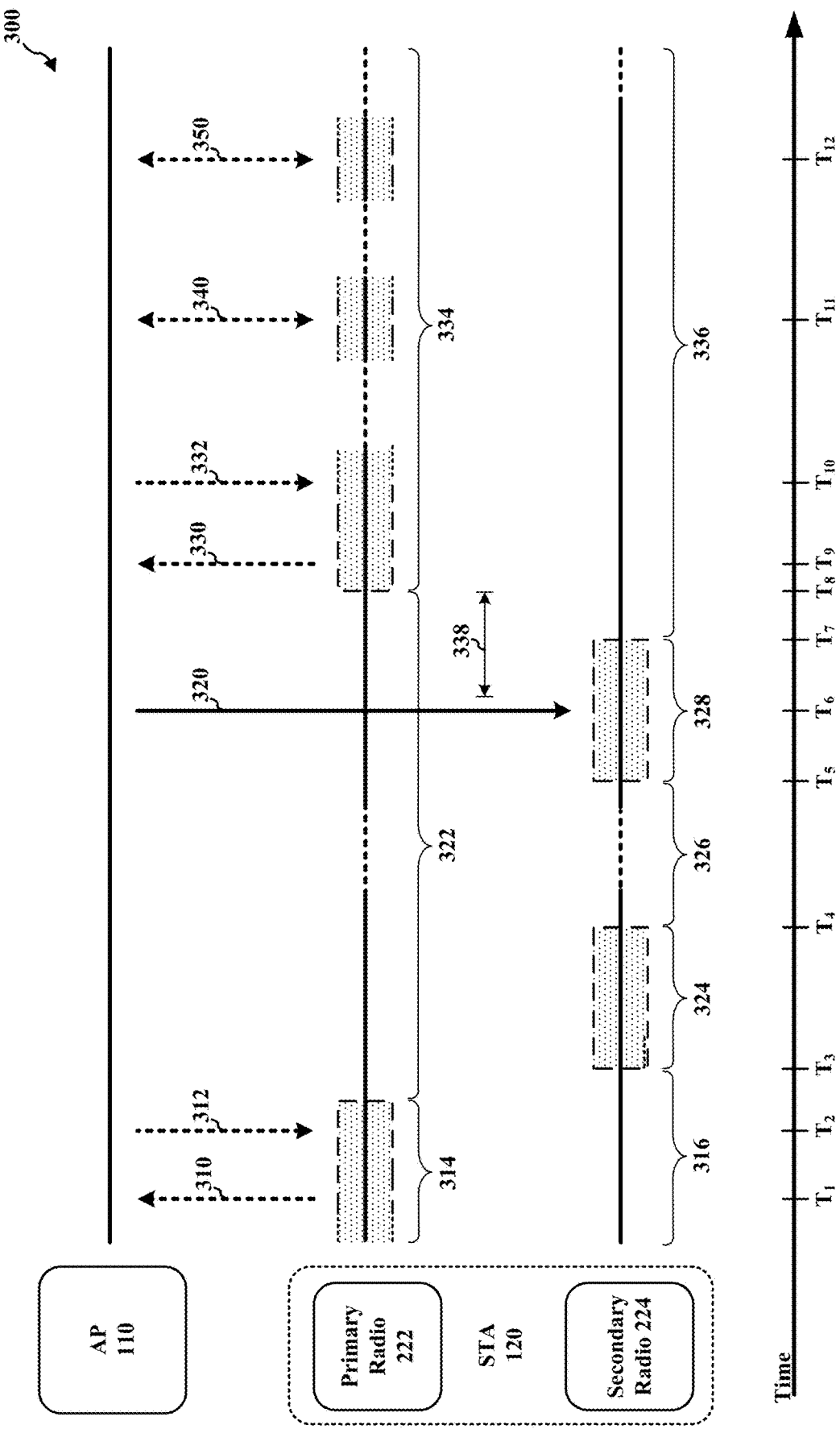
FIG. 3 is a diagram illustrating a non-limiting example of various communications at various times according to some aspects of the present disclosure.

FIG. 3 is a diagram 300 illustrating a non-limiting example of various communications at various times according to some aspects of the present disclosure. FIG. 3 is a diagram 300 illustrating non-limiting examples of various communications between AP 110 and STA 120 according to various aspects of the present disclosure. In some aspects, at one or more times (e.g., including $T_1$ and/or $T_2$), AP 110 may communicate with STA 120. In some aspects, such communications may pertain to capabilities, parameters, settings, configurations, and other aspects that may affect one or more states, modes, configurations, parameters and/or future communications between AP 110 and STA 120.

In some aspects, AP 110 and STA 120 may negotiate various parameters, settings, and/or configurations, which may relate to operation(s) of AP 110, STA 120, PR 222 and/or SR 224. In some aspects, at time $T_1$, STA 120 may transmit and AP 110 may receive an UL communication 310. In some aspects, the UL communication 310 may be or include a request, a request packet, a timing management signal, a timing signal, and other suitable terms without deviating from the scope of the present disclosure. Various aspects related to such UL communication 310 are provided in greater detail throughout the present disclosure. In some aspects, at time $T_2$, AP 110 may transmit and STA 120 may receive a DL communication 312. In some aspects, the DL communication 312 may be or include a response, a response packet, a timing management signal, timing signal, and other suitable terms without deviating from the scope of the present disclosure. Various aspects related to such DL communication 312 are provided in greater detail throughout the present disclosure.

Although UL communication 310 is illustrated as a single communication, and DL communication 312 is illustrated as a single communication, multiple UL communications and/or multiple DL communications can be implemented without deviating from the scope of the present disclosure. Any or all aspects described herein with reference to an 'UL communication 310' and/or 'DL communication 312' can be respectively included in a singular DL communication 310 and/or singular UL communication 312 (as shown in FIG. 3) or alternatively included in discrete/separate UL communications and/or discrete/separate DL communications taking place at varying times (even though not shown in FIG. 3) without deviating from the scope of the present disclosure. In other words, any description provided herein with reference to an 'UL communication 310' may be included in a singular UL transmission or included in different UL communications occurring at different times, and/or any description provided herein with reference to 'DL communication 312' may be included in a singular DL transmission or included in different DL communications occurring at different times.

In some aspects, STA 120 may utilize PR 222 for UL communication 310 and/or DL communication 312, but STA 120 may alternatively utilize its SR 224 for UL communication 310 and/or DL communication 312 without deviating from the scope of the present disclosure. Although the illustration provided in FIG. 3 depicts that, in some aspects, such UL communication 310 may occur prior to such DL communication 312, this may not necessarily be a limitation of the present disclosure. For example, in some aspects, such DL communication 312 may occur prior to such UL communication 310 without deviating from the scope of the present disclosure. Although the illustration in FIG. 3 depicts that, in some aspects, both UL communication 310 and such DL communication 312 can occur, this may not necessarily be a limitation of the present disclosure. For example, in some aspects, such UL communication 310 may occur without such DL communication 312 ever occurring, and, in some other aspects, such DL communication 312 may occur without such UL communication 310 ever occurring.

In some aspects, certain communications (e.g., DL communication 310 and/or UL communication 312) may occur while PR 222 222 is in a high power state/mode 314. In some aspects, certain communications (e.g., DL communication 310 and/or UL communication 312) may occur while the SR 224 is in a low power state/mode 316. Generally, the term 'high power state/mode' may alternatively or interchangeably be referred to as an active state/mode, awake state/mode, an on state/mode, a powered up/on state/mode, a turned up/on state/mode, and/or various other suitable terms without deviating from the scope of the present disclosure. In some aspects, the term 'high power state/mode' may refer to a state/mode in which the power utilized (e.g., by PR 222 and/or SR 224) is above or greater than a certain threshold value (e.g., threshold power value). Generally, the term 'low power state/mode' may alternatively or interchangeably be referred to as a doze state/mode, a power-save state/mode, an off state/mode, a powered down/off state/mode, a turned down/off state/mode, and/or various other suitable terms without deviating from the scope of the present disclosure. In some aspects, the term 'low power state/mode' may be referred to as a state/mode in which no/zero power is utilized (e.g., by PR 222 and/or SR 224). In some aspects, the term 'low power state/mode' may refer to a state/mode in which the power utilized (e.g., by PR 222 and/or SR 224) is below or less than a certain threshold value (e.g., threshold power value).

In some aspects, the PR 222 may sometimes alternate between a high power state/mode 314, 334 and a low power state/mode 322. Such alternating may occur when STA 120 or its PR 222 is in a power-save state/mode or a duty cycle state/mode. Although such alternating is illustrated in FIG. 3, in some aspects, the PR 222 may not perform such alternating and may be in a, e.g., continuous high power state/mode (e.g., without the low power state/mode 322). In some aspects, the SR 224 may sometimes alternate between a high power state/mode 324, 328 and a low power state/mode 316, 326, 336. Such alternating may occur when STA 120 or its SR 224 is in a power-save state/mode or a duty cycle state/mode. Although such alternating is illustrated in FIG. 3, in some aspects, the SR 224 may not perform such alternating and may be in a, e.g., continuous high power state/mode (e.g., without the low power state/mode 326). Various aspects pertaining to certain states, modes, configurations, and parameters associated with operation(s) of STA 120, the PR 222, and/or the SR 224 is provided throughout the present disclosure.

In some aspects, STA 120 may await receipt, e.g., at/including times $T_3$, $T_4$ and $T_5$, which may be while the PR 222 is in the low power state/mode 322. In some aspects, at time $T_6$, AP 110 may transmit and STA 120 may receive a packet 320. In some aspects, the SR 224 receives the packet 320 while the SR 224 is in a high power state/mode 328. In some aspects, the PR 222 may be in a while low power state/mode 322 when AP 110 transmits and STA 120 (e.g., utilizing SR 224) may receive the packet 320. In some aspects, the packet 320 may alternatively or interchangeably be referred to as an awaken packet, an awake packet, an awaken request packet, and/or various other suitable terms without deviating from the scope of the present disclosure. Various aspects related to the packet 320 and operations by STA 120 in relation to the packet 320 are provided throughout the present disclosure.

In some aspects, following communication of the packet 320, STA 120 may initiate, e.g., at time $T_7$, a transition of the PR 222 from a low power state/mode 322 to a high power state/mode 334. For example, after a transition period 338, the PR 222 may be in a high power state/mode 334 by time $T_8$. In some aspects, the SR 224 may be in a low power state/mode 336 after the PR 222 transitions to a high power state/mode 334.

In some aspects, at time $T_9$, STA 120 (e.g., utilizing PR 222) may transmit and AP 110 may receive a message 330. In some aspects, at time $T_{10}$, AP 110 may transmit and STA 120 (e.g., utilizing PR 222) may receive a response packet 332. Various aspects pertaining to such packets 330, 332 are provided throughout the present disclosure. In some aspects, at time $T_{11}$, AP 110 and STA 120 (e.g., utilizing PR 222) may perform UL and/or DL communication of various information 340, possibly including data packets with payloads. In some aspects, at time $T_{12}$, AP 110 and STA 120 (e.g., utilizing PR 222) may communicate information configured to suspend or disregard certain negotiated parameters, settings, and/or configurations, which may relate to operation(s) of AP 110, STA 120, PR 222 and/or SR 224.

Although FIG. 3 depicts various aspects, including various communications (e.g., 310, 312, 320, 330, 332, 340, 350) possibly occurring at various times (e.g., $T_1$, $T_2$, . . . $T_{12}$) while one or more radios (e.g., 222, 224) of STA 120 may be in various states/modes, modes, or configurations (e.g., 314, 322, 334, 316, 324, 326, 328, 336), such various aspects are provided to facilitate description of just a few of the many combinations, mixtures, and permutations of such various aspects that can exist without deviating from the scope of the present disclosure. In some aspects, fewer than all of such various aspects can exist without deviating from the scope of the present disclosure, and any combination, mixture, or permutation of any one or more of such various aspects is within the scope of the present disclosure. For example, although FIG. 3 depicts that various communications (e.g., 310, 312, 320, 330, 332, 340, 350) may occur, it is possible for one or more of such communications to not occur without deviating from the scope of the present disclosure, and it is alternatively or additionally possible for one or more additional communication (not described herein) to occur without deviation from the scope of the present disclosure. Any indications of time are merely provided for illustrative purposes, and such indications are not necessarily to scale, not necessarily intended to limit the sequence or order of such communications, nor necessarily provided to suggest that certain communications have to occur at certain specific times.

Figure 4:
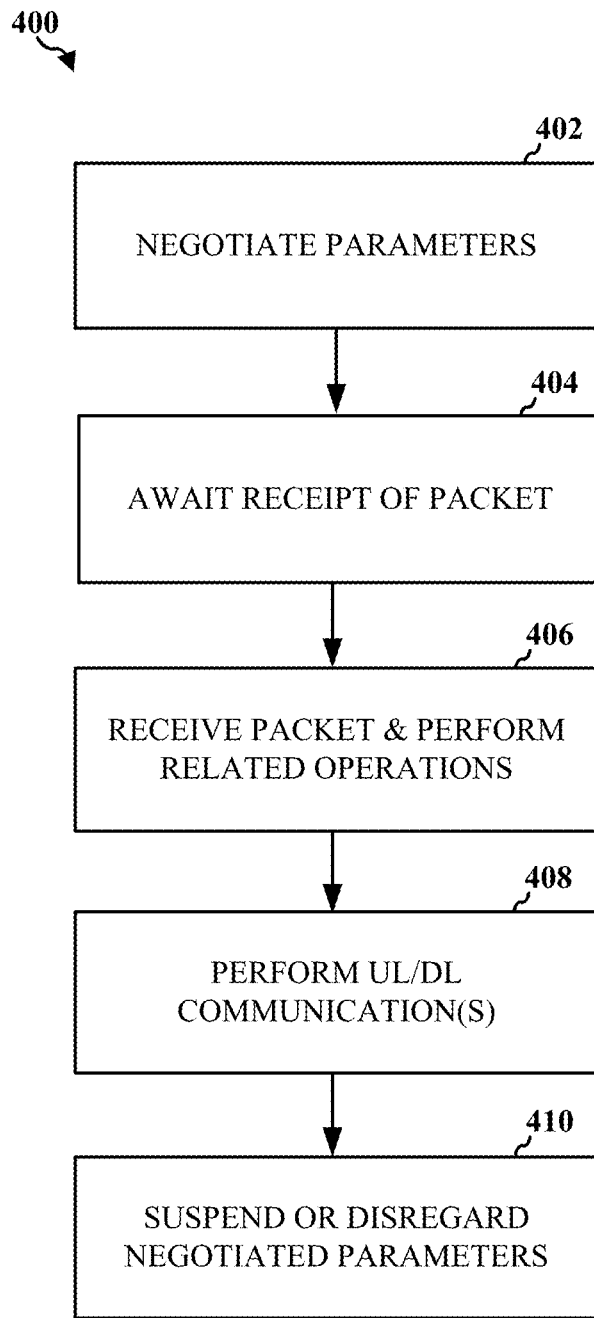
FIG. 4 is a diagram illustrating a non-limiting example of various operations according to some aspects of the present disclosure.

FIG. 4 is a diagram 400 illustrating a non-limiting example of various operations according to some aspects of the present disclosure. In some aspects, at block 402, an apparatus (e.g., AP 110 and/or STA 120) may negotiate various parameters, settings, and/or configurations, which may relate to operation(s) of AP 110, STA 120, PR 222, and/or SR 224.

In some aspects, the UL communication 310 may be or include a request packet. In some aspects, the DL communication 312 may be or include a response packet. In some aspects, STA 120 may use PR 222 to transmit, and AP 110 may receive, a request packet. After or in response to transmitting the request packet, AP 110 may transmit and STA 120 may use PR 222 to receive a response packet. In some aspects, the request packet and/or the response packet include information corresponding to or configured for negotiating one or more parameters associated with one or more power modes, states, or configurations of SR 224. In some aspects, the request packet and/or the response packet include information corresponding to a duty cycle of SR 224. In some aspects, the duty cycle of SR 224 includes turning/powering on/off the SR 224 or SR 224 entering into a low/lower state mode and/or a high/higher power state/mode. In some aspects, the request packet and/or the response packet includes information corresponding to timing for turning on SR 224 or SR 224 entering/being in a high power state/mode.

In some aspects, the apparatus may transmit a packet, such as a request packet (e.g., an awaken request packet). After, in response to, and/or in association with transmitting such a packet, the apparatus may receive a response packet (e.g., an awaken response packet). In some aspects, the communication (e.g., reception and/or transmission) of such a request packet and/or such a response packet may be performed using the main/primary receiver(s)/radio(s) (described above). In some aspects, the communication (e.g., reception and/or transmission) of such a request packet and/or such a response packet may be performed using the secondary radio(s)/receiver(s) (described above).

In some aspects, such a request packet and/or response packet may include information (e.g., one or more fields) corresponding to awakening one or more primary/main receivers of the apparatus under certain circumstances, such as after/upon receiving a certain type of packet (e.g., an awaken packet).

In some aspects, such a packet (e.g., awaken packet) may be (1) configured to trigger, awaken, turn on, and/or cause a high(er) power mode to occur for one or more of the receivers/radios (e.g., one or more primary/main radios/receivers) of the apparatus, and/or (2) configured to trigger a response packet. As described above, after, in response to, and/or in association with receiving such a packet, the apparatus may (1) awaken the one or more primary/main radios/receivers, and/or (2) cause a response packet to be communicated.

In some aspects, the request packet (e.g., awaken request packet) and/or response packet (e.g., awaken response packet) may include information corresponding to, be communicated for, and/or configured for negotiating/determining one or more parameters (e.g., duration (e.g., of one or more communications described herein), timing (e.g., of one or more communications described herein), acknowledgement policy/protocol/procedure (e.g., of one or more communications described herein), an (awaken) beacon interval (described herein) (e.g., when, how often, and/or for how long an awaken beacon is communicated, e.g., by the secondary receiver(s)/radio(s), even though the awaken request packet and/or awaken response packet may be communicated using/utilizing the primary receiver(s)/radio(s)), duty cycle, timeout interval (e.g., between two awaken packets, etc.) associated with communication of an awaken packet, one or more power states/modes (e.g., turned on/off, etc.) of the primary receiver(s)/radio(s) and/or secondary receiver(s)/radio(s), and/or various other suitable aspects of communication be the primary and/or secondary receiver(s)/radio(s) of the apparatus.

In some aspects, such a request packet and/or such a response packet may include one or more fields. In some aspects, such field(s) may include information corresponding to one or more awaken actions, one or more awaken modes, one or more awaken responses, an identifier (e.g., token, key, ID, etc.) corresponding to and/or identifying a communication and/or a transaction associated with the aforementioned request packet and/or response packet, information corresponding to timing for turning on a primary and/or secondary radio(s)/receiver(s) of the apparatus when/if/following/upon/after receiving an awaken packet by the apparatus, information corresponding to a duty cycle of (e.g., turning/power on or off, entering into a low (er)/high(er) power mode, etc.) the primary and/or secondary receiver(s)/radio(s) of the apparatus.

In some aspects, an apparatus may receive and/or transmit a frame configured to communicate mode signaling or a request by the apparatus to enter/exit/switch-to (or to be signaled to enter) a particular mode (e.g., an awaken mode, as described herein). In some aspects, the apparatus may enter/exit/switch-to a particular mode (e.g., an awaken mode, as described herein) without explicit signaling (e.g., without receiving and/or transmitting a particular frame configured to communicate mode signaling or a request by the apparatus to enter/exit/switch-to (or to be signaled to enter) a particular mode. In some aspects, an apparatus (e.g., STA) may receive a packet (e.g., an awaken request packet, as described herein) (e.g., using its secondary/awaken radio/receiver), while in an awaken mode (as described herein). After, in response to, and/or in association with receiving the awaken request packet, the apparatus (e.g., STA) may enter into an active/normal mode (or power up/on or put in a non-low (e.g., normal/high) power state its main/primary radio/receiver) and initiate communication (e.g., DL or UL) with another apparatus (e.g., AP). In some aspects, the apparatus (e.g., STA) may receive data (e.g., a data packet/frame, perhaps with a data subfield in the data packet/frame set/equal to zero), e.g., using it primary/main radio/receiver. After, or in response to, and/or in association with receiving that data/data-packet/data-frame, without explicit signaling to/from the other apparatus (e.g., AP) (e.g., without receiving a signal/frame/packet indicating or requesting a transition/switch/change of a mode of operation (e.g., a transition/switch to or from an awaken mode) of the apparatus (e.g., STA)), the apparatus (e.g., STA) may switch-to/transition (back)/(re) enter an awaken mode (as described herein), e.g., if/only-if/provided-that an operating parameter of the secondary/awaken radio/receiver has not been changed/altered to require otherwise.

In some aspects, an apparatus (e.g., STA) may be ready (e.g., have in its queue) for UL transmission/communication of a packet/frame while in an awaken mode (as described in herein). In such aspects, without explicit signaling to/from the other apparatus (e.g., AP) (e.g., without receiving a signal/frame/packet indicating or requesting a transition/switch/change of a mode (of operation) (e.g., a transition/switch to or from an awaken mode) of the apparatus (e.g., STA)), the apparatus (e.g., STA) may transmit the data (e.g., data packet/frame) buffered/ready for UL transmission/communication (e.g., to the other apparatus (e.g., AP)) (e.g., following a contention period). After communicating/transmitting the buffered/ready data, the apparatus may receive an acknowledgement (ACK) message from the other apparatus (e.g., AP). After, in response to, and/or in association with receiving the (e.g., DL) acknowledgement (ACK) message from the other apparatus (e.g., AP), e.g., using it primary/main radio/receiver, without explicit signaling to/from the other apparatus (e.g., AP) (e.g., without receiving a signal/frame/packet indicating or requesting a transition/switch/change of a mode (of operation) (e.g., a transition/switch to or from an awaken mode) of the apparatus (e.g., STA)), the apparatus (e.g., STA) may switch-to/transition (back)/(re) enter an awaken mode (as described herein), e.g., if/only-if/provided-that an operating parameter of the secondary/awaken radio/receiver has not been changed/altered to require otherwise.

In some aspects, one or more identifiers (e.g., the first identifier and/or the second identifier) that identify/identifies the receiver (e.g., an intended/destined receiver) of that packet (e.g., awaken packet, awaken request packet, etc.) may include an identifier (e.g., awaken(ed) receiver identifier) that is unique/specific to a particular receiver within a particular basic service set. In some aspects, one or more identifiers (e.g., the first identifier and/or the second identifier) that identify/identifies the transmitter (e.g., that transmitted the packet, awaken packet, awaken request packet, etc.) may include, correspond to, be associated with, or bear a relationship to a basic service set identifier and/or basic service set color/category/grouping with which the transmitter and/or receiver is associated.

In some aspects, the UL communication 310 may be or include a timing management signal. In some aspects, STA 120 may transmit and AP 110 may receive a timing management signal configured to set or affect timing information, including a duration of time to operate SR 224 in a high power state/mode or to maintain or power on/up SR 224 (e.g., in a high power state/mode), corresponding to communication of the packet 320 (e.g., awaken packet) and/or its response 330 (e.g., response to awaken packet). In some aspects, STA 120 may transmit and AP 110 may receive a timing management signal configured to set or affect a timing aspect, including a duration of time to operate SR 224 in a high power state/mode or to maintain or power on/up SR 224 (e.g., in a high power state/mode). In some aspects, STA 120 may transmit and AP 110 may receive a timing management signal configured to set or affect timing aspects, including a start time, a duration, and/or an end time, of operating SR 224 in a high power state/mode or powering/turning on/up SR 224 (e.g., in a high power state/mode).

In some aspects, the DL communication 312 may be or include a timing management signal. In some aspects, AP 110 may transmit and STA 120 may (e.g., using PR 222) receive a timing management signal configured to set or affect a beginning time corresponding to receiving of the packet 320 (e.g., awaken request packet). In some aspects, AP 110 may transmit and STA 120 may (e.g., using PR 222) receive a timing management signal and, based on the received timing management signal, set or affect timing aspects, including a beginning time, a duration, and/or an end time, of operating SR 224 in a high power state/mode or of powering/turning up/on SR 224 (e.g., in a high power state/mode). In some aspects, AP 110 may transmit and STA 120 may (e.g., using PR 222) receive a timing management signal configured to set or affect timing information, including a duration of time to operate SR 224 in a high power state/mode or to maintain or power on/up SR 224 (e.g., in a high power state/mode), corresponding to communication of the packet 320 (e.g., awaken packet) and/or its response 330 (e.g., response to awaken packet). In some aspects, the timing management signal (e.g., of the UL communication 310 and/or DL communication 312) includes a sequence modulated by on off keying.

In some aspects, the apparatus may receive a timing management signal. The timing management signal may include, be utilized for, and/or be configured to set, modify, adjust, confirm, and/or otherwise affect timing information (e.g., a start/starting time, a beginning time, an end/ending time, a duration, a time period, a timing offset, timing information or a start time of a subsequent timing management signal, a duration of time to maintain or power/turn on/up a primary/main and/or secondary radio(s)/receiver(s), etc.) corresponding to communication (e.g., reception/transmission) of the (e.g., current or one or more subsequent) awaken packet(s) and/or response packet(s) by the apparatus. In some aspects, the apparatus may set, modify, adjust, confirm, and/or otherwise affect a timing aspect e.g., a start/starting time, a beginning time, an end/ending time, a duration, a time period, a timing offset, timing information or a start time of a subsequent timing management signal, a duration of time to maintain or power/turn on/up a primary/main and/or secondary radio(s)/receiver(s), etc.) of powering/turning/keeping-powered on/up of the primary/main radio(s)/receiver(s) and/or secondary radio(s)/receiver(s) based on the timing management signal.

In some aspects, the timing management signal may comprise a sequence modulated by any of the keying/modulation techniques, such as frequency shift keying, amplitude shift keying, phase shift keying, on off keying, quadrature amplitude modulation, and/or various other types of modulation or keying/modulation techniques. In some aspects, the timing management signal may be detected by the secondary radio(s)/receiver(s) without utilizing the primary/main radio(s)/receiver(s) (e.g., while the primary/main radio(s)/receiver(s) is powered/turned off/down). In some aspects, the timing management signal may be communicated (e.g., received) periodically.

In some aspects, the apparatus may detect/determine that the timing management signal was not received (e.g., during an expected time/time-period, based on its periodicity). In response, the apparatus may modify, update, revise, and/or alter a timing aspect (e.g., a start/starting time, a beginning time, an end/ending time, a duration, a time period, a timing offset, etc.) of its primary/main receiver(s)/radio(s) and/or secondary receiver(s)/radio(s). In some aspects, this may be performed in a manner that increases a likelihood that a subsequent timing management signal will be received/detected by the apparatus and/or its primary/secondary radio(s)/receiver(s). In some aspect, the likelihood may be increased by increasing the power on/up duration/period of the primary/main radio(s)/receiver(s) and/or secondary radio(s)/receiver(s) (relative to a preceding power on/up duration/period of the primary/main radio(s)/receiver(s) and/or secondary radio(s)/receiver(s)).

In some aspects, the DL communication 312 includes a packet (e.g., request packet) that includes a parameter corresponding to a mode/state associated with STA 120. In some aspects, AP 120 transmits and STA 120 receives (e.g., using PR 222) the packet (e.g., request packet) that includes the parameter corresponding to a mode associated with STA 120, and STA 120 waits, based on the received parameter, to operate PR 222 in a high power state/mode or to turn on/up PR 222 until a time that corresponds to that mode/state.

As described herein, a packet (e.g., awaken request packet) may sometimes be referred to as a frame (e.g., awaken frame), beacon (e.g., awaken beacon), signal (e.g., awaken signal), transmission (e.g., awaken transmission), communication (e.g., awaken communication), and/or various other suitable terms without necessarily deviating from the scope of the present disclosure. In some aspects, a packet (e.g., awaken request packet) and/or a beacon (e.g., awaken beacon) may include a field/parameter/indication/data/information indicating/corresponding to/associated with an indication, purpose, intention, objective, and/or other state/mode/configuration associated with the STA(s) that receives that packet and/or beacon. After, in response to, and/or in association with receiving such and/or based on such field/ parameter/indication/data/information, an apparatus (e.g., STA(s) may wait to turn-on/activate/enable/duty-cycle-on/power-up/power-on its primary/main radio/receiver and/or secondary radio/receiver until a time/duration/period that corresponds to the indication, purpose, intention, objective, or other state/mode/configuration. For example, if such indication, purpose, intention, objective, and/or other state/mode/configuration indicates a time/duration/period that a subsequent/next/later DL communication of interest will be transmitted from one apparatus (e.g., AP) to another apparatus (e.g., that/those STA(s)), then the apparatus (e.g., STA(s)) may determine to not turn-on/activate/enable/duty-cycle-on/power-up/power-on its primary/main and/or its secondary radio/receiver until a time/period/duration that corresponds to that DL communication of interest, which can conserve power that might otherwise be expended during a corresponding duration/period of time.

Such subsequent/next/later DL communication may or may not be the DL communication that immediately follows DL communication of the aforementioned packet (e.g., awaken request packet) and/or beacon (e.g., awaken beacon). For instance, one or more DL communications (e.g., not of interest to that/those STA(s)) may occur in between that packet/beacon and the DL communication of interest. Non-limiting examples of such DL communication(s) of interest may include but may not be limited to another packet, another beacon, another signal, another transmission, which may or may not include information/parameter/field/indication corresponding to traffic information (e.g., traffic information message), delivery information (e.g., delivery traffic information message), a group identifier/address information (e.g., associated identifier message), receiver/reception information (e.g., receiver/reception indication), on-duration information (e.g., a duration/period of time to maintain one or more of its radio(s)/receiver(s) in an on/powered-on/powered-up), and/or various other suitable types of information.

In some aspects, the DL communication 312 may be or include a packet (e.g., request packet) that includes an indication that indicates a process to perform in relation to awakening PR 222. In some aspects, awakening PR 222 may refer to transitioning PR 222 from being in a low/lower power state/mode to a high/higher power state/mode. In some aspects, awakening PR 222 may refer to switching from operating PR 222 in a low/lower power state/mode to operating PR 222 in a high/higher power state/mode. As described in greater detail herein, in some aspects, a low/lower power state/mode may refer to operating a radio (e.g., PR 222 and/or SR 224) according to a power state/mode that is less than a threshold power value, and/or a high/higher power state/mode may refer to operating a radio (e.g., PR 222 and/or SR 224) according to a power state/mode that is greater than a threshold power value.

In some aspects, AP 110 may transmit and STA 120 may use SR 224 to receive a packet (e.g., request packet) that includes an indication that indicates a process to perform in relation to awakening PR 222. In some aspects, the process incudes PR 222 and/or SR 224 entering into an awaken mode, in which at least PR 222 is in a high power state/mode or is powered up/on or SR 224 is in a low power state/mode or is powered down/off. In some aspects, the process includes using PR 222 to negotiate parameters with AP 110 for entering into an awaken mode, in which at least PR 222 is in a low power state/mode or is powered down/off or SR is in a high power state/mode or is powered up/on. In some aspects, after performing such process, STA 120 may enter into the awaken mode.

In some aspects, the primary/main and/or secondary/awaken receiver/radio of an apparatus may receive an awaken request packet that includes an indication/indicia/field/frame/portion that indicates an action/process/operation to perform in relation to awakening the primary/main and/or secondary/awaken radio. For example, such an action/process/operation may include that the apparatus or its primary/main and/or secondary/awaken radio will (1) enter into an awaken mode (e.g., a mode in which the primary/main radio/receiver and/or secondary/awaken radio/receiver is powered down/off (e.g., relatively low power state) or powered up/on (e.g., in a relatively high/normal power state)), (2) receive/transmit or negotiate (e.g., parameters) from/with another apparatus (e.g., AP) for entering into an awaken mode (as described herein), (3) (i) receive/transmit or negotiate (e.g., parameters) from/with another apparatus (e.g., AP) for entering into an awaken mode (as described herein)) and subsequently (ii) enter into an awaken mode (as described herein), or (4) terminate, end, or exit an awaken mode (as described herein).

In some aspects, AP 110 and STA 120 may utilize the UL communication 310 and/or DL communication 312 to communication information that is any one or more of the following: indicating a period of time (e.g., transition period 338) corresponding to transitioning from a first state comprising a doze state or low power state/mode to a second state comprising an awake state or a high power state/mode; channel information associated with SR 224; duty cycle information, which may include a duty cycle preferred by STA 120; beacon information; one or more class of operation; and/or one or more supported operations. In some aspects, in accordance with any one or more of such communicated information, STA 120 may transition from the first state to the second state.

In some aspects, an apparatus (e.g., AP and/or STA) may transmit, receive, and/or negotiate a field, parameter, data, information, information element, or indication indicating a period of time corresponding to/associated with transitioning from a/one state (e.g., awake, doze, power save, or active state) to another state (e.g., awake, doze, power save, or active state) after, in response to, and/or in association with transmitting, receiving, and/or negotiating a particular packet, data packet, transmission, or other information, such as an awaken packet, request packet, or awaken request packet. In some aspects, an apparatus (e.g., AP and/or STA) may perform an operation (e.g., transition from one state/mode to another state/mode) in accordance with such field, parameter, data, information, information element, or indication.

In some aspects, an apparatus (e.g., AP and/or STA) may transmit, receive, and/or negotiate a field, parameter, data, information, information element, or indication indicating one or more settings/parameters/capabilities of that apparatus (e.g., AP and/or STA) in relation to a power mode, mode of operation, an operation, and/or communication parameters/settings while operating in or transition from/to a particular mode (e.g., power save mode, awake mode, doze mode, or active mode). Such settings/parameters/capabilities may include channel state information (e.g., associated with the main/primary and/or secondary radio/receiver), channel information (e.g., associated with the main/primary and/or secondary radio/receiver), a group identifier (e.g., a group of APs and/or STAs), an individual identifier (e.g., of the apparatus (e.g., a transmitting/receiving/destined/intended AP/STA), its primary/main radio/receiver, or it secondary radio/receiver), duty cycle information (e.g., a preferred/requested duty cycle by the apparatus, a mandatory/ assigned duty cycle to the apparatus, etc.) (wherein duty cycle information may include an absolute or relative period of time that the main/primary and/or secondary receiver/radio is ON in relation to or as compared to an absolute or relative period of time that the main/primary and/or secondary receiver/radio is OFF), symbol information, beacon information, a class of operations, supported operations, or other suitable aspects. In some aspects, an apparatus (e.g., AP and/or STA) may perform an operation (e.g., transition from one state/mode to another state/mode, operate in a particular state/mode, etc.) in accordance with such field, parameter, data, information, information element, or indication.

In some aspects, an apparatus (e.g., AP/STA) may receive/transmit information that incorporate, integrate, encode, combine, merge, embed, or otherwise include information associated with a basic service set (e.g., to which that apparatus (e.g., AP) or another apparatus (e.g., that receiving STA, another STA, etc.) is associated) in/within/into a number, value, field, parameter, or other data portion (e.g., a data portion that is included in an end portion of a communication/transmission (e.g., instead of having an explicit data portion that includes only such information associated with the basic service set)). In some aspects, such number, value, field, parameter, or other data portion includes information that serves more than one function, wherein one of the more than one function is to provide information associated with the basic service set. Such number, value, field, parameter, or other data portion may be, for example, an error-detecting code/value/number, a cyclic redundancy check value/number/sequence/code, a frame check sequence/value/number/code. In some aspects, an apparatus may, based on such number, value, field, parameter, or other data portion, determine two or more information, wherein at least one of such information includes information associated with the basic service set (e.g., the apparatus may determine whether the data packet, field, information, etc. that included such number, value, field, parameter, or other data portion was destined to that apparatus (e.g., the apparatus that received it) based on such information associated with the basic service set) (e.g., the apparatus may determine whether the data packet, field, information, etc. that included such number, value, field, parameter, or other data portion is associated with the basic service set to which the that apparatus (e.g., the apparatus that received it) is associated) (e.g., the apparatus may obtain or associate its basic service set information from the basic service set information included in the data packet, field, information, etc. that included such number, value, field, parameter, or other data portion was destined to that apparatus (e.g., the apparatus that received it)).

In some aspects, the UL communication 310 may be or include a field indicating a duration of time during which SR 224 will operate according to a high/higher power state/mode or on-mode during/for the one or more subsequent/future communications. Accordingly, in some aspects, STA 120 may transmit (e.g., using PR 222) and AP 110 may receive the field indicating a duration of time during which SR 224 will operate according to a high/higher power state/mode or on-mode during the one or more subsequent/future communications. In some aspects, such subsequent/future communications may include communication of the packet 320, and such high/higher power state/mode or on-mode may occur when SR 224 is in the high power states/modes 324, 328.

In some aspects, e.g., utilizing UL communication 310 and/or DL communication 312, AP 110 and/or STA 120 may communicate a frame that includes a field indicating whether STA 120 is capable of receiving a first subsequent/future communication using a first attribute, including at least one of a communication channel, frequency range, center frequency, or bandwidth. In some aspects, the first subsequent/future communication comprises a beacon. In some aspects, AP 110 may transmit and STA 120 may receive a second subsequent/future communication using a second attribute that is different from the first attribute. For example, a value of at least one of a communication channel, a frequency range, a center frequency, and/or a bandwidth of the first subsequent/future communication may be different from a value of at least one of a communication channel, a frequency range, a center frequency, and/or a bandwidth of the second subsequent/future communication. In some aspects, the second subsequent/future communication may be different from the first subsequent/future communication. In some aspects, the second subsequent/future communication may include or may be the packet 320.

As described in greater detail herein, in some aspects, an apparatus (e.g., AP and/or STA) may receive/transmit a communication/transmission (e.g., a packet, data packet, a frame, a data frame, an awaken packet, an awaken request packet, a request packet, a response packet, an awaken response packet, a beacon, and/or any various other suitable encapsulation of information), and such communication/transmission may include field(s), signal(s), bit(s), or portion(s) that includes any one or more of the various signals, parameters, values, or other indicia described in greater detail herein. In some aspects, a first communication/transmission may include one or more field(s), signal(s), bit(s), or portion(s) and/or signals, parameters, values, or other indicia that indicates a first/beginning/start time of one or more second/subsequent communications/transmissions (e.g., a packet, data packet, a frame, a data frame, an awaken packet, an awaken request packet, a request packet, a response packet, an awaken response packet, a beacon, and/or any various other suitable encapsulation of information) that are communicated according to a duty cycle. In some aspects, a first communication/transmission may include one or more field(s), signal(s), bit(s), or portion(s) and/or signals, parameters, values, or other indicia that indicates a duration of time between two sequential/consecutive second/subsequent communications/transmissions (e.g., a packet, data packet, a frame, a data frame, an awaken packet, an awaken request packet, a request packet, a response packet, an awaken response packet, a beacon, and/or any various other suitable encapsulation of information) that are communicated according to a duty cycle. In some aspects, a first communication/transmission may include one or more field(s), signal(s), bit(s), or portion(s) and/or signals, parameters, values, or other indicia that indicates a duration of time during which the primary receiver/transceiver/radio and/or the secondary receiver/transceiver/radio is/will/scheduled to operate according to an on-mode/state and/or a high/higher power state/mode during one or more second/subsequent communications/transmissions (e.g., a packet, data packet, a frame, a data frame, an awaken packet, an awaken request packet, a request packet, a response packet, an awaken response packet, a beacon, and/or any various other suitable encapsulation of information) that are communicated according to a duty cycle.

In some aspects, a first communication/transmission (e.g., a packet, data packet, a frame, a data frame, an awaken packet, an awaken request packet, a request packet, a response packet, an awaken response packet, a beacon, and/or any various other suitable encapsulation of information) may include one or more field(s), signal(s), bit(s), or portion(s) and/or signals, parameters, values, or other indicia that indicates a variation of an attribute (e.g., a bandwidth, a center frequency, or a frequency range) of a second/future communication/transmission (e.g., a packet, data packet, frame, data frame, awaken packet, awaken request packet, request packet, response packet, awaken response packet, a beacon, and/or any various other suitable encapsulation of information) relative to the first communication/transmission (e.g., a packet, data packet, a frame, a data frame, an awaken packet, an awaken request packet, a request packet, a response packet, an awaken response packet, a beacon, and/or any various other suitable encapsulation of information). In some aspects, such an indication of such a variation may be in the form of a bit, value, signal, or other indicia that is used to determine a shift, scaling, factor, offset, deviation, determination, calculation, look-up, and/or other suitable variation of such an attribute (e.g., a bandwidth, a center frequency, or a frequency range). For example, an apparatus (e.g., STA or AP) may utilize such an indication to determine an extent/amount of variation, shift, scaling, factor, offset, deviation of such attribute for a second/future communication/transmission (e.g., a packet, data packet, a frame, a data frame, an awaken packet, an awaken request packet, a request packet, a response packet, an awaken response packet, a beacon, and/or any various other suitable encapsulation of information) (e.g., in relation to the same/similar attribute (e.g., a bandwidth, a center frequency, or a frequency range) of the first communication/transmission (e.g., a packet, data packet, a frame, a data frame, an awaken packet, an awaken request packet, a request packet, a response packet, an awaken response packet, a beacon, and/or any various other suitable encapsulation of information)). In some aspects, the determined extent/amount of variation, shift, scaling, factor, offset, deviation of such attribute (e.g., a bandwidth, a center frequency, or a frequency range) for the first communication/transmission (e.g., a packet, data packet, a frame, a data frame, an awaken packet, an awaken request packet, a request packet, a response packet, an awaken response packet, a beacon, and/or any various other suitable encapsulation of information) is relative to, based on, and/or not independent of/from such attribute (e.g., a bandwidth, a center frequency, or a frequency range) of the first communication/transmission (e.g., a packet, data packet, a frame, a data frame, an awaken packet, an awaken request packet, a request packet, a response packet, an awaken response packet, a beacon, and/or any various other suitable encapsulation of information).

In some aspects, a communication/transmission (e.g., a packet, data packet, a frame, a data frame, an awaken packet, an awaken request packet, a request packet, a response packet, an awaken response packet, a beacon, and/or any various other suitable encapsulation of information) may include one or more field(s), signal(s), bit(s), or portion(s) and/or signals, parameters, values, or other indicia that indicates whether an apparatus (e.g., STA or AP) is capable of, is enabled to, is configured to, is willing to, or can/will communicate (e.g., transmit/receive) a first subsequent/future communication/transmission (e.g., a packet, data packet, a frame, a data frame, an awaken packet, an awaken request packet, a request packet, a response packet, an awaken response packet, a beacon, and/or any various other suitable encapsulation of information) using a first attribute (e.g., communication channel, frequency range, center frequency, bandwidth, etc.) and communicate (e.g., transmit/receive) a second subsequent/future communication/transmission (e.g., a packet, data packet, a frame, a data frame, an awaken packet, an awaken request packet, a request packet, a response packet, an awaken response packet, a beacon, and/or any various other suitable encapsulation of information) using a second attribute (e.g., communication channel, frequency range, center frequency, bandwidth, etc.) that is different from the first attribute. In some aspects, the first subsequent/future communication/transmission (e.g., a packet, data packet, a frame, a data frame, an awaken packet, an awaken request packet, a request packet, a response packet, an awaken response packet, a beacon, and/or any various other suitable encapsulation of information) is different from (e.g., not the same as, comprises different fields, portions, frames, etc.) the second subsequent/future communication/transmission (e.g., a packet, data packet, a frame, a data frame, an awaken packet, an awaken request packet, a request packet, a response packet, an awaken response packet, a beacon, and/or any various other suitable encapsulation of information).

In some aspects, at block 404, AP 110 may await receipt of the packet 320. For example, STA 120 may await receipt from time $T_3$ to time $T_6$. In some aspects, though not illustrated in FIG. 3, AP 110 may transmit and STA 120 may receive (e.g., using SR 224) a beacon that includes information corresponding to timing information for synchronizing communications with AP 110. In some aspects, the beacon may be received using SR 224 when SR 224 is turned/powered on or in a high/higher power state/mode and/or while PR 222 is turned/powered off or in a low/lower power state/mode.

In some aspects, the apparatus may utilize its secondary radio(s)/receiver(s) and/or its primary radio(s)/receiver(s) to receive a beacon (e.g., an awaken beacon), which may include information corresponding to, be communicated for, and/or configured for maintaining connectivity with another apparatus (e.g., an access point), timing information for synchronizing communications with another apparatus (e.g., an access point), timing information for turning/powering on/off (e.g., entering into a low(er)/high(er) power mode/state) the primary radio(s)/receiver(s) and/or the secondary receiver(s)/radio(s), and/or various other suitable aspects of communication be the primary and/or secondary receiver(s)/radio(s) of the apparatus.

In some aspects, such a beacon (e.g., awaken beacon) may be communicated/received using the secondary receiver(s)/radio(s) and/or when the secondary receiver(s)/radio(s) is turned/powered on (e.g., in a high(er) power mode/state), and while the primary/main receiver(s)/radio(s) is turned/powered off or in a low (er) power state/mode. In some aspects, such a beacon (e.g., awaken beacon) may be communicated/received using the primary/main receiver(s)/radio(s) and/or while/when the primary/main receiver(s)/radio(s) is turned/powered on (e.g., in a high(er) power mode/state), and while the secondary receiver(s)/radio(s) is turned/powered off or in a low (er) power state/mode.

As described herein, an apparatus (e.g., STA(s)) may transmit a response packet (e.g., an awaken response packet) at a time/period/duration that follows reception of an awaken packet (e.g., awaken request packet) or beacon (e.g., awaken beacon). In some aspects, that response packet may be communicated/transmitted by that apparatus after, in response to, and/or in association with such an awaken packet (e.g., awaken request packet) or beacon (e.g., awaken beacon). In some aspects, that response packet may be communicated/transmitted by that apparatus (e.g., STA(s)) after, in response to, and/or in association with receiving another packet (e.g., a subsequent packet received by that apparatus (e.g., STA(s)) after that apparatus (e.g., STA(s)) receives the awaken packet, such as the awaken request packet). In some aspects, that other packet (e.g., a subsequent packet received by that apparatus (e.g., STA(s)) after that apparatus (e.g., STA(s)) receives the awaken packet, such as the awaken request packet) may include information configured to cause/induce/trigger communication of that response packet (e.g., awaken request packet). In some aspects, that other packet (e.g., a subsequent packet received by that apparatus (e.g., STA(s)) after that apparatus (e.g., STA(s)) receives the awaken packet, such as the awaken request packet) may include information configured to solicit/inquire/determine certain information from that apparatus (e.g., STA(s)), wherein such information pertains/relates/corresponds to a purpose/intention/objective/reason that that awaken packet (e.g., the awaken request packet) was initially/originally communicated/transmitted to that apparatus (e.g., STA(s)).

In some aspects, the other packet (e.g., a subsequent packet received by that apparatus (e.g., STA(s)) after that apparatus (e.g., STA(s)) receives the awaken packet, such as the awaken request packet) may include information configured to solicit/inquire/determine certain information from that apparatus (e.g., STA(s)), wherein such information pertains/relates/corresponds to a purpose/intention/objective/reason of/for that apparatus undergoing an awaken procedure (e.g., after, in response to, and/or in association with receiving the awaken packet, such as the awaken request packet). In some aspects, the response packet (e.g., awaken response packet) includes certain information that pertains/relates/corresponds to a purpose/intention/objective/reason that that awaken packet (e.g., the awaken request packet) was initially/originally communicated/transmitted to that apparatus (e.g., STA(s)) and/or pertains/relates/corresponds to a purpose/intention/objective/reason of/for that apparatus undergoing an awaken procedure (e.g., after, in response to, and/or in association with receiving the awaken packet, such as the awaken request packet).

In some aspects, the awaken packet (e.g., awaken request packet) and/or beacon (e.g., awaken beacon) may be communicated/received by the apparatus (e.g., STA(s)) using its secondary radio/receiver. In some aspects, the response packet (e.g., awaken response packet) may be communicated/transmitted by that apparatus (e.g., STA(s)) using its main/primary radio/receiver. In some aspects, the other packet (e.g., a subsequent packet received by that apparatus (e.g., STA(s)) after that apparatus (e.g., STA(s)) receives the awaken packet, such as the awaken request packet) may be communicated/transmitted/received by the apparatus using its primary/main radio/receiver. In some aspects, the other packet (e.g., a subsequent packet received by that apparatus (e.g., STA(s)) after that apparatus (e.g., STA(s)) receives the awaken packet, such as the awaken request packet) may be communicated/transmitted/received by the apparatus using its secondary radio/receiver.

In some aspects, at block 406, AP 110 may transmit and STA 120 may receive the packet 320. For example, at time $T_6$, SR 224 may receive the packet 320 communicated by AP 110. As described herein, the packet 320 may alternatively or interchangeably be referred to as an awaken packet, an awake packet, an awaken request packet, and/or various other suitable terms without deviating from the scope of the present disclosure. As illustrated in FIG. 3, in some aspects, the packet 320 may be received while SR 224 is in a high power state/mode and/or while PR 222 is in a low power state/mode. In some aspects, while PR 222 is in the low power state/mode, STA 120 is unable to transmit a response to the packet 320 using PR 112.

In some aspects, the packet 320 may be configured to or include information that informs a receiving apparatus (e.g., STA 120) that a transmitting apparatus (e.g., AP 110) is interested in communication with one or more STAs, e.g., using the respective PR of such one or more STAs. In some aspects, the packet 320 may be configured to or include information that informs a receiving apparatus (e.g., STA 120) that a transmitting apparatus (e.g., AP 110) has prepared for transmission at least one packet that the transmitting apparatus (e.g., AP 110) is interested in communicating to one or more STAs, e.g., using the respective PR of the one or more STAs. In some configurations, the packet 320 may be configured to awaken, turn on, or cause a high/higher power mode/state to occur for PR 112. In some aspects, the packet 320 may be configured to trigger a response to be communicated by STA 120.

As described in greater detail herein, in some aspects, an apparatus (e.g., AP and/or STA) may receive/transmit a communication/transmission e.g., a packet, data packet, a frame, a data frame, an awaken packet, an awaken request packet, a request packet, a response packet, an awaken response packet, a beacon, and/or any various other suitable encapsulation of information), and such communication/transmission may include field(s), signal(s), bit(s), or portion(s) that includes any one or more of the various signals, parameters, values, or other indicia described in greater detail herein. In some aspects, such a communication/transmission may be configured to and/or include information that may inform, notify, and/or alert the receiving apparatus (e.g., STA or AP) that another apparatus (e.g., transmitting apparatus, such as an AP or STA) intends, wishes, plans, and/or is interested in communicating to/with one or more apparatus (e.g., STA or AP), e.g., at least that receiving apparatus, using a primary radio/transceiver and/or a secondary radio/transceiver of such apparatus (e.g., STA or AP). In some aspects, such a communication/transmission may be configured to and/or include information that may inform, notify, and/or alert the receiving apparatus (e.g., STA or AP) that another apparatus (e.g., transmitting apparatus, such as an AP or STA) has prepared for transmission (e.g., in its memory/cache/buffer) at least one frame, packet, and/or unit/encapsulation of data/information, e.g., that it intends, wishes, plans, and/or is interested in communicating to/with one or more apparatus (e.g., STA or AP), e.g., at least that receiving apparatus, using a primary radio/transceiver and/or a secondary radio/transceiver of such apparatus (e.g., STA or AP).

In some aspects, such communication/transmission (e.g., a packet, data packet, a frame, a data frame, an awaken packet, an awaken request packet, a request packet, a response packet, an awaken response packet, a beacon, and/or any various other suitable encapsulation of information) and/or any one or more of its field(s), signal(s), bit(s), or portion(s)) may include an indication (e.g., a counter, counter value, etc., as described in greater detail herein) regarding (1) an availability of an updated identifier/value for one or more parameters of a basic service set (BSS) (e.g., to which the apparatus (e.g., STA or AP) is or is not yet a member or assigned) and/or or (2) whether an updated identifier/value for one or more parameters of a basic service set (BSS) (e.g., to which the apparatus (e.g., STA or AP) is or is not yet a member or assigned) is available for the apparatus (e.g., STA or AP). The apparatus may utilize such an indicator (e.g., a counter, counter value, etc., as described in greater detail herein) to determine whether an updated identifier/value for one or more parameters of a basic service set (BSS) (e.g., to which the apparatus (e.g., STA or AP) is or is not yet a member or assigned) is available for the apparatus (e.g., STA or AP).

In some aspects, the packet 320 may be configured to awaken a single apparatus. In some aspects, the packet 320 may be configured to awaken a plurality of apparatuses associated with or assigned a particular identifier. In some aspects, the packet comprises information indicating a time by which to complete an awaken procedure. In some aspects, such awakening comprises STA 120 altering a power state/mode or turning/powering on/up PR 222. In some aspects, the packet 320 includes information indicating or identifying which receiver(s) of that packet 320 is/are intended recipients. In some aspects, the information indicates that the packet 320 (e.g., awaken packet) is intended for a specific receiver, every/all receivers that receive that packet 320 (e.g., awaken packet), or a plurality of specific receivers that does not necessarily include all receivers that receive the packet 320 (e.g., awaken packet). In some aspects, the packet 320 includes information indicating whether to awaken, which may include transitioning from a low/lower power state/mode to a high/higher power state/mode. In some aspects, the packet 320 may include information indicating whether to communicate a response (e.g., response 330) to the packet 320.

In some aspects, the awaken packet may be configured to awaken a single apparatus. In some aspects, the awaken packet may be configured to awaken a plurality of apparatuses (e.g., a plurality of apparatuses associated with or assigned a particular identifier (e.g., group identifier)). In some aspects, 'awaken' may include causing the apparatus (that received the awaken packet) to alter the power state or power/turn on/up the primary radio(s)/receiver(s), the secondary radio(s)/receiver(s), and/or any other component of the apparatus. In some aspects, the awaken packet includes information indicating a time to begin a respective awaken procedure by one or more apparatus. In some aspects, the awaken packet may include information indicating a time by which to complete a respective awaken procedure by each of the one or more apparatus.

In some aspects, an awaken request packet may be configured to include various fields or information. In some aspects, such fields/information may include information indicating a time by which one or more receivers of the (respective) awaken request packet(s) shall finish an awaken procedure that transitions that/those receiver(s), or any one or more of its receiver(s)/radio(s), from an off/inactive/doze/low-/lower-power state/mode/configuration to an on/active/high-/higher-power state/mode/configuration. In some aspects, an apparatus (e.g., receiver/recipient) of the awaken request packet may determine when (e.g., a specific time, perhaps in relation to the time of receiving the awaken request packet) (i) to perform an awaken procedure, (ii) to complete an awaken procedure, or (iii) to turn on or power on/up one or more of its receivers/radios. In some aspects, such fields/information may include information (e.g., one or more bits, a bitmap, etc.) indicating or identifying which specific receivers of that awaken request packet is/are the intended destination(s)/recipient(s). In some aspects, such fields/information may include information indicating that that awaken request packet is intended for a specific/individual receiver/recipient.

In some aspects, such fields/information may include information indicating that that awaken request packet is intended for all receivers/recipients that receive that awaken request packet. In such aspects, the awaken request packet may not include a specific identifier identifying a specific receiver/recipient of that awaken request packet. In some aspects, such fields/information may include information indicating that that awaken request packet is intended for a plurality of specific receivers/recipients, wherein that plurality of specific receivers/recipients is a subset (i.e., does not include all) of the recipients/receivers that receive that awaken request packet. In some aspects, such fields/information may indicate whether to perform one or more operations by a receiver/recipient of that awaken request packet. For example, such an operation may be to awaken (e.g., transition from an off/inactive/low-/lower-power state/mode/configuration to an on/active/high-/higher-power state/mode/configuration). As another example, such an operation may be to communicate (e.g., transmit) a response (e.g., response packet, awaken response packet, etc.) after, in response to, and/or in association with receiving the awaken request packet.

In some aspects, the packet 320 includes a portion that includes a plurality of identifiers. Each identifier may correspond to a value of an intended recipient apparatus (of the packet 320). In some aspects, the plurality of identifiers may be included in the portion of the packet 320 in a numerically ordered manner. In some aspects, the plurality of identifier may be included in the portion of the packet 320 in a numerically ascending or descending manner. STA 120 may have been assigned an identifier by AP 110 in a preceding communication. In some aspects, in response to processing an identifier (of the plurality of identifiers) that has a value not equal to and not less than a value of the identifier assigned to STA 120, STA 120 may determine to not process any remaining ones of the plurality of identifiers (nor any remaining portion of the packet 320).

In some aspects, STA 120 may process individual ones of the plurality of identifiers of the portion until reaching an identifier that is greater than the identifier assigned to STA 120, at which time STA 120 may determine to not process any remaining ones of the plurality of identifiers (nor any remaining portion of the packet 320). In some aspects, upon reaching an end or final one of the plurality of identifiers without identifying any identifier (of the plurality of identifiers) that is greater than (or that is not equal to and not less than) the identifier assigned to STA 120, STA 120 may determine to not process any remaining ones of the plurality of identifiers (nor any remaining portion of the packet 320). In some aspects, upon reaching an end or final one of the plurality of identifiers and determining that the end or final one of the plurality of identifiers comprises a value that is not equal to and not greater than the identifier assigned to STA 120, STA 120 may determine to not process any remaining ones of the plurality of identifiers (nor any remaining portion of the packet 320).

As described in greater detail herein, in some aspects, an apparatus (e.g., AP and/or STA) may receive/transmit a communication/transmission e.g., a packet, data packet, a frame, a data frame, an awaken packet, an awaken request packet, a request packet, a response packet, an awaken response packet, a beacon, and/or any various other suitable encapsulation of information), and such communication/transmission may include field(s), signal(s), bit(s), or portion(s) that includes any one or more of the various signals, parameters, values, or other indicia described in greater detail herein. In some aspects, a preamble, a header, a data, a signal, a payload, and/or one or more encapsulations of such field(s), signal(s), bit(s), or portion(s) may include a plurality of identifier.

In some aspects, the plurality of identifiers may each identify/correspond to a value or attribute of an apparatus (e.g., STA(s)/AP(s)) (that may (or may not) be a recipient of such communication/transmission). In some aspects, such plurality of identifiers (or their respective values, attributes, etc.) may be included in such preamble, header, data, signal, payload, and/or one or more encapsulations of such field(s), signal(s), bit(s), or portion(s) in an organized, non-random, systematized, consecutive, ascending/descending (e.g., numerically ascending/descending), deterministic, ordered (e.g., numerically ordered), or some other similar manner.

In some aspects, the apparatus (STA or AP) may be assigned an identifier that is or is not included in the aforementioned plurality of identifiers. In some aspects, the apparatus (e.g., STA or AP) may be assigned such an identifier (and any corresponding value/attribute/etc.) by/from another apparatus (e.g., AP or STA) in a preceding transmission/communication (e.g., a packet, data packet, a frame, a data frame, an awaken packet, an awaken request packet, a request packet, a response packet, an awaken response packet, a beacon, and/or any various other suitable encapsulation of information including field(s), signal(s), bit(s), or portion(s) that includes any one or more of the various signals, parameters, values, or other indicia) or in a same/concurrent transmission/communication (e.g., a packet, data packet, a frame, a data frame, an awaken packet, an awaken request packet, a request packet, a response packet, an awaken response packet, a beacon, and/or any various other suitable encapsulation of information including field(s), signal(s), bit(s), or portion(s) that includes any one or more of the various signals, parameters, values, or other indicia) as that of the aforementioned transmission/communication (in which the aforementioned plurality of identifiers is included).

In some aspects, an apparatus (e.g., STA or AP) may be configured to, after/upon or in response to receiving, demodulating, or processing such organized, non-random, systematized, consecutive, descending (e.g., numerically descending), ascending/descending (e.g., numerically ascending/descending), deterministic, and/or ordered (e.g., numerically ordered) preamble, header, data, signal, payload, and/or one or more encapsulations of such field(s), signal(s), bit(s), or portion(s), determine to not process/demodulate any remaining ones of the plurality of identifiers (if any) and/or any remaining portion(s) (if any) of such preamble, header, data, signal, payload, and/or one or more encapsulations of such field(s), signal(s), bit(s), or portion(s).

In some aspects, the apparatus (e.g., STA or AP) may make such determination (to not process/demodulate any remaining ones of the plurality of identifiers (if any) and/or any remaining portion(s) (if any) of such preamble, header, data, signal, payload, and/or one or more encapsulations of such field(s), signal(s), bit(s), or portion(s)) in response to or upon/after determining/identifying/processing/demodulating an identifier (or a value/attribute/etc. thereof) (of the plurality of identifiers included in the communication/transmission) that is (or has/includes a value/attribute/etc. thereof) not equal to and not less than (e.g., greater than) the identifier (or a value/attribute thereof) assigned to the apparatus (e.g., STA or AP) (that received that communication/transmission comprising such plurality of identifiers).

In some aspects, the apparatus (e.g., STA or AP) may process/demodulate (individual/particular) ones of the plurality of identifiers (if any) and/or any remaining portion(s) (if any) of such preamble, header, data, signal, payload, and/or one or more encapsulations of such field(s), signal(s), bit(s), or portion(s) until/unless reaching/determining/identifying/processing/demodulating an identifier (or a value/attribute/etc. thereof) (of the plurality of identifiers included in the communication/transmission) that is (or has/includes a value/attribute/etc. thereof) not equal to and not less than (e.g., greater than) the identifier (or a value/attribute thereof) assigned to the apparatus (e.g., STA or AP) (that received that communication/transmission comprising such plurality of identifiers), at which point/time the apparatus (STA or AP) may make the aforementioned determination (to no longer or not process/demodulate any remaining ones of the plurality of identifiers (if any) and/or any remaining portion(s) (if any) of such preamble, header, data, signal, payload, and/or one or more encapsulations of such field(s), signal(s), bit(s), or portion(s)) in response to or upon/after determining/identifying/processing/demodulating an identifier (or a value/attribute/etc. thereof) (of the plurality of identifiers included in the communication/transmission) that is (or has/includes a value/attribute/etc. thereof) not equal to and not less than (e.g., greater than) the identifier (or a value/attribute thereof) assigned to the apparatus (e.g., STA or AP) (that received that communication/transmission comprising such plurality of identifiers).

In some aspects, the apparatus (e.g., STA or AP) may make the aforementioned determination (to not process/demodulate any remaining ones of the plurality of identifiers (if any) and/or any remaining portion(s) (if any) of such preamble, header, data, signal, payload, and/or one or more encapsulations of such field(s), signal(s), bit(s), or portion(s)) in response to or upon/after reaching/determining/identifying/processing/demodulating an end or final/last one of the plurality of identifiers (or a value/attribute/etc. thereof) (included in the communication/transmission) without processing/identifying/demodulating any identifier (of the plurality of identifiers) that is (or has/includes a value/attribute/etc.) not equal to and not less than (e.g., is not greater than) the identifier (or a value/attribute thereof) assigned to the apparatus (e.g., STA or AP) (that received that communication/transmission comprising such plurality of identifiers). (At that point/time, the apparatus (STA or AP) may make the aforementioned determination (to no longer or not process/demodulate any remaining ones of the plurality of identifiers (if any) and/or any remaining portion(s) (if any) of such preamble, header, data, signal, payload, and/or one or more encapsulations of such field(s), signal(s), bit(s), or portion(s)) in response to or upon/after determining/identifying/processing/demodulating an identifier (or a value/attribute/etc. thereof) (of the plurality of identifiers included in the communication/transmission) that is (or has/includes a value/attribute/etc. thereof) not equal to and not less than (e.g., greater than) the identifier (or a value/attribute thereof) assigned to the apparatus (e.g., STA or AP) (that received that communication/transmission comprising such plurality of identifiers).)

In other words, in some aspects, the apparatus (e.g., STA or AP) may make the aforementioned determination (to not process/demodulate any remaining ones of the plurality of identifiers (if any) and/or any remaining portion(s) (if any) of such preamble, header, data, signal, payload, and/or one or more encapsulations of such field(s), signal(s), bit(s), or portion(s)) in response to or upon/after reaching/determining/identifying/processing/demodulating an end or final/last one of the plurality of identifiers (or a value/attribute/etc. thereof) (included in the communication/transmission) and determining that such end or final/last one of the plurality of identifiers (or a value/attribute/etc. thereof) (included in the communication/transmission) comprises a value that is not equal to and/or not greater than (e.g., is less than) the identifier (or value/attribute thereof) assigned to the apparatus (e.g., STA or AP) (that received the aforementioned communication/transmission comprising the aforementioned plurality of identifiers). (At that point/time, the apparatus (STA or AP) may make the aforementioned determination (to no longer or not process/demodulate any remaining ones of the plurality of identifiers (if any) and/or any remaining portion(s) (if any) of such preamble, header, data, signal, payload, and/or one or more encapsulations of such field(s), signal(s), bit(s), or portion(s)) in response to or upon/after determining/identifying/processing/demodulating an identifier (or a value/attribute/etc. thereof) (of the plurality of identifiers included in the communication/transmission) that is (or has/includes a value/attribute/etc. thereof) not equal to and not less than (e.g., greater than) the identifier (or a value/attribute thereof) assigned to the apparatus (e.g., STA or AP) (that received that communication/transmission comprising such plurality of identifiers).)

In some aspects, the packet 320 may include data, a payload, or a data packet. In some aspects, the packet 320 may be modulated using on off keying. In some aspects, the packet 320 may include a tail sequence that includes a frame check sequence. In some aspects, the packet 320 includes data associated with a configuration of STA 120. In some aspects, the packet 320 may include a synchronization signal (SS). In some aspects, a duration of the SS varies according to one or more factors, wherein such one or more factors may include a data rate of the communication that included the packet 320. In some aspects, STA 120 may, based on a duration of a bit/symbol in the packet 320, determine a magnitude of one or more factors, wherein the one or more factors may include a data rate of the packet 320. In some aspects, the SS may include information enabling or useful for a determination of a rate of transmission of information in the packet 320. In some aspects, the SS comprises information enabling or useful for an identification or determination of a boundary between a preamble of the packet 320 and another portion (e.g., data/payload) of the packet 320. In some aspects, this other portion (e.g., data/payload) follows (e.g., in time or sequence) the SS. In some aspects, the packet 320 lacks or is without a header between the SS and the data/payload.

In some aspects, the awaken request packet may include information indicating whether a transmitter/apparatus (e.g., AP) of the awaken request packet will transmit a response request packet to the apparatus/receiver (e.g., STA(s)) of the awaken request packet. In some aspects, a response request packet may cause/induce/trigger that receiver/apparatus (e.g., STA(s)) to transmit (e.g., via an UL transmission) an awaken response packet (e.g., ACK, NACK, other response, etc.) after, in response to, and/or in association with receiving the awaken request packet. In some aspects, such an indication may be a bit/bitmap capable of having a first value (e.g., 1) indicating that the apparatus/transmitter (e.g., AP) of the awaken request packet will transmit the response request packet to that apparatus/receiver (e.g., STA(s)) of the awaken request packet and/or a second value (e.g., 0) indicating that the apparatus/transmitter (e.g., AP) of the awaken request packet will not transmit the response request packet to that apparatus/receiver (e.g., STA(s)) of the awaken request packet. In some aspects, if/when the awaken request packet includes, e.g., the first value, the apparatus/receiver (e.g., STA(s)) may not (or may refrain from) contending for a wireless communication channel for a period of time, e.g., in anticipation of, or at least until after receiving, the response request packet. In some aspects, if the apparatus/receiver (e.g., STA(s)) does not receive the response request packet within such a period of time, the apparatus/receiver (e.g., STA(s)) may initiate a process to contend for the wireless communication channel. In some aspects, if/when the awaken request packet includes, e.g., the second value, the apparatus/receiver (e.g., STA(s)) may initiate a process to contend for the wireless communication channel, e.g., without waiting for such a period of time.

In some aspects, a packet (e.g., awaken packet, awaken request packet, etc.) may include one or more identifiers. In some aspects, the packet (e.g., awaken packet, awaken request packet, etc.) may include a first identifier associated with/corresponding to/indicating/identifying a transmitter of that packet (e.g., awaken packet, awaken request packet, etc.). In some aspects, the packet (e.g., awaken packet, awaken request packet, etc.) may include a second identifier (e.g., different from the first identifier) associated with/corresponding to/indicating/identifying a receiver (e.g., an intended/destined receiver) of that packet (e.g., awaken packet, awaken request packet, etc.). In some aspects, the packet (e.g., awaken packet, awaken request packet, etc.) includes an identifier (e.g., a single identifier) associated with/corresponding to/indicating/identifying a transmitter and a receiver (e.g., an intended/destined receiver) of that packet (e.g., awaken packet, awaken request packet, etc.).

In some aspects, a packet (e.g., awaken packet, awaken request packet, etc.) may include a group identifier, which may indicate an identifier with which a group of one or more receivers/apparatuses is/are associated. In some aspects, a packet (e.g., awaken packet, awaken request packet, etc.) may include an abbreviated/compressed basic service set identifier. In some aspects, a packet (e.g., awaken packet, awaken request packet, etc.) may include type information associated with the data/information included in the packet (e.g., awaken packet, awaken request packet, etc.). In some aspects, a packet (e.g., awaken packet, awaken request packet, etc.) may include data/payload. In some aspects, a packet (e.g., awaken packet, awaken request packet, etc.) may include a tail sequence, such as a frame check sequence.

As described in greater detail herein, in some aspects, an apparatus (e.g., AP and/or STA) may receive a communication/transmission (e.g., a packet, data packet, a frame, a data frame, an awaken packet, an awaken request packet, a request packet, and/or any other suitable encapsulation of information), and such communication/transmission may include field(s), signal(s), bit(s), or portion(s) that includes any one or more of the various signals, parameters, values, or other indicia described in greater detail herein. In some aspects, such field(s), signal(s), bit(s), or portion(s) may include or be a preamble, a header, a timing management signal, a synchronization value/counter/signal, and/or various other suitable types of information/data, as described in greater detail herein. In some aspects, the duration and/or information/values/data of such field(s), signal(s), bit(s), or portion(s) may be variable and/or may vary according to or depend on one or more factors. In some aspects, such one or more factors may include channel information of at least a portion of the transmission/communication, channel quality information of at least a portion of the transmission/communication, a rate (e.g., transmission/reception/data rate) of at least a portion of the transmission/communication, a frequency or frequency range/band of at least a portion of the transmission/communication, and/or various other suitable aspects related to at least a portion of the transmission/communication. Such at least a portion of the transmission/communication may include or comprise a portion of the transmission/communication that is the same as or different from the aforementioned preamble, header, timing management signal, synchronization value/counter/signal, and/or various other suitable types of information/data, as described in greater detail herein. For example, in some aspects, such at least a portion of the transmission/communication may include, refer to, or comprise a payload/data portion of the transmission/communication.

In some aspects, the information/values/data of such field(s), signal(s), bit(s), or portion(s) may include a first set/sequence/structure of values/bits/data if/when the value/magnitude of such one or more such factors is relatively lower/low (e.g., lesser than a threshold value, equal to a low value). In some aspects, the information/values/data of such field(s), signal(s), bit(s), or portion(s) may include a second set/sequence/structure of value/bits/data if/when the value/magnitude of such one or more such factors is relatively higher/high (e.g., greater than a/the threshold value, equal to a high value).

In some aspects, the first set/sequence/structure of values/bits/data may have a relationship with the second set/sequence/structure of values/bits/data. In some aspects, the first set/sequence/structure of values/bits/data may be or include a complement of the second set/sequence/structure of values/bits/data. In some aspects, the second set/sequence/structure of values/bits/data may be or include a complement of the first set/sequence/structure of values/bits/data. In some aspects, at least a portion of the first set/sequence/structure of values/bits/data may be a complement of at least a portion of the second set/sequence/structure of values/bits/data, or vice versa. In some aspects, a 'complement' of something may refer to an inverse of that something, an opposite of that something, a complementing value of that something, otherwise different from or not included in the set of that something, or any other aspect associated with a complement as understood by one of ordinary skill in the art. In some aspects, the complement of A may be $\overline{A}$, A', or $A^C$, and the complement of $\overline{A}$, A', or $A^C$ may be A. In some aspects, the complement of 0 may be 1, and the complement of 1 may be 0.

In some aspects, the duration of such field(s), signal(s), bit(s), or portion(s) may be directly proportional/related to the value/magnitude of such one or more such factors. For example, the duration of such field(s), signal(s), bit(s), or portion(s) may be long/longer/high/great/greater when/if the value/magnitude of such one or more such factors is relatively higher/high (e.g., above/greater than a threshold value, or equal to a high value), and/or the duration of such field(s), signal(s), bit(s), or portion(s) may be short/shorter/lesser/less/low when/if the value/magnitude of such one or more such factors is relatively lower/low (e.g., lesser than a/the threshold value, equal to a low value).

In some aspects, the duration of such field(s), signal(s), bit(s), or portion(s) may be inversely/oppositely proportional/related to the value/magnitude of such one or more such factors. For example, the duration of such field(s), signal(s), bit(s), or portion(s) may be long/longer/greater/great/high/higher when/if the value/magnitude of such one or more such factors is relatively lower/low (e.g., lesser than a threshold value, equal to a low value). In some aspects, the duration of such field(s), signal(s), bit(s), or portion(s) may be short/shorter/low/lesser when the value/magnitude of such one or more such factors is relatively great/higher/high (e.g., greater than a/the threshold value, equal to a high value).

In some aspects, such an apparatus may determine the duration of such field(s), signal(s), bit(s), or portion(s) of the communication/transmission based on a value/magnitude of such one or more factors. In some aspects, such an apparatus may determine a value/magnitude of such one or more factors based on the duration of such field(s), signal(s), bit(s), or portion(s) of the communication/transmission. In some aspects, such an apparatus may determine the duration of such field(s), signal(s), bit(s), or portion(s) of the communication/transmission by comparing a value/magnitude of such one or more factors with a value/magnitude of one or more threshold or predetermined/preconfigured valued/magnitudes (e.g., possibly stored in the apparatus). In some aspects, the duration or quantity (e.g., of field(s), signal(s), or bit(s)) of the first set/sequence/structure of values/bits/data may be equal to, a fraction (e.g., a proper fraction, or an improper fraction) of, or a multiple of the duration or quantity (e.g., of field(s), signal(s), or bit(s)) of the second set/sequence/structure of values/bits/data. In some aspects, the duration or quantity (e.g., of field(s), signal(s), or bit(s)) of the second set/sequence/structure of values/bits/data may be equal to, a fraction (e.g., a proper fraction, or an improper fraction) of, or a multiple of the duration or quantity (e.g., of field(s), signal(s), or bit(s)) of the first set/sequence/structure of values/bits/data. In some aspects, the first set/sequence/structure of values/bits/data and/or the second set/sequence/structure of values/bits/data may be repeated at least once (e.g., in a sequential/contiguous/continuous or near-sequential/near-contiguous/near-continuous pattern/manner).

In some aspects, the communication/transmission received by the apparatus may not include a specific field/parameter/portion that explicitly indicates such one or more factors (e.g., channel information, channel quality information, a rate (e.g., transmission/reception/data rate) of the transmission/communication, a frequency or frequency range/band of the transmission/communication, and/or various other suitable aspects of the transmission/communication) associated with the communication/transmission. In some aspects, such an apparatus may determine/infer a value/magnitude (e.g., a relative value/magnitude, relative to a threshold value) of such one or more factors based on (e.g., a value of such) information/values/data of the aforementioned field(s), signal(s), bit(s), or portion(s), which may include the aforementioned first set/sequence/structure of values/bits/data and/or second set/sequence/structure of values/bits/data. For example, such an apparatus may determine/infer/differentiate a high or relatively higher value/magnitude of such one or more factors when/if the information/values/data of such field(s), signal(s), bit(s), or portion(s) includes the first set/sequence/structure of values/bits/data, and/or such an apparatus may determine/infer/differentiate a low or relatively lower value/magnitude of such one or more factors when/if the information/values/data of such field(s), signal(s), bit(s), or portion(s) include the second set/sequence/structure of values/bits/data.

In some aspects, in such a plurality of bits (of the such field(s), signal(s), bit(s), or portion(s)), such field(s), signal(s), bit(s), or portion(s) may include a plurality of bits (e.g., a series of binary bits) where each bit may each have various values without deviating from the scope of the present disclosure. In some aspects, in such a plurality of bits (of the such field(s), signal(s), bit(s), or portion(s)), the number of bits having a first value may be equal to or approximately equal to the number of bits having a second value, wherein the second value is different from (e.g., a complement of) the first value, and/or wherein the first value is different from (e.g., a complement of) the second value. In some aspects, in such a plurality of bits (of the such field(s), signal(s), bit(s), or portion(s)), two or more bits of such plurality of bits may have the same value (e.g., the same first value or the same second value). In some aspects, in such a plurality of bits (of the such field(s), signal(s), bit(s), or portion(s)), no more than three consecutive/contiguous bits comprise the same value (e.g., the first value and/or the second value).

In some aspects, in such a plurality of bits (of the such field(s), signal(s), bit(s), or portion(s)), at least one and/or fewer than two/three set(s) of three/four (or fewer) consecutive/contiguous bits comprise a first value and/or at least one and/or fewer than two/three set(s) of three/four (or fewer) consecutive/contiguous bits comprise a second value, wherein the second value is different from (e.g., a complement of) the first value, and/or vice versa. In some aspects, in such a plurality of bits (of the such field(s), signal(s), bit(s), or portion(s)), a duration (e.g., a maximum duration) of time associated with at least one and/or fewer than two/three set(s) of three/four (or fewer) consecutive/contiguous bits comprising a first value is equal to or substantially equal to a duration (e.g., a maximum duration) of time associated with at least one and/or fewer than two/three set(s) of three/four (or fewer) consecutive/contiguous bits comprising a second value, wherein the second value is different from (e.g., a complement of) the first value, and/or vice versa.

In some aspects, a duration (e.g., a maximum duration) of time associated with consecutive/contiguous bits having a particular (e.g., the same) value/attribute in the aforementioned field(s), signal(s), bit(s), or portion(s) of the communication/transmission is less than or equal to twice the duration (e.g., a maximum duration) of time associated with consecutive/contiguous bits having a particular (e.g., the same) value/attribute in at least one other portion of such communication/transmission (and such other portion of such communication/transmission may include a payload/data portion of such communication/transmission). In some aspects, a duration (e.g., a maximum duration) of time associated with a particular value/attribute (e.g., power level, communication signal, off-/on-period, off-/on-signal, low-/high-power signal, etc.) in the aforementioned field(s), signal(s), bit(s), or portion(s) of the communication/transmission is less than or equal to twice a duration (e.g., a maximum duration) of time with which a similar/same value/attribute in at least one other portion of such communication/transmission (and such other portion of such communication/transmission may include a payload/data portion of such communication/transmission).

In some aspects, the aforementioned first value may correspond to, be associated with, or cause the apparatus to communicate/operate according to a first signal value/amplitude value, a first signal energy level, 'on' duration/period/value, or other attribute/characteristic suitable for communication. In some aspects, the aforementioned second value may correspond to, be associated with, or cause the apparatus to communicate/operate according to a second signal value/amplitude value, a second signal energy level, an 'off' duration/period/value, or other attribute/characteristic suitable for communication, which may be different from the aforementioned first signal value/amplitude value, first signal energy level, 'on' duration/period/value, or other attribute/characteristic suitable for communication, respectively. In some aspects, the aforementioned first value may correspond to, be associated with, or cause the apparatus to communicate/operate according to a first signal value/amplitude value, a first signal energy level, an 'off' duration/period/value, or other attribute/characteristic suitable for communication. In some aspects, the aforementioned second value may correspond to, be associated with, or cause the apparatus to communicate/operate according to a second signal value/amplitude value, a second signal energy level, an 'on' duration/period/value, or other attribute/characteristic suitable for communication, which may be different from the aforementioned first signal value/amplitude value, first signal energy level, 'off' duration/period/value, or other attribute/characteristic suitable for communication, respectively.

In some aspects, an apparatus (e.g., AP and/or STA) may receive a communication/transmission (e.g., a packet, data packet, a frame, a data frame, an awaken packet, an awaken request packet, a request packet, and/or any other suitable encapsulation of information), and such communication/transmission may include field(s), signal(s), bit(s), or portion(s) that includes any one or more of the various signals, parameters, values, or other indicia described in greater detail herein. In some aspects, such field(s), signal(s), bit(s), or portion(s) may include or be a preamble, a header, a timing management signal, a synchronization value/counter/signal, and/or various other suitable types of information/data, as described in greater detail herein. In some aspects, the timing management signal and/or the synchronization value/counter/signal (e.g., as described herein) may be included in the preamble or header of a packet (e.g., an awaken packet, a request packet, and/or awaken request packet (as described herein). In some aspects, the duration and/or information/values/data of such field(s), signal(s), bit(s), or portion(s) may be variable and/or may vary according to or depend on one or more factors. In some aspects, such one or more factors may include channel information, channel quality information, a rate (e.g., transmission/reception/data t rate) of the transmission/communication, a frequency or frequency range/band of the transmission/communication, and/or various other suitable aspects related to the transmission/communication.

In some aspects, the duration of such field(s), signal(s), bit(s), or portion(s) may be greater when the value/magnitude of such one or more such factors is relatively lower/low (e.g., lesser than a threshold value, equal to a low value). In some aspects, the duration of such field(s), signal(s), bit(s), or portion(s) may be lesser when the value/magnitude of such one or more such factors is relatively higher/high (e.g., greater than a/the threshold value, equal to a high value). In some aspects, such an apparatus may determine the duration of such field(s), signal(s), bit(s), or portion(s) of the communication/transmission based on a value/magnitude of such one or more factors. In some aspects, such an apparatus may determine the duration of such field(s), signal(s), bit(s), or portion(s) of the communication/transmission by comparing a value/magnitude of such one or more factors with a value/magnitude of one or more threshold or predetermined/preconfigured valued/magnitudes (e.g., possibly stored in the apparatus).

In some aspects, the information/values/data of such field(s), signal(s), bit(s), or portion(s) may include a first set/sequence/structure of values/bits/data when the value/magnitude of such one or more such factors is relatively lower/low (e.g., lesser than a threshold value, equal to a low value). In some aspects, the duration of such field(s), signal(s), bit(s), or portion(s) may include a second set/sequence/structure of value/bits/data when the value/magnitude of such one or more such factors is relatively higher/high (e.g., greater than a/the threshold value, equal to a high value). In some aspects, the first set/sequence/structure of values/bits/data may have a relationship with the second set/sequence/structure of values/bits/data. In some aspects, the first set/sequence/structure of values/bits/data may be a compliment of the second set/sequence/structure of values/ bits/data, or vice versa. In some aspects, such an apparatus may determine/infer a value/magnitude (e.g., a relative value/magnitude) of such one or more factors based on (e.g., a value of such) information/values/data of such field(s), signal(s), bit(s), or portion(s). For example, such an apparatus may determine/infer/differentiate a high or relatively higher value/magnitude of such one or more factors when the information/values/data of such field(s), signal(s), bit(s), or portion(s) includes the first set/sequence/structure of values/bits/data, and/or such an apparatus may determine/ infer/differentiate a low or relatively lower value/magnitude of such one or more factors when the information/values/ data of such field(s), signal(s), bit(s), or portion(s) include the second set/sequence/structure of values/bits/data.

As stated above, in some aspects, an apparatus (e.g., AP and/or STA) may receive a communication/transmission (e.g., a packet, data packet, a frame, a data frame, an awaken packet, an awaken request packet, a request packet, and/or any other suitable encapsulation of information), and such communication/transmission may include field(s), signal(s), bit(s), or portion(s) that includes any one or more of the various signals, parameters, values, or other indicia described in greater detail herein. As also stated above, in some aspects, such field(s), signal(s), bit(s), or portion(s) may include or be a preamble, a header, a timing management signal, a synchronization value/counter/signal, and/or various other suitable types of information/data, as described in greater detail herein. In some aspects, such field(s), signal(s), bit(s), or portion(s) may include information useful, configured for, or enabling a/an identification, determination, inference, or differentiation of a rate of transmission of information in such communication/transmission. In some aspects, such field(s), signal(s), bit(s), or portion(s) may include information useful, configured for, or enabling a identification, determination, inference, or differentiation of a boundary of at least a portion of transmission of information in such communication/transmission, such as a boundary between (1) the preamble, header, timing management signal, and/or synchronization signal and (2) at least one other portion of such communication/transmission. In some aspects, such field(s), signal(s), bit(s), or portion(s) may include information useful, configured for, or enabling a identification, determination, inference, or differentiation of a type, classification, category, or other suitable attribute of such communication/transmission.

In some aspects, such communication/transmission (e.g., a packet, data packet, a frame, a data frame, an awaken packet, an awaken request packet, a request packet, and/or any other suitable encapsulation of information) may include a data portion, a payload portion, or some other similar type of information. Such data/payload portion may be subsequent to (without necessarily being contiguous in relation to) or follow (e.g., in time) the aforementioned field(s), signal(s), bit(s), or portion(s) of such communication/transmission. Such data/payload portion of such communication/transmission may include: control information; information (e.g., identification information) associated with an apparatus that transmitted such communication/transmission; information associated with a basic service set with which (1) such communication/transmission is associated, (2) the apparatus that transmitted such communication/ transmission is associated, or (3) a singular/plurality of apparatus to/for which such communication/transmission is intended/destined is associated; and/or information associated with a group identifier with which one or more apparatuses to/for which such communication/transmission is intended is or will be associated.

As stated above, in some aspects, an apparatus (e.g., AP and/or STA) may receive a communication/transmission (e.g., a packet, data packet, a frame, a data frame, an awaken packet, an awaken request packet, a request packet, and/or any other suitable encapsulation of information), and such communication/transmission may include field(s), signal(s), bit(s), or portion(s) that includes any one or more of the various signals, parameters, values, or other indicia described in greater detail herein. As also stated above, in some aspects, such field(s), signal(s), bit(s), or portion(s) may include or be a preamble, a header, a timing management signal, a synchronization value/counter/signal, and/or various other suitable types of information/data, as described in greater detail herein. In some aspects, such transmission/communication may lack, not include, or be without a/another header (e.g., a physical (PHY) and/or medium access control (MAC) header(s), etc.) between (1) the aforementioned field(s), signal(s), bit(s), or portion(s) (which may include or be a preamble, a header, a timing management signal, a synchronization value/counter/signal) and (2) the aforementioned data/payload portion(s).

In some aspects, a (receiving) apparatus (e.g., STA/AP) may transition/change to the third mode/state/configuration described above (in which its primary/main radio/receiver may be/operate in an off/low-/lower-/inactive/doze power mode/state/configuration and its secondary radio/receiver may be/operate in an (e.g., always/continuously) on/high-/ higher-/active power mode/state/configuration) or the fourth mode/state/configuration described above (in which its primary/main radio/receiver may be/operate in an off/low-/ lower-/inactive/doze power mode/state/configuration and its secondary radio/receiver may cycle/alternate between a period of being/operating in an on/high-/higher-/active power mode/state/configuration followed by a period of being/operating in an off/low-/lower-/inactive/doze power mode/state/configuration (or vice versa), e.g., according to a duty cycle, schedule, frequency, or periodicity), e.g., from the first mode/state/configuration described above (in which its primary/main radio/receiver may be/operate in an on/high-/higher-/active power mode/state/configuration and its secondary radio/receiver may be/operate in an off/low-/ lower-/inactive/doze power mode/state/configuration) or from the second mode/state/configuration described above (in which its primary/main radio/receiver may cycle/alternate/vary between a period/duration of being/operating in an on/high-/higher-/active power mode/state/configuration and/ followed by a period/duration of being/operating in an off/low-/lower-/inactive/doze power mode/state/configuration (or vice versa), e.g., according to a duty cycle, schedule, frequency, or periodicity and its secondary radio/receiver may be/operate in an off/low-/lower-/inactive/doze power mode/state/configuration), if/when or only if/when that (receiving) apparatus (e.g., STA/AP) is unable/unsuccessful in transmitting a/any/all packet(s) (e.g., awaken response packet(s)) to another apparatus (e.g., AP/STA) and receiving a response (e.g., ACK, NACK, response packet, etc.) (after, in response to, and/or in association with transmitting that packet) within a period/duration of time, e.g., after/relative to a time that the (receiving) apparatus completed an awaken procedure and/or began operating in the first mode/state/ configuration described above (in which its primary/main radio/receiver may be/operate in an on/high-/higher-/active power mode/state/configuration and its secondary radio/ receiver may be/operate in an off/low-/lower-/inactive/doze power mode/state/configuration) and/or the second mode/ state/configuration described above (in which its primary/main radio/receiver may cycle/alternate/vary between a period/duration of being/operating in an on/high-/higher-/active power mode/state/configuration and/followed by a period/duration of being/operating in an off/low-/lower-/inactive/doze power mode/state/configuration (or vice versa), e.g., according to a duty cycle, schedule, frequency, or periodicity and its secondary radio/receiver may be/operate in an off/low-/lower-/inactive/doze power mode/state/configuration).

In some aspects, in the SS, a number of bits having a first value is equal to a number of bits having a second value. In some aspects, the first value is different from (or a complement of) the second value. In some aspects, in the SS, no more than three consecutive/contiguous bits comprise the same value. In some aspects, in the SS, at least one/two set of three consecutive/contiguous bits comprise a first value and at least one/two set of three consecutive/contiguous bits comprise a second value, and the first value may be different from (or a complement of) the second value. In some aspects, at a particular data rate, in the SS, fewer than three sets of three consecutive/contiguous bits comprise a first value and fewer than three sets of three consecutive/contiguous bits comprise a second value, wherein the first value is different from (or a complement of) the second value.

In some aspects, the first value may correspond to communication according to a first signal energy level and the second value may correspond to communication according to a second signal energy level, which may be different from the first signal energy level. In some aspects, the first value may correspond to communication according to a first signal amplitude value or first signal energy level and the second value may correspond to communication according to a second signal amplitude value or second signal energy level, whereby the first signal amplitude level may be different from the second signal amplitude level, and the first signal energy level may be different from the second signal energy level.

As described herein, in some aspects, the packet 320 may include the SS. In some aspects, a duration of the SS varies according to one or more factors, wherein such one or more factors may include a data rate of the communication that included the packet 320. In some aspects, the SS has a first duration when a magnitude of the one or more factors is less than a threshold value or equal to a low value, and/or the SS has a second duration when a magnitude of the one or more factors is more than a threshold value or equal to a high value. In such aspects, the first duration is greater than the second duration, or the second duration is less than the first duration. In some aspects, the SS comprises a first set/structure of data when the magnitude of the one or more factors is lesser than a threshold value or equal to a low value, and a second set/structure of data when the magnitude of the one or more factors is more than a threshold value or equal to a high value, whereby the first set/structure of data may be different from the second set/structure of data.

In some aspects, the first set/structure of data has a relationship to the second set/structure of data, or the second set/structure of data has a relationship to the first set/structure of data. In some aspects, a quantity of bits of the first set/structure of data of the SS is a multiple of a quantity of bits of the second set/structure of data of the SS. In some aspects, the first set/structure of data of the SS and/or the second set/structure of data of the SS is repeated at least once in the packet 320. In some aspects, the first set/structure of data is or includes a complement of the second set/structure of data. In some aspects, at least a portion of the first set/structure of data of the SS may be a complement of at least a portion of the second set/structure of data of the SS. In some aspects, at least a portion of the second set/structure of data of the SS may be a complement of at least a portion of the first set/structure of data of the SS. In some aspects, a complement of a first value refers to an inverse of the first value. In some aspects, a complement of a first value refers to a second value that is different from the first value. In some aspects, a complement of A comprises A. In some aspects, a complement of 0 comprises 1, and a complement of 1 comprises 0.

As mentioned herein, in some aspects, the packet 320 (or at least some parts thereof) may be modulated using on off keying. In some aspects, the on off keying is configured differently based on a rate of data transmission of the packet 320 (or at least some parts thereof). In some aspects, at a first data rate, a first set including one on-duration and one off-duration corresponds to a first value, and/or, at a second data rate, a first set including two on-durations and two off-duration corresponds to the first value. In some aspects, at a first data rate, a second set including one on-duration and one off-duration correspond to a second value, and/or, at a second data rate, a second set including two on-durations and two off-duration correspond to the second value. The first data rate may be different from the second data rate. In some aspects, the first set may include one on-duration and one off-duration is different from the second set that includes one on-duration and one off-duration. In some aspects, the first set that includes two on-durations and two off-duration may be different from the second set that includes two on-durations and two off-duration, and the first value may be different from the second value. In some aspects, at the first data rate, each on- and off-duration has a duration of X microseconds, and/or, at the second data rate, each on- and off-duration includes a duration of A microseconds, which may be different from the duration of X microseconds.

In some aspects, as described above, a received packet (e.g., an awaken packet, an awaken request packet, etc.) may be modulated in various ways without deviating from the scope of the present disclosure. In some aspects, as described above, the packet (e.g., an awaken packet, an awaken request packet, etc.) may be modulated using various keying/modulation techniques, such as frequency shift keying, amplitude shift keying, phase shift keying, on off keying, quadrature amplitude modulation, and/or various other types of modulation or keying/modulation techniques. In some aspects, the on off keying may be configured in various ways without deviating from the scope of the present disclosure. In some aspects, the on off keying may be configured differently based on the rate of data transmission of the packet (e.g., an awaken packet, an awaken request packet, etc.).

In some aspects, when communication of the packet (e.g., an awaken packet, an awaken request packet, etc.) is according to a first data rate, an off/off-duration signal(s)/symbol(s) of/for a first duration (e.g., X microseconds) followed by an on/on-duration signal(s)/symbol(s) for a second duration, which may be the same (e.g., X microseconds) as the first duration (e.g., X microseconds) or different from (e.g., Y microseconds) the first duration (e.g., X microseconds), may carry or correspond to a first value, and an on/on-duration signal(s)/symbol(s) of/for a first duration (e.g., X microseconds) followed by an off/off-duration signal(s)/symbol(s) for a second duration, which may be the same (e.g., X microseconds) as the first duration (e.g., X microseconds) or different (e.g., Y microseconds) from the first duration (e.g., X microseconds), may carry or correspond to a second value, which may be different from the first value. In some aspects, such on/on-duration signal(s)/symbol(s) may include a null portion and a payload/signal portion. In some aspects, such a null portion may be for a duration that is shorter than the payload/signal portions. For example, the null portion may have a duration that is one third (e.g., X/3 microseconds) of the on/on-duration signal(s)/symbol(s) (X microseconds), and the payload/signal portion may have a duration that is two thirds (e.g., 2X/3 microseconds) of the on/on-duration signal(s)/symbol(s) (e.g., X microseconds).

In some aspects, when communication of the packet (e.g., an awaken packet, an awaken request packet, etc.) is according to a second data rate, two (or more) on/on-duration signal(s)/symbol(s) each or collectively having a first duration (e.g., A microseconds) followed by two (or more) off/off-duration signal(s)/symbol(s) each or collectively having of/for a second duration (e.g., B microseconds), which may be the same (e.g., A microseconds) as the first duration (e.g., A microseconds) or different (e.g., B microseconds) from the first duration (e.g., A microseconds), may carry or correspond to a first value, and two (or more) off/off-duration signal(s)/symbol(s) each or collectively having a first duration (e.g., A microseconds) followed by two (or more) off/off-duration signal(s)/symbol(s) each or collectively having of/for a second duration (e.g., B microseconds), which may be the same (e.g., A microseconds) as the first duration (e.g., A microseconds) or different (e.g., B microseconds) from the first duration (e.g., A microseconds), may carry or correspond to a second value. In some aspects, such on/on-duration signal(s)/symbol(s) may include a null portion and a payload/signal portion. In some aspects, such a null portion may be for a duration that is shorter than the payload/signal portions. For example, the null portion may have a duration that is one fourth (e.g., A/4 microseconds) of the on/on-duration signal(s)/symbol(s) (A microseconds), and the payload/signal portion may have a duration that is three quarters (e.g., 3A/4 microseconds) of the on/on-duration signal(s)/symbol(s) (e.g., A microseconds).

In some aspects, the first data rate may be less than the second data rate, or the second data rate may be greater than the first data rate. In some aspects, the second data rate may be lower than the first data rate, or the first data rate may be greater than the second date rate. Although various data rates (e.g., first and second data rates) are described herein, in some aspects, a single data rate (e.g., only a first data rate or only a second data rate) may be sufficient and additional data rates are not necessarily a requirement of the present disclosure, while, in some other aspects, more than a single data rate (e.g., a first data rate and a second data rate) may be required and a single data rate may not necessarily be sufficient. Therefore, various implementations may utilize a single data rate or more than a single data rate without deviating from the scope of the present disclosure.

In some aspects, a communication/transmission (e.g., packet 320) transmitted by AP 110 and received by STA 120 may not include a field that explicitly indicates a data rate of the transmission/communication (e.g., packet 320). In some aspects, the SS includes information useful for an inference (e.g., by STA 120) of a rate of transmission of information in the communication/transmission (e.g. packet 320). In some aspects, STA 120 may infer a first magnitude of the one or more factors when the SS includes the first set/structure of data, and infer a second magnitude of the one or more factors when the SS includes the second set/structure of data. In such aspects, the first set/structure of data is different from the second set/structure of data. In such aspects, the first magnitude of the one or more factors is higher than the second magnitude of the one or more factors, or the second magnitude of the one or more factors is less than the first magnitude of the one or more factors. In such aspects, the first set/structure of data of the SS has a relationship to the second set/structure of data of the SS, or the second set/structure of data of the SS has a relationship to the first set/structure of data of the SS. The second set/structure of data of the SS may be or include a complement of the first set/structure of data of the SS.

In some aspects, a quantity of bits of the first set/structure of data of the SS is a fraction of a quantity of bits of the second set/structure of data of the SS. In some aspects, the number of bits/symbols and/or the duration of the first set/structure of data of the SS is greater than the number of bits/symbols and/or the duration of the second set/structure of data of the SS, or the number of bits/symbols and/or the duration of the second set/structure of data of the SS is less than the number of bits/symbols and/or the duration of the first set/structure of data of the SS. In some other aspects, the number of bits/symbols and/or the duration of the second set/structure of data of the SS is greater than the number of bits/symbols and/or the duration of the first set/structure of data of the SS, or the number of bits/symbols and/or the duration of the first set/structure of data of the SS is less than the number of bits/symbols and/or the duration of the second set/structure of data of the SS.

As mentioned herein, in some aspects, the second data rate may be lower than the first data rate, or the first data rate may be greater than the second date rate. In some aspects, e.g., when communication of the packet 320 is according to a particular data rate (e.g., a low data rate, or a single, predetermined data rate), an on (or on-duration) signal may be characterized by having an energy level above a threshold (e.g., threshold energy level), and an off (or off-duration) signal may be characterized by having an energy level below the threshold (e.g., threshold energy level). In such aspects, if, during the period of time, STA 120 receives a group that includes at least three signals where an initial signal is the same as the penultimate signal and the final signal of the group comprises an off signal, STA 120 may determine that the group of signals received during the period of time corresponds to a first value. In such aspects, if, during the period of time, STA 120 receives a group that includes at least three signals where an initial signal is the same as the penultimate signal and the final signal includes an on signal, STA 120 may determine that the group of signals received during the period of time corresponds to a second value, which may be different from the first value.

In some aspects, as described above, a received packet (e.g., an awaken packet, an awaken request packet, etc.) may be modulated in various ways without deviating from the scope of the present disclosure. In some aspects, as described above, the packet (e.g., an awaken packet, an awaken request packet, etc.) may be modulated using various keying/modulation techniques, such as frequency shift keying, amplitude shift keying, phase shift keying, on off keying, quadrature amplitude modulation, and/or various other types of modulation or keying/modulation techniques. In some aspects, the on off keying may be configured in various ways without deviating from the scope of the present disclosure. In some aspects, the on off keying may be configured differently based on the rate of data transmission of the packet (e.g., an awaken packet, an awaken request packet, etc.).

In some aspects, when communication of the packet (e.g., an awaken packet, an awaken request packet, etc.) is according to a second data rate, which may be the same as or different from (e.g., lesser/lower than or greater/higher than) the aforementioned first data rate (described above), an apparatus (e.g., STA/AP) may determine information, a value, or an information/informational value associated with symbols/signals received during a certain period of time. In some aspects, such an apparatus (e.g., STA/AP), when communicating according to such second data rate, may determine that the symbols/signals received during such a period of time contains or corresponds to a first value/information/informational-value when/if, during such a period of time: (1) such apparatus receives/received a group of at least three signals/symbols comprising no more than two or two or more on/on-duration signal(s)/symbol(s) (e.g., wherein an on/on-duration signal/symbol may be characterized by having a detectable energy level above a certain threshold) separated by no more than one or more than one off/off-duration signal(s)/symbol(s) (e.g., wherein an off/off-duration signal/symbol may be characterized by having a detectable energy level below a certain threshold), and wherein a final/last symbol/signal of such grouping is/includes/comprises an off/off-duration signal/symbol; (2) such apparatus receives/received a group of at least three signals/symbols comprising no more than two or two or more off/off-duration signal(s)/symbol(s) separated by no more than one or more than one on/on-duration signal(s)/symbol(s) and wherein a first/initial symbol/signal of such grouping is/includes/comprises an on/on-duration signal/symbol; and/or (3) such apparatus receives/received a group of at least three signals/symbols wherein an initial symbol/signal is similar or the same as the penultimate signal/symbol (e.g., both on/on-durations signals/symbols or both off/off-duration symbols/signals) and (i) the last/final symbol is an off/off-duration symbol/signal and/or (ii) the first/initial symbol/signal is an on/on-duration signal/symbol. In some aspects, the duration of time associated with each signal/symbol described above is the same (e.g., each comprises A microseconds). In some aspects, a duration of time associated with each signal/symbol described above is different from one another (e.g., one signal/symbol may have a duration of A microseconds while one (or more) signal(s)/symbol(s) may have a duration of B microseconds).

In some aspects, such an apparatus (e.g., STA/AP), when communicating according to such second data rate, may determine that the symbols/signals received during such a period of time contains or corresponds to a second value/information/informational-value, which may be the same as or different from the aforementioned first value/information/informational-value (described above), when/if, during such a period of time: (1) such apparatus receives/received a group of at least three signals/symbols comprising no more than two or two or more on/on-duration signal(s)/symbol(s) (e.g., wherein an on/on-duration signal/symbol may be characterized by having a detectable energy level above a certain threshold) separated by no more than one or more than one off/off-duration signal(s)/symbol(s) (e.g., wherein an off/off-duration signal/symbol may be characterized by having a detectable energy level below a certain threshold), and wherein a final/last symbol/signal of such grouping is/includes/comprises an on/on-duration signal/symbol; (2) such apparatus receives/received a group of at least three signals/symbols comprising no more than two or two or more off/off-duration signal(s)/symbol(s) separated by no more than one or more than one on/on-duration signal(s)/symbol(s) and wherein a first/initial symbol/signal of such grouping is/includes/comprises an off/off-duration signal/symbol; and/or (3) such apparatus receives/received a group of at least three signals/symbols wherein an initial symbol/signal is similar or the same as the penultimate signal/symbol (e.g., both on/on-durations signals/symbols or both off/off-duration symbols/signals) and (i) the last/final symbol is an on/on-duration symbol/signal and/or (ii) the first/initial symbol/signal is an off/off-duration signal/symbol. In some aspects, a duration of time associated with each signal/symbol described above is different from one another (e.g., one signal/symbol may have a duration of A microseconds while one (or more) signal(s)/symbol(s) may have a duration of B microseconds). In some aspects, a duration of time associated with each signal/symbol described above is similar to or the same as one another (e.g., one signal/symbol may have a duration of A microseconds while one (or more) signal(s)/symbol(s) may have a duration of exactly or approximately A microseconds).

In some aspects, the packet 320 may include a preamble. In some aspects, the preamble is communicated using a first bandwidth or a first frequency range, and the SS is communicated using a second bandwidth or second frequency range. In some aspects, the first bandwidth or first frequency range comprises a value or range of values that is greater than or a multiple of the second bandwidth or second frequency range. In some aspects, such multiple comprises a value of X, which may be an integer greater than one. In some aspects, the first bandwidth or frequency range comprises a same center frequency as the second bandwidth or second frequency range.

As described in greater detail herein, in some aspects, an apparatus (e.g., AP and/or STA) may receive/transmit a communication/transmission e.g., a packet, data packet, a frame, a data frame, an awaken packet, an awaken request packet, a request packet, a response packet, an awaken response packet, a beacon, and/or any various other suitable encapsulation of information), and such communication/transmission may include field(s), signal(s), bit(s), or portion(s) that includes any one or more of the various signals, parameters, values, or other indicia described in greater detail herein. In some aspects, such field(s), signal(s), bit(s), or portion(s) may include or be a preamble, a header, a timing management signal, a synchronization value/counter/signal, and/or various other suitable types of information/data, as described in greater detail herein. In some aspects, the preamble and/or header of such field(s), signal(s), bit(s), or portion(s) may be communicated using/in, be included in, or span a first bandwidth or first frequency range, and the timing management signal, synchronization value/counter/signal, and/or one or more other portions of such field(s), signal(s), bit(s), or portion(s) may be communicated using/in, be included in, or span a second bandwidth or second frequency range. In some aspects, the first bandwidth or first frequency range comprises a value or a range of values that is greater than, or a multiple of (e.g., 2X/2-times, 3X/3-times, 4X/4-times, 5X/5-times, 6X/6-times etc.), the second bandwidth or second frequency range. In some aspects, the first bandwidth or first frequency range comprises a same center frequency as the second bandwidth or second frequency range.

In some aspects, the second bandwidth or second frequency range comprises a value or a range of values that is less than, a subset of, or a fraction of (e.g., one-half, one-third, one-fourth, one-fifth, one-sixth, etc.) the second bandwidth or second frequency range. In some aspects, no more than a single timing management signal and/or synchronization signal (of such field(s), signal(s), bit(s), or portion(s)) spanning, communicated in/using, or included in the second frequency range or second bandwidth is communicated with the header and/or preamble (of such field(s), signal(s), bit(s), or portion(s)) spanning, communicated in/using, or included in the first frequency range or first bandwidth. In some aspects, at least a portion or some of the first bandwidth or first frequency range is included in the second bandwidth or second frequency range, and at least a portion or some of the first bandwidth or first frequency range is not included in the second bandwidth or second frequency range. In some aspects, all of the second bandwidth or second frequency range is included in or is the same as the first bandwidth or first frequency range, and not all of the first bandwidth or first frequency range is included in or the same as the second bandwidth or second frequency range.

In some aspects, in response to receiving the packet 320, STA 120 may initiate a transition of PR 120 from a low power state/mode, turned off state or powered down state to a high power, turned on state, or powered up state. In some aspects, STA 120 may transmit and AP 110 may receive a response 330 to the packet 320. STA 120 may transmit the response 330 utilizing PR 222, as illustrated in FIG. 3, or SR 224, even though not illustrated in FIG. 3. In some aspects, after transmitting the response 330 to the packet 320, AP 110 may transmit and STA 120 may receive a message 332, which may be communicated in association with the aforementioned response 330. STA 120 may receive the message 332 utilizing PR 222, as illustrated in FIG. 3, or SR 224, even though not illustrated in FIG. 3. In some aspects, in response to receiving the message 332, AP 110 may initiate a transition from operating according to a mode/state wherein SR 224 is in a high power state/mode, turned on, or powered up to operating according to a mode/state wherein SR 224 is in a low power state/mode, turned off, or powered down. In some aspects, if/after STA 120 transmits the response 330 (e.g., using PR 222 and/or SR 224) to the packet 320 to AP 110 and if/after STA 120 receives a packet (e.g., message 332) associated with the transmitted response 330, STA 120 may initiate a transition of SR 224 from a high power state/mode, a turned on state, or a powered up state to a low power state/mode, a turned off state, or a powered down state.

In some aspects, an apparatus (e.g., AP and/or STA) having a primary/main radio/receiver and/or secondary receiver may be configured to, maintain in a same/similar power/operation mode/state, turn-on/power-up, and/or turn-off/power-down one or more such radio/receivers based on various conditions, parameters, factors, thresholds, and other suitable aspects. In some aspects, such an apparatus may be configured to operate in or according to the first mode/state/configuration described above (in which its primary/main radio/receiver may be/operate in an on/high-/higher-/active power mode/state/configuration and its secondary radio/receiver may be/operate in an off/low-/lower-/inactive/doze power mode/state/configuration). In some aspects, such an apparatus may be configured to operate in or according to the third mode/state/configuration described above (in which its primary/main radio/receiver may be/operate in an off/low-/lower-/inactive/doze power mode/state/configuration and its secondary radio/receiver may be/operate in an (e.g., always/continuously) on/high-/higher-/active power mode/state/configuration). In some aspects, such an apparatus may be configured to operate in or according to a fifth mode/state/configuration in which its primary/main receiver/radio is/operates in an on/high-/higher-/active power mode/state/configuration while its secondary radio/receiver is/operates in an on/high-/higher-/active power mode/state/configuration. In some aspects, such an apparatus may be configured to operate in or according to a sixth mode/state/configuration in which its primary/main receiver/radio is switching, or at least transitioning, from being/operating in an off/low-/lower-/inactive/doze power mode/state/configuration to being/operating in an on/high-/higher-/active power mode/state/configuration while its secondary radio/receiver is/operates in an on/high-/higher-/active power mode/state/configuration.

In some aspects, such an apparatus may be configured to communicate/receive a packet/frame (e.g., an awaken packet, a request packet, or awaken request packet, as described in greater detail herein) while such an apparatus is operating in or according to the third mode/state/configuration described above (in which its primary/main radio/receiver may be/operate in an off/low-/lower-/inactive/doze power mode/state/configuration and its secondary radio/receiver may be/operate in an (e.g., always/continuously) on/high-/higher-/active power mode/state/configuration). In some aspects, after, in response to, and/or in association with receiving such a packet (e.g., an awaken packet, a request packet, or awaken request packet, as described in greater detail herein), such an apparatus may be configured to switch, or at least initiate a transition, from (1) operating in or according to the third mode/state/configuration described above (in which its primary/main radio/receiver may be/operate in an off/low-/lower-/inactive/doze power mode/state/configuration and its secondary radio/receiver may be/operate in an (e.g., always/continuously) on/high-/higher-/active power mode/state/configuration) to (2) operating in or according to the fifth mode/state/configuration described above (in which its primary/main receiver/radio is/operates in an on/high-/higher-/active power mode/state/configuration while its secondary radio/receiver is/operates in an on/high-/higher-/active power mode/state/configuration) and/or the sixth mode/state/configuration described above (in which its primary/main receiver/radio is switching, or at least transitioning, from being/operating in an off/low-/lower-/inactive/doze power mode/state/configuration to being/operating in an on/high-/higher-/active power mode/state/configuration while its secondary radio/receiver is/operates an in on/high-/higher-/active power mode/state/configuration). In some aspects, such an apparatus may be configured to, after, in response to, and/or in association with receiving such a packet (e.g., an awaken packet, a request packet, or awaken request packet, as described in greater detail herein), maintain its secondary receiver/radio in a same/similar power/operation mode/state/configuration (e.g., in the on/high-/higher-/active power mode/state/configuration). In some aspects, such an apparatus may be configured to, after, in response to, and/or in association with receiving such a packet (e.g., an awaken packet, a request packet, or awaken request packet, as described in greater detail herein), switch, or at least initiate a transition, its primary/main radio from an off/low-/lower-/inactive/doze power mode/state/configuration to an on/high-/higher-/active power mode/state/configuration.

In some aspects, such an apparatus may be configured to communicate/transmit a response to such packet/frame (e.g., such response to such packet/frame being a response packet or awaken response packet, as described in greater detail herein) while operating in or according to the fifth mode/state/configuration described above (in which its primary/main receiver/radio is/operates in an on/high-/higher-/active power mode/state/configuration while its secondary radio/receiver is/operates in an on/high-/higher-/active power mode/state/configuration) and/or the sixth mode/state/configuration described above (in which its primary/main receiver/radio is switching, or at least transitioning, from being/operating in an off/low-/lower-/inactive/doze power mode/state/configuration to being/operating in an on/high-/higher-/active power mode/state/configuration while its secondary radio/receiver is/operates in an on/high-/higher-/active power mode/state/configuration). In some aspects, such an apparatus may be configured to (e.g., after/subsequent-to, in response to, and/or in association with communicating/transmitting a response to such packet/frame (e.g., such response to such packet/frame being a response packet or awaken response packet, as described in greater detail herein)) communicate/receive a response acknowledgement message (e.g., an acknowledgement message transmitted from another apparatus indicating whether the aforementioned response to the aforementioned frame/packet (e.g., such response to such packet/frame being a response packet or awaken response packet, as described in greater detail herein)) while operating in or according to the fifth mode/state/configuration described above (in which its primary/main receiver/radio is/operates in an on/high-/higher-/active power mode/state/configuration while its secondary radio/receiver in is/operates an on/high-/higher-/active power mode/state/configuration) and/or the sixth mode/state/configuration described above (in which its primary/main receiver/radio is switching, or at least transitioning, from being/operating in an off/low-/lower-/inactive/doze power mode/state/configuration to being/operating in an on/high-/higher-/active power mode/state/configuration while its secondary radio/receiver is/operates in an on/high-/higher-/active power mode/state/configuration).

In some aspects, such apparatus may be configured to, after, in response to, and/or in association with communicating/receiving a response acknowledgement message (e.g., an acknowledgement message transmitted from another apparatus indicating whether the aforementioned response to the aforementioned frame/packet (e.g., such response to such packet/frame being a response packet or awaken response packet, as described in greater detail herein)), switch, or at least initiate a transition, from (1) operating in or according to the fifth mode/state/configuration described above (in which its primary/main receiver/radio is/operates in an on/high-/higher-/active power mode/state/configuration while its secondary radio/receiver is/operates in an on/high-/higher-/active power mode/state/configuration) and/or the sixth mode/state/configuration described above (in which its primary/main receiver/radio is switching, or at least transitioning, from being/operating in an off/low-/lower-/inactive/doze power mode/state/configuration to being/operating in an on/high-/higher-/active power mode/state/configuration while its secondary radio/receiver is/operates in an on/high-/higher-/active power mode/state/configuration) to (2) operating in or according to the first mode/state/configuration described above (in which its primary/main radio/receiver may be/operate in an on/high-/higher-/active power mode/state/configuration and its secondary radio/receiver may be/operate in an off/low-/lower-/inactive/doze power mode/state/configuration). In some aspects, such apparatus may be configured to, after, in response to, and/or in association with communicating/receiving a response acknowledgement message (e.g., an acknowledgement message transmitted from another apparatus indicating whether the aforementioned response to the aforementioned frame/packet (e.g., such response to such packet/frame being a response packet or awaken response packet, as described in greater detail herein)), maintain its primary/main receiver/radio in a same/similar power/operation mode/state/configuration (e.g., is/in an on/high-/higher-/active power mode/state/configuration). In some aspects, such apparatus may be configured to, after in response to, and/or in association with communicating/receiving a r response acknowledgement message (e.g., an acknowledgement message transmitted from another apparatus indicating whether the aforementioned response to the aforementioned frame/packet (e.g., such response to such packet/frame being a response packet or awaken response packet, as described in greater detail herein)), switch, or at least initiate a transition, from being or operating according to an on/high-/higher-/active power mode/state/configuration to being/operating in an off/low-/lower-/inactive/doze power mode/state/configuration.

In some aspects, such an apparatus may be configured to (e.g., after receiving the aforementioned packet/frame (e.g., an awaken packet, a request packet, or awaken request packet, as described in greater detail herein) (e.g., by its secondary radio/receiver and/or while its secondary radio/receiver is in an on/high-/higher-/active power mode/state/configuration) switch, or at least initiate a transition, its secondary radio/receiver from an on/high-/higher-/active power mode/state/configuration n to an off/low-/lower-/inactive/doze power mode/state/configuration if/only-if/when/only-when/after/only-after-if/only-after (1) at least one frame/packet (e.g., the aforementioned response to the aforementioned frame/packet (e.g., such response to such packet/frame being a response packet or awaken response packet, as described in greater detail herein) is communicated/transmitted to another apparatus and (2) at least one frame/packet associated with that communicated/transmitted packet/frame (e.g., such at least one frame/packet associated with that communicated/transmitted packet/frame being a response acknowledgement message (e.g., an acknowledgement message transmitted from another apparatus indicating whether the aforementioned response to the aforementioned frame/packet)) is communicated/received.

In some aspects, after AP 110 transmits the packet 320, AP 110 may determine whether the transmission was successful based on whether AP 110 receives a response 330 to the transmitted packet 320 during a predetermined period of time after the transmission (e.g., during a time period between time $T_6$ and time $T_9$). In some aspects, AP 110 may determine that the transmission was unsuccessful if no response to the packet 320 is received (e.g., by time $T_9$), and/or may determine that the transmission was successful if a response to the packet 320 was received (e.g., by time $T_9$).

In some aspects, an apparatus/transmitter (e.g., AP) that transmits an awaken request packet may determine whether such transmission was successful based on whether it receives any (e.g., at least one) packets (e.g., awaken response packets) after, in response to, and/or in association with the transmitted awaken request packet during a period/duration (e.g., preset, predetermined, variable) of time after transmitting the awaken request packet. In some aspects, if the apparatus/transmitter (e.g., AP) receives any (e.g., at least one) packets (e.g., awaken response packet(s)) after, in response to, and/or in association with transmission of the awaken request packet, then the apparatus/transmitter (e.g., AP) may determine that the transmission of the awaken request packet was successful. In some aspects, if the apparatus/transmitter (e.g., AP) receives no packets (e.g., awaken response packets) After, in response to, and/or in association with transmission of the awaken request packet, then the apparatus/transmitter (e.g., AP) may determine that the transmission of the awaken request packet was unsuccessful.

In some aspects, an apparatus/receiver (e.g., STA(s)) may alter, adjust, or otherwise change its state, mode, or other configuration based on its success in receiving a packet (e.g., awaken request packet), and/or based on its success in transmitting a packet (e.g., awaken response packet) after, in response to, and/or in association with receiving another packet (e.g., awaken request packet), during a duration/period (e.g., preset, predetermined, variable, etc.) of time after receiving the that packet (e.g., awaken request packet), and/or within a period of time after initiating/completing an awaken procedure (as described herein). A state, mode, or other configuration may refer to or include the radio/antenna utilized by the apparatus/receiver (e.g., STA(s)), the power state or relative power utilization by the apparatus/receiver (e.g., STA(s)) or any of its antenna(s)/receiver(s), and/or any other suitable aspects of the apparatus/receiver (e.g., STA(s)), or as otherwise described herein.

In some aspects, a mode/state/configuration may be a relatively high-/higher-power mode/state/configuration of operation, and another mode/state/configuration may be a relatively lower-power mode/state/configuration of operation. In some aspects, the apparatus/receiver (e.g., STA(s)) may alter, adjust, or otherwise change its state, mode, or other configuration, if/when the apparatus/receiver (e.g., STA(s)) is unsuccessful in receiving any/all packets (e.g., awaken request packets), and/or is unsuccessful in transmitting any/all packets (e.g., awaken response packets) after, in response to, and/or in association with receiving another packet (e.g., awaken request packet), e.g., during a period/duration (e.g., preset, predetermined, variable, etc.) of time after receiving such packet (e.g., awaken request packet), and/or within a period of time after initiating/completing an awaken procedure (as described herein).

In some aspects, as described in greater detail herein, AP 110 may transmit and STA 120 may (e.g., using SR 224) receive the packet 320 while PR 222 is in a low power state/mode, a turned off state, or in a low power state/mode. In some aspects, the received packet 320 includes a field that indicates a version value. In some aspects, STA 120 may do one or more of the following: (A) use the version value to determine whether settings or parameters associated with a basic service set (BSS) are up-to-date or current; (B) use the version value to determine whether to update settings or parameters associated with the BSS; and/or (C) compare the version value (included in the received packet 320) with a previously received version value and, based on the comparison, to determine whether to perform an operation to update the settings or parameters associated with the BSS.

In some aspects, the settings or parameters associated with the BSS may affect communications using at least one of PR 222 or SR 224. In some aspects, in response to receiving the version value, and/or based on any one or more of the aforementioned (A), (B), and/or (C), STA 120 may determine to perform an operation to update such parameters or settings associated with the BSS. In some aspects, the operation to update the settings or parameters of the BSS includes STA 120 awakening PR 222. In some aspect, the operation to update the settings or parameters of the BSS includes STA 120 communicating a request to AP 110 and subsequently receiving a response from AP 110.

In some aspects, an apparatus (e.g. AP) may transmit and another apparatus (e.g., STA) may receive a packet, frame, beacon, or other information comprising various field. In some aspects, non-limiting examples of such packet, frame, beacon, or other information may include an awaken packet, an awaken request packet, an awaken beacon, or various other suitable forms of data/information. In some aspects, such received packet, frame, beacon, or other information may be received by the primary/main radio/receiver of the other apparatus (e.g., STA) (e.g., while the secondary/awaken radio/receiver of the other apparatus (e.g., STA) is turned off or in a low power state). In some aspects, such received packet, frame, beacon, or other information may be received by the secondary/awaken radio/receiver of the other apparatus (e.g., STA) (e.g., while the main/primary radio/receiver of the other apparatus (STA) is turned off or in low power state). In some aspects, such received packet, frame, beacon, or other information may include a field, value, counter, indicator, or number of bits that indicates a version/modification/alteration/synchronization/counter/change number/indicia/value. In some aspects, the other apparatus (e.g., STA) may utilize such version/modification/alteration/synchronization/counter/change number/indicia/value to determine whether information/settings/parameters associated with the basic service set (e.g., with which the apparatus(es) (e.g., AP and/or STA) is/are associated) (e.g., as stored in/by the other apparatus (e.g., STA)) are updated/up-to-date/current and/or whether to update such information/settings/parameters associated with the basic service set (e.g., with which the apparatus(es) (e.g., AP and/or STA) is/are associated) (e.g., as stored in/by the other apparatus (e.g., STA)). In some aspects, the other apparatus (e.g., STA) may compare such received version/modification/alteration/synchronization/counter/change number/indicia/value with a stored or another previously received version/modification/alteration/synchronization/counter/change number/indicia/value and, based on such comparison, determine whether to perform an operation to update such information/settings/parameters associated with the basic service set (e.g., with which the apparatus(es) (e.g., AP and/or STA) is/are associated) (e.g., as stored in/by the other apparatus (e.g., STA)). In some aspects, such information/settings/parameters associated with the basic service set may impact/affect communications by/using the primary/main receiver/radio of the apparatus (e.g., STA)). In some aspects, such information/settings/parameters associated with the basic service set may impact/affect communications by/using the secondary/awaken receiver/radio of the apparatus (e.g., STA).

After, in response to, and/or in association with receiving the aforementioned information (version/modification/alteration/synchronization/counter/changenumber/indicia/value), or in association with or based upon the aforementioned comparison (comparison of such received version/modification/alteration/synchronization/counter/changenumber/indicia/value with a stored or another previously received version/modification/alteration/synchronization/counter/change number/indicia/value) (e.g., as stored in/by the other apparatus (e.g., STA)) or any of the aforementioned determinations (e.g., (i) determining whether information/settings/parameters associated with the basic service set (e.g., with which the apparatus(es) (e.g., AP and/or STA) is/are associated) (e.g., as stored in/by the other apparatus (e.g., STA)) are updated/up-to-date/current), (ii) determining whether to update such information/settings/parameters associated with the basic service set (e.g., with which the apparatus(es) (e.g., AP and/or STA) is/are associated) (e.g., as stored in/by the other apparatus (e.g., STA)), (iii) or determine whether to perform an operation to update such information/settings/parameters associated with the basic service set (e.g., with which the apparatus(es) (e.g., AP and/or STA) is/are associated), the apparatus (e.g., STA) may make a determination.

In some aspects, such a determination is that no further action is required in relation to the information/settings/ parameters associated with the basic service set (e.g., when the information/settings/parameters associated with the basic service set is up-to-date). In some actions, such a determination is to perform an operation to update such information/settings/parameters associated with the basic service set (e.g., when the information/settings/parameters associated with the basic service set is not up-to-date). In some aspects, such an operation to update such information/ settings/parameters associated with the basic service set may be for the apparatus (e.g., STA) to awaken or enter into a high(er) power state (e.g., with respect to its primary/main radio). In some aspects, such an operation to update such information/settings/parameters associated with the basic service set may be for the apparatus (e.g., STA) to update/ change its stored version/modification/alteration/synchronization/counter/change number/indicia/value based on the received version/modification/alteration/synchronization/ counter/change number/indicia/value. In some aspects, such an operation to update such information/settings/parameters associated with the basic service set may be for the apparatus (e.g., STA) to communicate a request (e.g., probe request) to another apparatus (e.g., AP) and/or subsequently receive a response (e.g., probe response) after, in response to, and/or in association with its request (e.g., probe request). In some aspects, the response to its request may include updated information/settings/parameters associated with the basic service. In some aspects, such an operation to update such information/settings/parameters associated with the basic service set may be for the apparatus (e.g., STA) to awaken the primary/main receiver/radio to decode/process/obtain information contained in at least a portion of the aforementioned received packet, frame, beacon, or other information.

In some aspects, the packet 320 includes a counter or counter value. In some aspects, the counter or counter value is regarding an availability of an updated value for one or more parameters of a BSS (e.g., with/to which the apparatus is associated). In some aspects, the counter or counter value is regarding whether an updated value for one or more parameters of a BSS (with/to which the apparatus is associated) is available for STA 120. In some aspects, STA 120 is configured to utilize the counter or counter value to determine whether an updated value for one or more parameters of a BSS (with/to which the apparatus is associated) is available.

In accordance with many aspects described herein, STA 120 may be configured to operate according to any one or more of the following configurations: (1) a first configuration in which PR 222 operates in a high/active power state/mode (e.g., a continuous high/active power state/mode) while its SR 224 operates in a low/doze power state/mode; (2) a second configuration in which PR 222 alternates between a period of operating in a high/active power state/ mode and a period of operating in a low/doze power state/mode according to a duty cycle or periodicity while its SR 224 operates in a low/doze power state/mode; (3) a third configuration in which PR 222 operates in a low/doze power state/mode and SR 224 operates in a high/active power (e.g., a continuous high/active power state/mode); and/or (4) a fourth configuration in which PR 222 operates in a low/doze power mode and SR 224 alternates between a period of operating in a high/active power mode followed by a period of operating in a low/doze power mode according to a duty cycle or periodicity.

In some aspects, STA 120 may use PR 222 and/or SR 224 to receive a signal from AP 110 and transition between any two (or more) of the four aforementioned configurations (listed above as (1) through (4)) after or based on a signal received from AP 110. In some aspects, as described in greater detail herein, STA 120 may use SR 224 to receive the packet 320 and, in response to receiving the packet 320, alter a mode of PR 222 from a low/doze power mode to a high/active power mode. In some aspects, STA 120 may transition from the first configuration (see (1) above) or the second configuration (see (2) above) to the third configuration (see (3) above) or the fourth configuration (see (4) above), if/when the apparatus determines that a buffer of a transmitting device (e.g., AP 110) with which STA 120 intends to communicate does not have a frame or packet addressed to it.

In some aspects, an apparatus (e.g., STA/AP) may operate in various modes/states/configurations without deviating from the scope of the present disclosure. In some aspects, the apparatus may be/operate in a first mode/state/configuration in which its primary/main radio/receiver may be/operate in an on/high-/higher-/active power mode/state/configuration and its secondary radio/receiver may be/operate in an off/ low-/lower-/inactive/doze power mode/state/configuration. In some aspects, the apparatus may be/operate in a second mode/state/configuration in which its primary/main radio/ receiver may cycle/alternate/vary between a period/duration of being/operating in an on/high-/higher-/active power mode/state/configuration and/followed by a period/duration of being/operating in an off/low-/lower-/inactive/doze power mode/state/configuration (or vice versa), e.g., according to a duty cycle, schedule, frequency, or periodicity and its secondary radio/receiver may be/operate in an off/low-/ lower-/inactive/doze power mode/state/configuration.

In some aspects, the apparatus may be/operate in a third mode/state/configuration in which its primary/main radio/ receiver may be/operate in an off/low-/lower-/inactive/doze power mode/state/configuration and its secondary radio/ receiver may be/operate in an always/continuously on/high-/ higher-/active power mode/state/configuration. In some aspects, the apparatus may be/operate in a fourth mode/state/ configuration in which its primary/main radio/receiver may be/operate in an off/low-/lower-/inactive/doze power mode/ state/configuration and its secondary radio/receiver may cycle/alternate between a period of being/operating in an on/high-/higher-/active power mode/state/configuration followed by a period of being/operating in an off/low-/lower-/ inactive/doze power mode/state/configuration (or vice versa), e.g., according to a duty cycle, schedule, frequency, or periodicity.

The apparatus may transition between any two or more of the modes/states/configurations described herein, e.g., upon/ after/based on a signal or power-related indicator/indicia/ information/parameter/field received from another apparatus (e.g., AP/STA), possibly using the primary/main receiver/radio and/or using the secondary receiver/radio from another apparatus (e.g., AP/STA). In some aspects, the apparatus (e.g., STA/AP) may use the main/primary receiver/radio to receive the awaken request packet (described herein) and/or transmit the awaken response packet (described herein). In some aspects, the apparatus uses the secondary receiver/radio to receive the awaken request packet (described herein) and/or transmit the awaken response packet (described herein). In some aspects, after, in response to, and/or in association with receiving the awaken request packet, the apparatus may turn-on/activate/enable/ power-increase or otherwise alter a mode/state/configuration of the main/primary receiver/radio from a low-/lower-/ inactive/off/doze power state/mode/configuration/configuration to a high-/higher-/active/on power state/mode/configuration/configuration. In some aspects, after, in response to, and/or in association with receiving the awaken request packet, the apparatus may turn-on/activate/enable/power-increase or otherwise alter a mode/state/configuration of the secondary receiver/radio from a low-/lower-/inactive/off/doze power state/mode/configuration to a high-/higher-/active/on power state/mode/configuration.

In some aspects, a (receiving) apparatus (e.g., STA/AP) may transition/change to the third mode/state/configuration (as described herein) or the fourth mode/state/configuration described above (in which its primary/main radio/receiver may be/operate in an off/low-/lower-/inactive/doze power mode/state/configuration and its secondary radio/receiver may cycle/alternate between a period of being/operating in an on/high-/higher-/active power mode/state/configuration followed by a period of being/operating in an off/low-/lower-/inactive/doze power mode/state/configuration (or vice versa), e.g., according to a duty cycle, schedule, frequency, or periodicity), e.g., from the first mode/state/configuration described above (in which its primary/main radio/receiver may be/operate in an on/high-/higher-/active power mode/state/configuration and its secondary radio/receiver may be/operate in an off/low-/lower-/inactive/doze power mode/state/configuration) from or the second mode/state/configuration described above (in which its primary/main radio/receiver may cycle/alternate/vary between a period/duration of being/operating in an on/high-/higher-/active power mode/state/configuration and/followed by a period/duration of being/operating in an off/low-/lower-/inactive/doze power mode/state/configuration (or vice versa), e.g., according to a duty cycle, schedule, frequency, or periodicity and its secondary radio/receiver may be/operate in an off/low-/lower-/inactive/doze power mode/state/configuration), when/if or only if/when (i) that (receiving) apparatus determines that a buffer of another (transmitting) apparatus (e.g., AP/STA) with which it is/intends/destined to communicate is empty or does not have a packet/frame addressed to that (receiving) apparatus and/or (ii) the (receiving) apparatus determines that a (transmission) buffer of that (receiving) apparatus is empty or does not have a packet/frame addressed to that other (transmitting) apparatus.

In some aspects, STA 120 may be configured to forgo listening for one or more beacons when either (i) PR 222 is alternating between a period of operating in a high/higher/active power state/mode followed by a period of operating in an off/low/lower/doze power state/mode, or (ii) PR 222 is operating (e.g., at least partially) according to the second configuration (see (2) above). In some aspects, if (i) SR 224 is operating in (e.g., a continuous) high/higher/active power mode/state, or (ii) SR 224 is operating (e.g., at least partially) according to the third configuration (see (3) above), then STA 120 may forgo listening for one or more beacons when PR 222 is either (i) alternating between a period of operating in an on/high/higher/active power mode/state followed by a period of operating in an off/low/lower/doze power state/mode, or (ii) operating (e.g., at least partially) according to the second configuration (see (2) above).

In some aspects, if (i) SR 224 is alternating between a period of operating in an on/high/higher/active power mode/state followed by a period of operating in an off/low/lower/doze power state/mode, or (ii) SR 224 is operating (e.g., at least partially) according to the fourth configuration (see (4) above), then STA 120 may forgo listening for one or more beacons when PR 222 is either (i) alternating between a period of operating in an on/high/higher/active power mode/state followed by a period of operating in an off/low/lower/doze power state/mode, or (ii) operating (e.g., at least partially) according to the second configuration (see (2) above). In some aspects, if (i) the STA 120 is operating according to a state/mode in which PR 222 operates in a low/lower/doze power state/mode and SR 124 operates in a high/higher/active power state/mode or (ii) the STA 120 is operating according to the third configuration (see (3) above), STA 120 may be configured to hold or suspend one or more service periods previously negotiated between the apparatus and AP 110. In some aspects, wherein STA 120 may be configured to operate according to a fifth mode, wherein one or more negotiated parameters/settings for communication using SR 224 is/are suspending while SR 224 is enabled to power down, turn off, or otherwise enter into a low/doze power state/mode.

In some aspects, if/when/while its main/primary antenna/receiver and/or its secondary antenna/receiver is operating in or according to (i) the third mode/state/configuration described above (in which its primary/main radio/receiver may be/operate in an off/low-/lower-/inactive/doze power mode/state/configuration and its secondary radio/receiver may be/operate in an (e.g., always/continuously) on/high-/higher-/active power mode/state/configuration) and/or (ii) the (above-described) fourth mode/state/configuration (in which its primary/main radio/receiver may be/operate in an off/low-/lower-/inactive/doze power mode/state/configuration and/or its secondary radio/receiver may cycle/alternate between a period of being/operating in an on/high-/higher-/active power mode/state/configuration followed by a period of being/operating in an off/low-/lower-/inactive/doze power mode/state/configuration (or vice versa), e.g., according to a duty cycle, schedule, frequency, or periodicity), the apparatus (e.g., STA) may use/operate/configure its secondary radio/receiver according to a duty cycle, schedule, frequency, or periodicity, e.g., which may have been previously negotiated between the apparatus (e.g., STA) and another apparatus (e.g., AP), e.g., if/when/provided the apparatus (e.g., STA) or its primary/main antenna/receiver is operating in or according to an off/low-/lower-/inactive/doze power mode/state/configuration.

In some aspects, if/when/while operating its primary/main radio/receiver and/or its secondary antenna/receiver in or according to (i) the third mode/state/configuration described above (in which its primary/main radio/receiver may be/operate in an off/low-/lower-/inactive/doze power mode/state/configuration and its secondary radio/receiver may be/operate in an (e.g., always/continuously) on/high-/higher-/active power mode/state/configuration) and/or (ii) the (above-described) fourth mode/state/configuration (in which its primary/main radio/receiver may be/operate in an off/low-/lower-/inactive/doze power mode/state/configuration and/or its secondary radio/receiver may cycle/alternate between a period of being/operating in an on/high-/higher-/active power mode/state/configuration followed by a period being/operating in an off/low-/lower-/inactive/doze power mode/state/configuration (or vice versa), e.g., according to a duty cycle, schedule, frequency, or periodicity), the apparatus (e.g., STA) may refrain/avoid/elect-to-not/forego/not utilize its primary/main antenna/receiver and/or its secondary antenna/receiver to receive/listen-for one or more packets, frames, and/or beacons, e.g., if/when the apparatus (e.g., STA) or its primary/main antenna/receiver is/are operating in or according to the second mode/state/configuration described above (in which its primary/main radio/receiver may cycle/alternate/vary between a period/duration of being/operating in an on/high-/higher-/active power mode/ state/configuration and/followed by a period/duration of being/operating in an off/low-/lower-/inactive/doze power mode/state/configuration (or vice versa), e.g., according to a duty cycle, schedule, frequency, or periodicity and its secondary radio/receiver may be/operate in an off/low-/lower-/inactive/doze power mode/state/configuration) or the third mode/state/configuration described above (in which its primary/main radio/receiver may be/operate in an off/low-/lower-/inactive/doze power mode/state/configuration and its secondary radio/receiver may be/operate in an (e.g., always/continuously) on/high-/higher-/active power mode/state/configuration).

As described in greater detail herein, in some aspects, an apparatus (e.g., STA/AP) may operate in various modes/states/configurations without deviating from the scope of the present disclosure. In some aspects, if/when an apparatus (e.g., STA/AP) operates according to the aforementioned third mode/state/configuration (in which its primary/main radio/receiver may be/operate in an off/low-/lower-/inactive/doze power mode/state/configuration and its secondary radio/receiver may be/operate in an on/high-/higher-/active power mode/state/configuration), the secondary radio/receiver of the apparatus may operate according to a first state/mode/configuration (in which the secondary radio/receiver is powered on/up (e.g., operating/operated according to a high/higher power state) and/or enabled to receive and/or transmit frames/packets (e.g., awaken request packets, awaken packets, awaken request response packets, and any other packets or encapsulations of data/information)) and/or in a second state/mode configuration (in which the secondary radio/receiver is powered off/down (e.g., operating/operated according to a low/lower power state) and/or unable to receive and/or transmit frames/packets (e.g., awaken request packets, awaken packets, awaken request response packets, and any other packets or encapsulations of data/information)).

In some aspects, if/when an apparatus (e.g., STA/AP) operates according to the aforementioned third mode/state/configuration (in which its primary/main radio/receiver may be/operate in an off/low-/lower-/inactive/doze power mode/state/configuration and its secondary radio/receiver may be/operate in an on/high-/higher-/active power mode/state/configuration), the apparatus (e.g., STA) may be configured to inactivate, hold, stop, suspend, or otherwise not maintain/implement one or more communication aspects/windows (e.g., one or more service periods previously negotiated between the apparatus (e.g., (STA) and another apparatus (e.g., AP/another-STA)).

In some aspects, the apparatus (e.g., STA) may be configured to operate according to a seventh mode/state/configuration, in which the secondary radio/receive operates according to the aforementioned second state/mode/configuration (in which the secondary radio/receiver is powered off/down (e.g., operating/operated according to a low/lower power state) and/or unable to receive and/or transmit frames/packets (e.g., awaken request packets, awaken packets, awaken request response packets, and any other packets or encapsulations of data/information)) and/or the apparatus (e.g., STA) may be configured to activate, not hold, not stop, not suspend, or otherwise maintain/implement one or more communication aspects/windows (e.g., one or more service periods previously negotiated between the apparatus (e.g., STA) and another apparatus (e.g., AP/another-STA)).

In some aspects, an apparatus (e.g., AP and/or STA) may at some times operate in accordance with a mode different from the aforementioned mode(s)/state(s). In some aspects, operation in accordance e with such a mode by such an apparatus may include maintaining/holding/suspending/storing/retaining one or more negotiated parameters/settings/configurations for communication using at least one of the radios/receivers (e.g., the primary/main radio/receiver and/or secondary radio/receiver) of such an apparatus while/and permitting/enabling at least one of the radios/receivers (e.g., that same radio/receiver, the primary/main radio/receiver, and/or secondary radio/receiver) to turn-off, power-down, or otherwise operate in accordance with another state/mode (e.g., a relatively lower state/mode). In some aspects, operation in accordance with such a mode by such an apparatus may additionally or alternatively include maintaining/not-suspending communication using at least one of the radios/receivers (e.g., the primary/main radio/receiver and/or secondary radio/receiver) of such an apparatus without a change in the mode/state in relation to communication by that radio(s)/receiver(s).

In some aspects, an apparatus (e.g., AP) may determine a communication channel associated with operation by another apparatus (e.g., STA) (1) in a mode (e.g., awaken mode), e.g., a mode that utilizes a secondary/awaken radio/receiver, which may be different from its main/primary radio/receiver to communicate certain information, or (2) for communication (e.g., of data/information) using its secondary/awaken radio/receiver, which may be different from its main/primary radio/receiver. In some aspects, one apparatus (e.g., AP) may transmit and another apparatus (e.g., STA) may receive a beacon, packet, frame or other information indicating a communication channel for use/operation by the other apparatus (e.g., STA), and the other apparatus (e.g., STA) may modify, maintain, switch, or select a communication channel for use/operation by the secondary/awaken radio of the other apparatus (e.g., STA) based on such received beacon, packet, frame or other information. In some aspects, one apparatus (e.g., AP) may determine which/a communication channel the other apparatus (e.g., receiving apparatus) to select for the other apparatus (e.g., STA) for operation/use by its secondary/awaken radio/receiver based on a/the communication channel that the other apparatus (e.g., STA) does/will use/operate for communication(s) by its primary/main radio/receiver. In some aspects, one apparatus (e.g., AP) may select a/the communication channel for the other apparatus' (e.g., STA's) secondary/awaken radio/receiver such that it differs from a/the communication channel for the other apparatus' (e.g., STA's) main/primary radio/receiver, e.g., when/if the frequency/band/parameters utilized by the other apparatus (e.g., STA) correspond to or may be utilized in accordance with dynamic frequency selection.

As described in greater detail herein, in some aspects, a communication/transmission (e.g., a packet, data packet, a frame, a data frame, an awaken packet, an awaken request packet, a request packet, a response packet, an awaken response packet, a beacon, and/or any various other suitable encapsulation of information) and/or any one or more of its field(s), signal(s), bit(s), or portion(s)) may be configured to include various fields or information. In some aspects, such fields/information may include information indicating a time by which one or more receivers of the (respective) a communication/transmission (e.g., a packet, data packet, a frame, a data frame, an awaken packet, an awaken request packet, a request packet, a response packet, an awaken response packet, a beacon, and/or any various other suitable encapsulation of information) shall finish an awaken procedure that transitions that/those receiver(s), or any one or more of its receiver(s)/radio(s), from a low-power state to a high power state. In some aspects, an apparatus (e.g., receiver/recipient) of the communication/transmission (e.g., a packet, data packet, a frame, a data frame, an awaken packet, an awaken request packet, a request packet, a response packet, an awaken response packet, a beacon, and/or any various other suitable encapsulation of information) may determine when (e.g., a specific time, perhaps in relation to the time of receiving the communication/transmission (e.g., a packet, data packet, a frame, a data frame, an awaken packet, an awaken request packet, a request packet, a response packet, an awaken response packet, a beacon, and/or any various other suitable encapsulation of information)) (i) to perform an awaken procedure, (ii) to complete an awaken procedure, or (iii) to turn on or power up one or more of its receivers/radios.

As also described in greater detail herein, in some aspects, an apparatus (e.g., AP and/or STA) may transmit, receive, and/or negotiate a field, parameter, data, information, information element, or indication indicating a period of time corresponding to/associated with transitioning from a one state (e.g., awake, doze, power save, or active state) to another state (e.g., awake, doze, power save, or active state) in response to transmitting, receiving, and/or negotiating a particular packet, data packet, transmission, or other information, such as an awaken packet, request packet, or awaken request packet. In some aspects, an apparatus (e.g., AP and/or STA) may perform an operation (e.g., transition from one state/mode to another state/mode) in accordance with such field, parameter, data, information, information element, or indication.

In some aspects, such an operation may be or include transmitting, scheduling a transmission, receiving, or scheduling reception of any communication/transmission (e.g., a packet, data packet, a frame, a data frame, an awaken packet, an awaken request packet, a request packet, a response packet, an awaken response packet, a beacon, and/or any various other suitable encapsulation of information) described herein. As an example, an AP may transmit or schedule to transmit a communication/transmission (e.g., a packet, data packet, a frame, a data frame, an awaken packet, an awaken request packet, a request packet, a response packet, an awaken response packet, a beacon, and/or any various other suitable encapsulation of information) in accordance with (1) such indication indicating a period of time corresponding to/associated with transitioning from one state (e.g., awake, doze, power save, or active state) to another state (e.g., awake, doze, power save, or active state) and (2) such information indicating a time by which one or more receivers of the (respective) awaken request packet(s) shall finish an awaken procedure that transitions that/those receiver(s), or any one or more of its receiver(s)/radio(s), from a low-power state to a high power state. In some aspects, such communication/transmission may be in accordance with such an indication when that communication/transmission occurs (1) after/upon expiration/termination of such period of time corresponding to/associated with transitioning from one state (e.g., awake, doze, power save, or active state) to another state (e.g., awake, doze, power save, or active state), and/or (2) the receiving apparatus (e.g., STA) and/or any of its radios/transceivers are currently/already operating in the other state (e.g., awake, doze, power save, or active state).

As another example, a STA may receive or schedule (e.g., receipt of) a communication/transmission (e.g., a packet, data packet, a frame, a data frame, an awaken packet, an awaken request packet, a request packet, a response packet, an awaken response packet, a beacon, and/or any various other suitable encapsulation of information) in accordance with (1) such indication indicating a period of time corresponding to/associated with transitioning from one state (e.g., awake, doze, power save, or active state) to another state (e.g., awake, doze, power save, or active state), and/or (2) such information indicating a time by which one or more receivers of the (respective) awaken request packet(s) shall finish an awaken procedure that transitions that/those receiver(s), or any one or more of its receiver(s)/radio(s), from a low-power state to a high power state. In some aspects, such communication/transmission may be in accordance with such an indication when that communication/transmission occurs (1) after/upon expiration/termination of such period of time corresponding to/associated with transitioning from one state (e.g., awake, doze, power save, or active state) to another state (e.g., awake, doze, power save, or active state), and/or (2) the receiving apparatus (e.g., STA) and/or any of its radios/transceivers are currently/already operating in the other state (e.g., awake, doze, power save, or active state).

In some aspects, at block 408, AP 110 and STA 120 may perform UL and/or DL communication(s). For example, STA 120 may utilize PR 222 for UL/DL communication 340 at time Tu. In some aspects, at block 410, AP 110 and/or STA 120 (e.g., using PR 222) may transmit one or more communications that result in termination or teardown of one or more of the negotiated parameters, settings, and/or configurations relating to operation(s) of AP 110, STA 120, PR 222, and/or SR 224, as described in greater detail herein.

One of ordinary skill in the art will understand that certain terms described herein may be interchangeable without necessarily deviating from their respective meaning. In some aspects, the following terms may be interchangeable without necessarily deviating from the scope of the present disclosure: packet, frame, beacon, signal, transmission, communication, and/or various other suitable terms. In some aspects, the following terms may be interchangeable without necessarily deviating from the scope of the present disclosure: packet, request packet, awaken request packet, and/or various other suitable terms. In some aspects, the following terms may be interchangeable without necessarily deviating from the scope of the present disclosure: response, response packet, awaken response packet, and/or various other suitable terms. In some aspects, the following terms may be interchangeable without necessarily deviating from the scope of the present disclosure: data packet, data portion, data, payload, and/or various other suitable terms.

Figure 5:
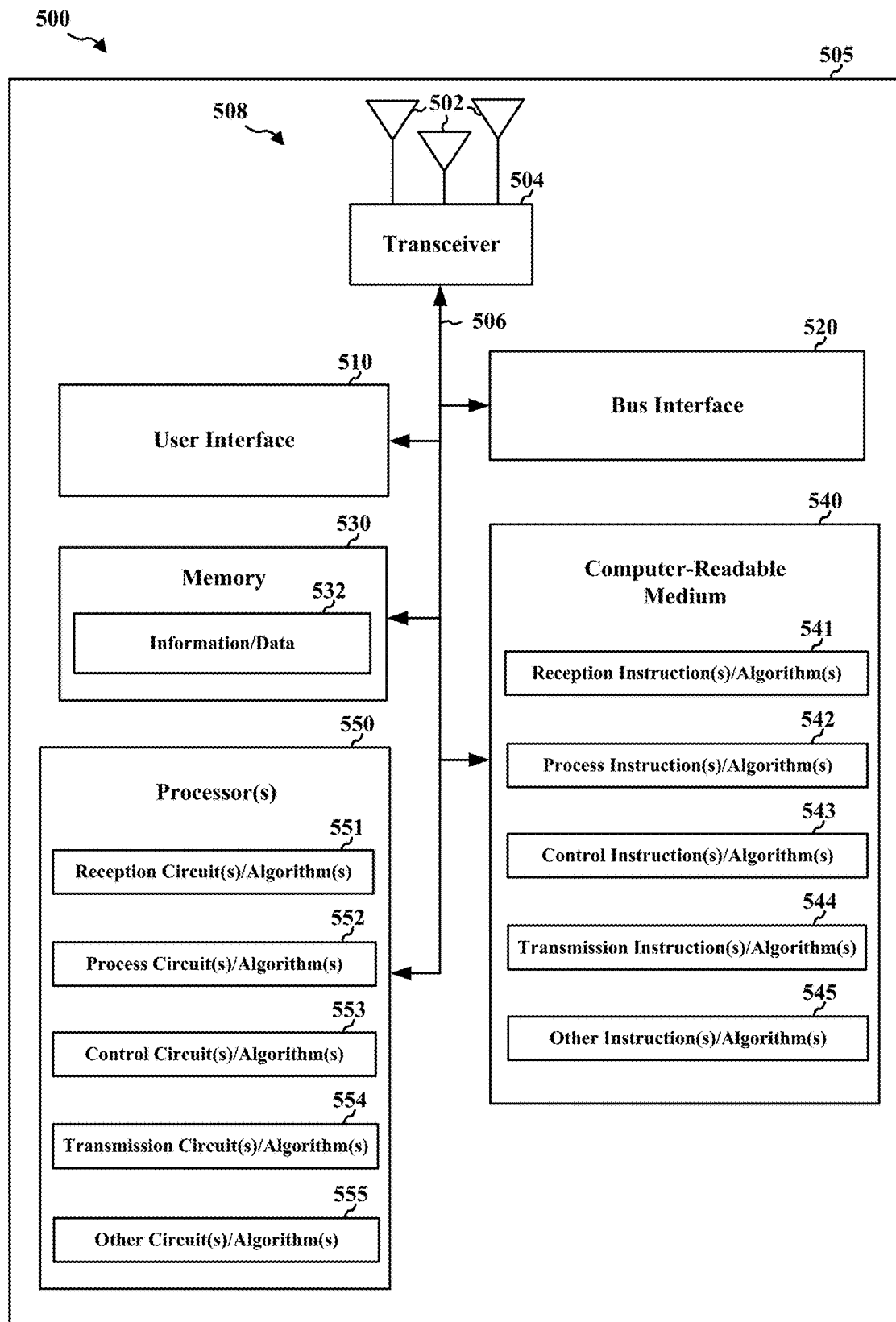
FIG. 5 is a diagram illustrating a non-limiting example of a STA according to some aspects of the present disclosure.

FIG. 5 is a diagram 500 illustrating a non-limiting example of a processing system 505 according to some aspects of the present disclosure. In some aspects, the processing system 505 is included in or is a component of AP 110. In some aspects, the processing system 505 is AP 110. The processing system 505 may have various circuits, algorithms, hardware components, software modules, and/or computer-readable medium storing computer-executable instructions comprising various algorithms, any of the foregoing of which, individually or in some combination, may provide the structure corresponding to the means for performing any one or more of the functions, features, steps, elements, methods, operations, and/or aspects described throughout the present disclosure.

The processing system 505 may include a bus 506. The bus 506 may include any number of interconnecting buses and/or bridges depending on the particular design of processing system 505. The bus 506 may provide a connection/link between various aspects of the processing system 505, which may include one or more of the following: processor(s) 550, computer-readable medium 540, memory 530, user interface 510, bus interface 520, transceiver 504, and/or antenna(s) 502. The bus 506 may enable a link between/to various other aspects, such as timing sources, peripherals, voltage regulators, and/or power management circuits. The user interface 510 may exchange data via the bus interface 520. The bus interface 520 may provide an interface between the bus 506 and the transceiver 504.

The transceiver 504 may be connected to one or more antennas 502. The transceiver 504 may provide a means for wirelessly communicating (e.g., receiving data and/or transmitting data) with various other apparatus over a wireless transmission medium. In some aspects, the transceiver 504 may receive a signal from the one or more antennas 502, extract information from the received signal, and provide the extracted information to the processor(s) 550. In some aspects, the transceiver 504 may receive information from the processor(s) 550 and, based on the received information, generate a signal to be applied to the one or more antennas 502. The memory 530 may include various information/data 532 related to any one or more of the functions, features, steps, methods, processes, operations, and/or aspects described herein.

The processor(s) 550 may include one or more circuits configured to enable, may perform one or more algorithms related to, and/or may provide the structure (e.g., means for) corresponding to any one or more of the functions, features, steps, methods, processes, operations, and/or aspects described herein. In some aspects, the reception circuit(s)/algorithm(s) 551 may be configured to enable, may perform one or more algorithms related to, and/or may provide the structure (e.g., means for) corresponding to any one or more of the functions, features, steps, methods, processes, operations, and/or aspects described herein, e.g., with respect to AP 110, in relation to or involving any receiving of anything. In some aspects, the process circuit(s)/algorithm(s) 552 may be configured to enable, may perform one or more algorithms related to, and/or may provide the structure (e.g., means for) corresponding to any one or more of the functions, features, steps, methods, processes, operations, and/or aspects described herein, e.g., with respect to AP 110, in relation to or involving any processing, initiating, demodulating, modulating, encoding, and/or decoding of anything.

In some aspects, the control circuit(s)/algorithm(s) 553 may be configured to enable, may perform one or more algorithms related to, and/or may provide the structure (e.g., means for) corresponding to any one or more of the functions, features, steps, methods, processes, operations, and/or aspects described herein, e.g., with respect to AP 110, in relation to or involving any using, determining, considering, refraining from, selecting, utilizing, setting, affecting, transitioning, comparing, foregoing, and/or inferring of anything. In some aspects, the transmission circuit(s)/algorithm(s) 554 may be configured to enable, may perform one or more algorithms related to, and/or may provide the structure (e.g., means for) corresponding to any one or more of the functions, features, steps, methods, processes, operations, and/or aspects described herein, e.g., with respect to AP 110, in relation to or involving any transmitting, generation, and/or communicating of anything. In some aspects, the other circuit(s)/algorithm(s) 555 may be configured to enable, may perform one or more algorithms related to, and/or may provide the structure (e.g., means for) corresponding to any one or more of the functions, features, steps, methods, processes, operations, and/or aspects described herein, e.g., with respect to AP 110, in relation to or involving anything else.

The processor(s) 550 may be responsible for various processing operations, including the execution of software (e.g., instructions, code, algorithms, etc.) stored in/on the computer-readable medium 540. Each of the circuits 551, 552, 553, 554, 555 described herein may be or include one or more hardware components specifically configured to carry out the stated processes/algorithm, implemented by one or more processor(s) 550 configured to perform the stated processes/algorithm, stored within a computer-readable medium 540 for implementation by the one or more processor(s) 550, memory 530, or any combination thereof.

The computer-readable medium 540 may be used for storing data that is used, processed, and/or manipulated by the processor(s) 550. The computer-readable medium 540 may be a non-transitory computer-readable medium. The computer-readable medium 540 may include one or more instructions (e.g., computer-executable code) configured to enable, may perform one or more algorithms related to, and/or may provide the structure (e.g., means for) corresponding to any one or more of the functions, features, steps, methods, processes, operations, and/or aspects described herein. In some aspects, the reception instruction(s)/algorithm(s) 541 may include one or more instructions (e.g., computer-executable code) configured to enable, may perform one or more algorithms related to, and/or may provide the structure (e.g., means for) corresponding to any one or more of the functions, features, steps, methods, processes, operations, and/or aspects described herein, e.g., with respect to AP 110, in relation to or involving any receiving of anything. In some aspects, the process instruction(s)/algorithm(s) 542 may include one or more instructions (e.g., computer-executable code) configured to enable, may perform one or more algorithms related to, and/or may provide the structure (e.g., means for) corresponding to any one or more of the functions, features, steps, methods, processes, operations, and/or aspects described herein, e.g., with respect to AP 110, in relation to or involving any processing, initiating, demodulating, modulating, encoding, and/or decoding of anything.

In some aspects, the control instruction(s)/algorithm(s) 543 may include one or more instructions (e.g., computer-executable code) configured to enable, may perform one or more algorithms related to, and/or may provide the structure (e.g., means for) corresponding to any one or more of the functions, features, steps, methods, processes, operations, and/or aspects described herein, e.g., with respect to AP 110, in relation to or involving any using, determining, considering, refraining from, selecting, utilizing, setting, affecting, transitioning, comparing, foregoing, and/or inferring of anything. In some aspects, the transmission instruction(s)/algorithm(s) 544 may include one or more instructions (e.g., computer-executable code) configured to enable, may perform one or more algorithms related to, and/or may provide the structure (e.g., means for) corresponding to any one or more of the functions, features, steps, methods, processes, operations, and/or aspects described herein, e.g., with respect to AP 110, in relation to or involving any transmitting, generation, and/or communicating of anything. In some aspects, the other instruction(s)/algorithm(s) 545 may include one or more instructions (e.g., computer-executable code) configured to enable, may perform one or more algorithms related to, and/or may provide the structure (e.g., means for) corresponding to any one or more of the functions, features, steps, methods, processes, operations, and/or aspects described herein, e.g., with respect to AP 110, in relation to or involving anything else.

In some aspects, a radio 508 includes or refers to the transceiver 504. In some aspects, a radio 508 includes or refers to the transceiver 504 and the one or more antennas 502. In some aspects, a radio 508 includes or refers to the transceiver 504 and one or more of the other components described herein (e.g., one or more processor(s) 550, any computer readable medium 540, the bus 506, the bus interface 520, and/or memory 530), possibly also including the one or more antennas 502. A radio 508 may additionally or alternatively be designed and implemented using various components, at least one or all of which may not be illustrated in FIG. 5 nor explicitly described herein, without necessarily deviating from the scope of the present disclosure.

Figure 6:
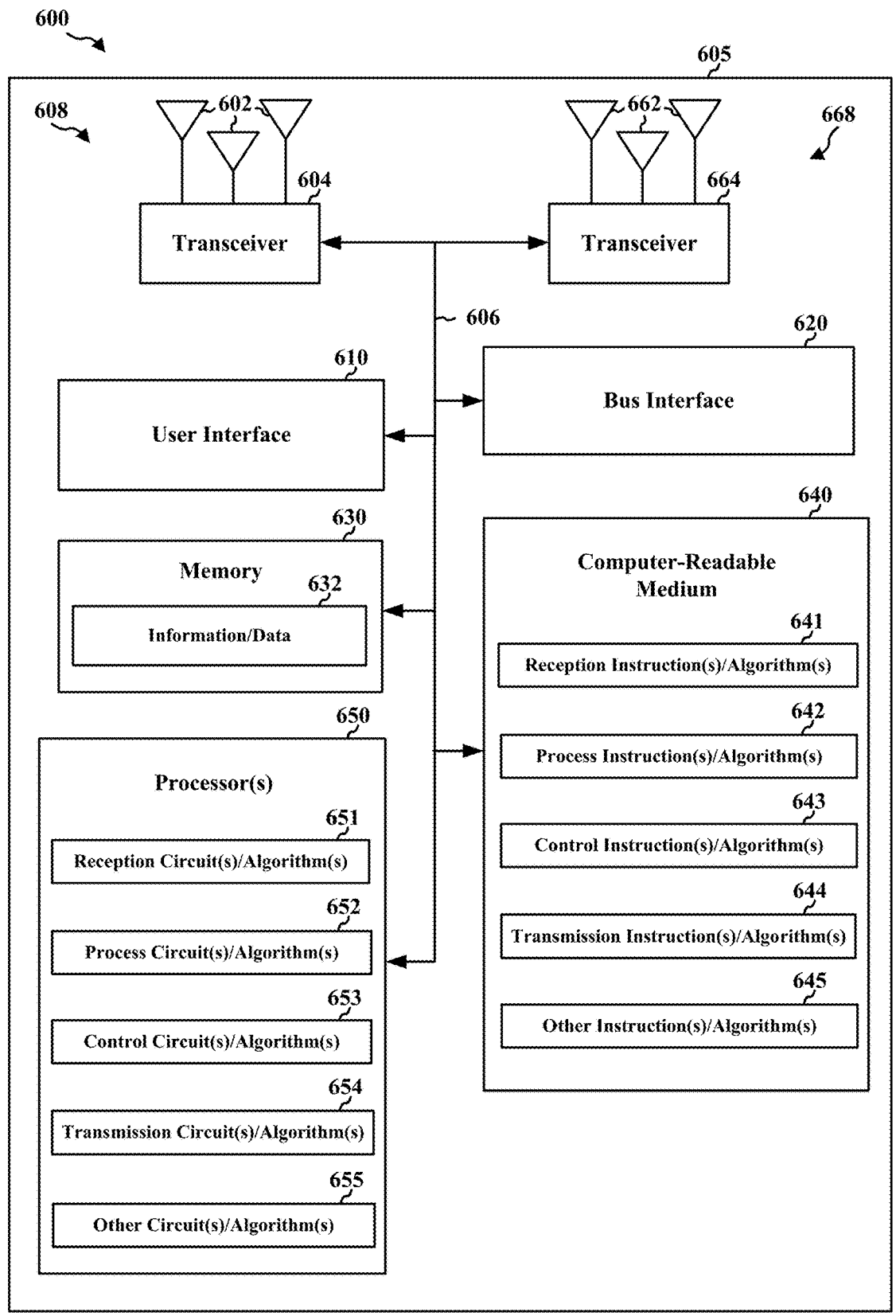
FIG. 6 is a diagram illustrating a non-limiting example of an AP according to some aspects of the present disclosure.

FIG. 6 is a diagram 600 illustrating a non-limiting example of a processing system 605 according to some aspects of the present disclosure. In some aspects, the processing system 605 is included in or is a component of STA 120. In some aspects, the processing system 605 is STA 120. The processing system 605 may have various circuits, algorithms, hardware components, software modules, and/or computer-readable medium storing computer-executable instructions comprising various algorithms, any of the foregoing of which, individually or in some combination, may provide the structure corresponding to the means for performing any one or more of the functions, features, steps, elements, methods, operations, and/or aspects described throughout the present disclosure.

The processing system 605 may include a bus 606. The bus 606 may include any number of interconnecting buses and/or bridges depending on the particular design of the processing system 605. The bus 606 may provide a connection/link between various aspects of the processing system 605, which may include one or more of the following: processor(s) 650, computer-readable medium 640, memory 630, user interface 610, bus interface 620, first transceiver 604, second transceiver 664, antenna(s) 662, and/or antenna(s) 602. The bus 606 may enable a link between/to various other aspects, such as timing sources, peripherals, voltage regulators, and/or power management circuits. The user interface 610 may exchange data via the bus interface 620. The bus interface 620 may provide an interface between the bus 606 and the transceivers 604, 664.

The transceivers 604, 664 may be respectively connected to one or more antennas 602, 662. The transceivers 604, 664 may provide means for wirelessly communicating (e.g., receiving data and/or transmitting data) with various other apparatus over a wireless transmission medium. In some aspects, the transceivers 604, 664 may receive a signal from the one or more antennas 602, 662, extract information from the received signal, and provide the extracted information to the processor(s) 650. In some aspects, the transceivers 604, 664 may receive information from the processor(s) 650 and, based on the received information, generate a signal to be applied to the one or more antennas 602, 662. The memory 630 may include various information/data 632 related to any one or more of the functions, features, steps, methods, processes, operations, and/or aspects described herein.

The processor(s) 650 may include one or more circuits configured to enable, may perform one or more algorithms related to, and/or may provide the structure (e.g., means for) corresponding to any one or more of the functions, features, steps, methods, processes, operations, and/or aspects described herein. In some aspects, the reception circuit(s)/algorithm(s) 651 may be configured to enable, may perform one or more algorithms related to, and/or may provide the structure (e.g., means for) corresponding to any one or more of the functions, features, steps, methods, processes, operations, and/or aspects described herein, e.g., with respect to STA 120, in relation to or involving any receiving of anything. In some aspects, the process circuit(s)/algorithm(s) 652 may be configured to enable, may perform one or more algorithms related to, and/or may provide the structure (e.g., means for) corresponding to any one or more of the functions, features, steps, methods, processes, operations, and/or aspects described herein, e.g., with respect to STA 120, in relation to or involving any processing, initiating, demodulating, modulating, encoding, and/or decoding of anything.

In some aspects, the control circuit(s)/algorithm(s) 653 may be configured to enable, may perform one or more algorithms related to, and/or may provide the structure (e.g., means for) corresponding to any one or more of the functions, features, steps, methods, processes, operations, and/or aspects described herein, e.g., with respect to STA 120, in relation to or involving any using, determining, considering, refraining from, selecting, utilizing, setting, affecting, transitioning, comparing, foregoing, and/or inferring of anything. In some aspects, the transmission circuit(s)/algorithm(s) 654 may be configured to enable, may perform one or more algorithms related to, and/or may provide the structure (e.g., means for) corresponding to any one or more of the functions, features, steps, methods, processes, operations, and/or aspects described herein, e.g., with respect to STA 120, in relation to or involving any transmitting, generation, and/or communicating of anything. In some aspects, the other circuit(s)/algorithm(s) 655 may be configured to enable, may perform one or more algorithms related to, and/or may provide the structure (e.g., means for) corresponding to any one or more of the functions, features, steps, methods, processes, operations, and/or aspects described herein, e.g., with respect to STA 120, in relation to or involving anything else.

The processor(s) 650 may be responsible for various processing operations, including the execution of software (e.g., instructions, code, algorithms, etc.) stored in/on the computer-readable medium 640. Each of the circuits 651, 652, 653, 654, 655 described herein may be or include one or more hardware components specifically configured to carry out the stated processes/algorithm, implemented by one or more processor(s) 650 configured to perform the stated processes/algorithm, stored within a computer-readable medium 640 for implementation by the one or more processor(s) 650, memory 630, or any combination thereof.

The computer-readable medium 640 may be used for storing data that is used, processed, and/or manipulated by the processor(s) 650. The computer-readable medium 640 may be a non-transitory computer-readable medium. The computer-readable medium 640 may include one or more instructions (e.g., computer-executable code) configured to enable, may perform one or more algorithms related to, and/or may provide the structure (e.g., means for) corresponding to any one or more of the functions, features, steps, methods, processes, operations, and/or aspects described herein. In some aspects, the reception instruction(s)/algorithm(s) 641 may include one or more instructions (e.g., computer-executable code) configured to enable, may perform one or more algorithms related to, and/or may provide the structure (e.g., means for) corresponding to any one or more of the functions, features, steps, methods, processes, operations, and/or aspects described herein, e.g., with respect to STA 120, in relation to or involving any receiving of anything. In some aspects, the process instruction(s)/algorithm(s) 642 may include one or more instructions (e.g., computer-executable code) configured to enable, may perform one or more algorithms related to, and/or may provide the structure (e.g., means for) corresponding to any one or more of the functions, features, steps, methods, processes, operations, and/or aspects described herein, e.g., with respect to STA 120, in relation to or involving any processing, initiating, demodulating, modulating, encoding, and/or decoding of anything.

In some aspects, the control instruction(s)/algorithm(s) 643 may include one or more instructions (e.g., computer-executable code) configured to enable, may perform one or more algorithms related to, and/or may provide the structure (e.g., means for) corresponding to any one or more of the functions, features, steps, methods, processes, operations, and/or aspects described herein, e.g., with respect to STA 120, in relation to or involving any using, determining, considering, refraining from, selecting, utilizing, setting, affecting, transitioning, comparing, foregoing, and/or inferring of anything. In some aspects, the transmission instruction(s)/algorithm(s) 644 may include one or more instructions (e.g., computer-executable code) configured to enable, may perform one or more algorithms related to, and/or may provide the structure (e.g., means for) corresponding to any one or more of the functions, features, steps, methods, processes, operations, and/or aspects described herein, e.g., with respect to STA 120, in relation to or involving any transmitting, generation, and/or communicating of anything. In some aspects, the other instruction(s)/algorithm(s) 645 may include one or more instructions (e.g., computer-executable code) configured to enable, may perform one or more algorithms related to, and/or may provide the structure (e.g., means for) corresponding to any one or more of the functions, features, steps, methods, processes, operations, and/or aspects described herein, e.g., with respect to STA 120, in relation to or involving anything else. Additional details related to the aspects described in FIG. 6 are provided throughout the present disclosure.

In some aspects, a first radio 608 (e.g., PR 222) includes or refers to the first transceiver 604. In some aspects, a first radio 608 (e.g., PR 222) includes or refers to the first transceiver 604 and the one or more antennas 602. In some aspects, a first radio 608 (e.g., PR 222) includes or refers to the transceiver 604 and one or more of the other components described herein (e.g., one or more processor(s) 650, any computer readable medium 640, the bus 606, the bus interface 620, and/or memory 630), possibly also including the one or more antennas 602. A first radio 608 (e.g., PR 222) may additionally or alternatively be designed and implemented using various components, at least one or all of which may not be illustrated in FIG. 6 nor explicitly described herein, without necessarily deviating from the scope of the present disclosure.

In some aspects, a second radio 668 (e.g., SR 224) may include or refer to the second transceiver 664. In some aspects, a second radio 668 (e.g., SR 224) may include or refer to the second transceiver 664 and the one or more antennas 662. In some aspects, a second radio 668 (e.g., SR 224) may include or refer to the second transceiver 664 and one or more of the other components described herein (e.g., one or more processor(s) 650, any computer readable medium 640, the bus 606, the bus interface 620, and/or memory 630), possibly also including the one or more antennas 662. A second radio 668 (e.g., SR 224) may additionally or alternatively be designed and implemented using various components, at least one or all of which may not be illustrated in FIG. 6 nor explicitly described herein, without necessarily deviating from the scope of the present disclosure.

Several aspects of communication systems are presented herein with reference to various apparatus, methods, and computer-readable medium. These apparatus, methods, and computer-readable medium are described in the detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware and/or software may depend upon the particular application and/or design constraints imposed on the overall communication system. By way of example, an element, or any portion of an element, or any combination of elements may be implemented with a processing system, e.g., as described herein, that includes one or more processors.

Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software refers broadly to instructions, instruction sets, code, code segments, program code, programs, subprograms, software modules, applications, software applications, software packages, routines, subroutines, objects, executables, threads of execution, procedures, functions, and other similar things, whether referred to as software, firmware, middleware, microcode, hardware description language, or otherwise.

Various functions, features, steps, elements, methods, operations, and/or aspects described may be implemented in hardware, software, firmware, or any combination thereof. If implemented in software, the functions, features, steps, elements, methods, operations, and/or aspects may be stored on or encoded as one or more instructions or code on a computer-readable medium. Computer-readable media may include computer storage media. Computer storage media may be any available media that can be accessed by a computer. Such computer-readable media may comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Combinations of the foregoing may also be included within the scope of computer-readable media. Combinations of the foregoing may also be included within the scope of memory.

The specific order or hierarchy of the processes disclosed herein is provided for non-limiting, illustrative purposes. Based upon design or implementation preferences, the specific order or hierarchy of methods, operations, steps, functions, features, and/or aspects may be re-arranged without deviating from the scope of the present disclosure. Some methods, operations, steps, functions, features, and/or aspects may be combined or omitted without deviating from the scope of the present disclosure. The accompanying claims present elements of the various methods, operations, steps, functions, features, and/or aspects is one of many examples, and many other examples of methods, operations, steps, functions, features, and/or aspects exist without deviating from the scope of the present disclosure. The present disclosure is not limited to any specific order or hierarchy, unless such specific order or hierarchy is explicitly and expressly required by the claims. The scope of the claims shall not be construed as limited to the examples provided herein, unless a corresponding feature is explicitly and expressly recited in the claims.

Unless specifically stated otherwise, the term "some" refers to one or more. Combinations such as "at least A, B, or C," "at least one of A, B, or C," "at least one of A, B, and C," and "A, B, C, or any combination thereof" include any combination of A, B, and/or C, which may include any one of the following possibilities: (i) one or more of A; (ii) one or more of B; (iii) one or more of C; (iv) one or more of A and one or more of B; (v) one or more of A and one or more of C; (vi) one or more of B and one or more of C; or (vii) one or more of A, one or more of B, and one or more of C. Nothing disclosed herein is intended to be dedicated to the public regardless of whether such disclosure is explicitly recited in the claims.

No claim element is a 'means plus function' claim element unless that element explicitly and expressly recites that claim element using the words, "means for." The description provided herein enables a person skilled in the art to practice the various aspects described herein. Various modifications to these aspects are readily apparent to those skilled in the art. The claims are not necessarily intended to be limited to the specific aspects described herein, unless such aspect(s) is/are explicitly and expressly recited in the claims. Reference to an element in the singular (e.g., "an apparatus") is intended to mean "at least one" (e.g., "at least one apparatus") and is not intended to mean "one and only one" (e.g., not "one and only one apparatus"), unless explicitly and expressly recited as "one and only one" in the claims.

The invention claimed is:

1. A method of wireless communication by a station (STA), the STA configured to communicate with an access point (AP), the STA comprising at least a first radio and a second radio, the AP comprising at least two radios, the method of wireless communication by the STA comprising:

while the STA is operating according to a first state, the first state comprising the first radio in a high-power state and the second radio in a low-power state, transmitting an uplink (UL) request packet comprising information associated with a basic service set (BSS) with which one or more of the at least two radios of the AP are associated;

after transmitting the UL request packet, receiving one or more downlink (DL) response packets at least comprising (1) information indicating whether the AP is capable of communicating a first communication using a first attribute and a second communication using a second attribute different from the first attribute, wherein a difference between the first attribute and the second attribute comprises at least different communication channels, different frequency ranges, different bandwidths, or different center frequencies; (2) information relating to an operation or mode of operation of the STA operating according to a second state different from the first state, the second state comprising the first radio in a high-power state and the second radio in a high-power state; (3) information comprising a group identifier associated with the first radio of the STA and the second radio of the STA; and (4) information comprising an individual identifier associated with the first radio of the STA or the second radio of the STA;

determining a first communication channel for use by the first radio of the STA and a second communication channel for use by the second radio of the STA, wherein the second communication channel for use by the second radio of the STA is different from the first communication channel for use by the first radio of the STA;

after receiving the one or more DL response packets, initiating a change from the STA operating according to the first state to the STA operating according to the second state; and while the STA is operating according to the second state, supporting the first communication using the first attribute using the first radio of the STA, the first communication comprising receiving a first plurality of DL communications and transmitting a first plurality of UL communications, and supporting the second communication using the second attribute using the second radio of the STA, the second communication comprising receiving a second plurality of DL communications and transmitting a second plurality of UL communications.

2. The method of claim 1, wherein the first state comprises at least not using the second radio of the STA to listen-for or receive one or more packets during a period of time.

3. The method of claim 1, wherein (1) at least a portion of the first communication using the first attribute occurs simultaneously with at least a portion of the second communication using the second attribute and at least a portion of the first communication using the first attribute is time-sequenced with at least a portion of the second communication using the second attribute.

4. The method of claim 1, wherein the one or more DL response packets further comprises an indication of a value usable to determine a variation between a first frequency value or a first frequency range of the first communication relative to a second frequency value or a second frequency range of the second communication.

5. The method of claim 1, wherein (1) the UL packet further comprises control information and (2) the information relating to the operation or mode of operation while the STA is operating according to the second state comprises a least a request for an updated parameter or setting associated with the BSS with which the STA and AP are associated.

6. The method of claim 1, wherein the first UL packet further comprises an indication usable for calculation of a variation of a frequency range of the first communication using the first attribute relative to a frequency range of the second communication.

7. The method of claim 1, wherein at least a portion of the first plurality of UL communications of the first communication using the first attribute using the first radio of the STA occurs simultaneously with at a portion of the second plurality of UL communications of the second communication using the second attribute using the second radio of the STA.

8. The method of claim 1, wherein at least a portion of the first plurality of DL communications of the first communication using the first attribute using the first radio of the STA occurs simultaneously with at a portion of the second plurality of DL communications of the second communication using the second attribute using the second radio of the STA.

9. The method of claim 1, wherein at least a portion of the first plurality of UL communications of the first communication using the first attribute using the first radio of the STA occurs simultaneously with at a portion of the second plurality of DL communications of the second communication using the second attribute using the second radio of the STA.

10. The method of claim 1, wherein at least a portion of the first plurality of DL communications of the first communication using the first attribute using the first radio of the STA occurs simultaneously with at a portion of the second plurality of UL communications of the second communication using the second attribute using the second radio of the STA.

11. The method of claim 1, wherein at least a portion of the first plurality of UL communications of the first communication using the first attribute using the first radio of the STA occurs before or after at a portion of the second plurality of UL communications of the second communication using the second attribute using the second radio of the STA.

12. The method of claim 1, wherein at least a portion of the first plurality of DL communications of the first communication using the first attribute using the first radio of the STA occurs before or after at a portion of the second plurality of DL communications of the second communication using the second attribute using the second radio of the STA.

13. The method of claim 1, wherein at least a portion of the first plurality of UL communications of the first communication using the first attribute using the first radio of the STA occurs before or after at a portion of the second plurality of DL communications of the second communication using the second attribute using the second radio of the STA.

14. The method of claim 1, wherein at least a portion of the first plurality of DL communications of the first communication using the first attribute using the first radio of the STA occurs before or after at a portion of the second plurality of UL communications of the second communication using the second attribute using the second radio of the STA.

15. The method of claim 1, wherein the first communication using the first radio using the first attribute occurs at least in part simultaneously with the second communication using the second radio using the second attribute.

16. The method of claim 1, wherein the first communication using the first radio using the first attribute is at least in part time-sequenced relative to the second communication using the second radio using the second attribute.

17. The method of claim 1, wherein (1) the UL packet further comprises control information and (2) the first communication using the first radio using the first attribute occurs at least in part simultaneously with the second communication using the second radio using the second attribute and the first communication using the first radio using the first attribute is at least in part time-sequenced relative to the second communication using the second radio using the second attribute.

18. A station (STA) for wireless communication with an access point (AP), the STA comprising at least:
 a first radio;
 a second radio;
 memory; and
 one or more processors configured to:
  while the STA is operating according to a first state, the first state comprising the first radio in a high-power state and the second radio in a low-power state, transmit an uplink (UL) request packet comprising information associated with a basic service set (BSS) with which one or more of at least two radios of the AP are associated;
  after transmission of the UL request packet, receive one or more downlink (DL) response packets at least comprising (1) information indicating whether the AP is capable of communicating a first communication using a first attribute and a second communication using a second attribute different from the first attribute, wherein a difference between the first attribute and the second attribute comprises at least different communication channels, different frequency ranges, different bandwidths, or different center frequencies; (2) information relating to an operation or mode of operation of the STA operating according to a second state different from the first state, the second state comprising the first radio in a high-power state and the second radio in a high-power state; (3) information comprising a group identifier associated with the first radio of the STA and the second radio of the STA; and (4) information comprising an individual identifier associated with the first radio of the STA or the second radio of the STA;
  determine a first communication channel for use by the first radio of the STA and a second communication channel for use by the second radio of the STA, wherein the second communication channel for use by the second radio of the STA is different from the first communication channel for use by the first radio of the STA;
  after receipt of the one or more DL response packets, initiate a change from the STA operating according to the first state to the STA operating according to the second state; and
  while the STA is operating according to the second state, support the first communication using the first attribute using the first radio of the STA, the first communication comprising receiving a first plurality of DL communications and transmitting a first plurality of UL communications, and support the second communication using the second attribute using the second radio of the STA, the second communication comprising receiving a second plurality of DL communications and transmitting a second plurality of UL communications.

19. An access point (AP) for wireless communication with a station (STA), the AP comprising:
 at least two radios;
 memory; and
 one or more processors configured to:
  while the STA is operating according to a first state, the first state comprising a first radio of the STA in a high-power state and a second radio of the STA in a low-power state, receive an uplink (UL) request packet comprising information associated with a basic service set (BSS) with which one or more of the at least two radios of the AP are associated;
  after receiving the UL request packet, transmit one or more downlink (DL) response packets at least comprising (1) information indicating whether the AP is capable of communicating a first communication using a first attribute and a second communication using a second attribute different from the first attribute, wherein a difference between the first attribute and the second attribute comprises at least different communication channels, different frequency ranges, different bandwidths, or different center frequencies; (2) information relating to an operation or mode of operation of the STA operating according to a second state different from the first state, the second state comprising the first radio of the STA in a high-power state and the second radio of the STA in a high-power state; (3) information comprising a group identifier associated with the first radio of the STA and the second radio of the STA; and (4) information comprising an individual identifier associated with the first radio of the STA or the second radio of the STA, wherein the STA determines a communication channel for use by the first radio of the STA and the second radio of the STA, the determined communication channel for use by the second radio of the STA being different from a communication channel for use by the first radio of the STA, and wherein, after receiving the one or more DL response packets, the STA initiates a change from the STA operating according to the first state to the STA operating according to the second state, the second state comprising the first radio of the STA in a high-power state and the second radio of the STA in a high-power state; and while the STA is operating according to the second state, support the first communication using the first attribute using the first radio of the STA, the first communication comprising transmitting a first plurality of DL communications and receiving a first plurality of UL communications, and support the second communication using the second attribute using the second radio of the STA, the second communication comprising transmitting a second plurality of DL communications and receiving a second plurality of UL communications.

20. A method of wireless communication by an access point (AP), the AP configured to communicate with a station (STA), the STA comprising at least a first radio and a second radio, the AP comprising at least two radios, the method of wireless communication by the AP comprising:

while the STA is operating according to a first state, the first state comprising the first radio of the STA in a high-power state and the second radio of the STA in a low-power state, receiving an uplink (UL) request packet comprising information associated with a basic service set (BSS) with which one or more of the at least two radios of the AP are associated;

after receiving the UL request packet, transmitting one or more downlink (DL) response packets at least comprising (1) information indicating whether the AP is capable of communicating a first communication using a first attribute and a second communication using a second attribute different from the first attribute, wherein a difference between the first attribute and the second attribute comprises at least different communication channels, different frequency ranges, different bandwidths, or different center frequencies; (2) information relating to an operation or mode of operation of the STA operating according to a second state different from the first state, the second state comprising the first radio of the STA in a high-power state and the second radio of the STA in a high-power state; (3) information comprising a group identifier associated with the first radio of the STA and the second radio of the STA; and (4) information comprising an individual identifier associated with the first radio of the STA or the second radio of the STA, wherein the STA determines a communication channel for use by the first radio of the STA and the second radio of the STA, the determined communication channel for use by the second radio of the STA being different from a communication channel for use by the first radio of the STA, and wherein, after receiving the one or more DL response packets, the STA initiates a change from the STA operating according to the first state to the STA operating according to the second state, the second state comprising the first radio of the STA in a high-power state and the second radio of the STA in a high-power state; and while the STA is operating according to the second state, supporting the first communication using the first attribute using the first radio of the STA, the first communication comprising transmitting a first plurality of DL communications and receiving a first plurality of UL communications, and supporting the second communication using the second attribute using the second radio of the STA, the second communication comprising transmitting a second plurality of DL communications and receiving a second plurality of UL communications.

\* \* \* \* \*